(12) United States Patent
Aiki et al.

(10) Patent No.: US 8,094,271 B2
(45) Date of Patent: Jan. 10, 2012

(54) LIQUID CRYSTAL DISPLAY DEVICE AND COLOR FILM PLATE, AND PROCESSES FOR PRODUCING THE SAME

(75) Inventors: Yasuhiro Aiki, Minami-ashigara (JP); Shinichi Morishima, Minami-ashigara (JP); Morimasa Sato, Fujinomiya (JP); Mitsuyoshi Ichihashi, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 535 days.

(21) Appl. No.: 12/162,581

(22) PCT Filed: Feb. 2, 2007

(86) PCT No.: PCT/JP2007/052293
§ 371 (c)(1),
(2), (4) Date: Jul. 29, 2008

(87) PCT Pub. No.: WO2007/089040
PCT Pub. Date: Aug. 9, 2007

(65) Prior Publication Data
US 2009/0040433 A1 Feb. 12, 2009

(30) Foreign Application Priority Data
Feb. 3, 2006 (JP) ................................. 2006-026706

(51) Int. Cl.
*G02F 1/13363* (2006.01)
(52) U.S. Cl. ........................................ 349/117; 349/106
(58) Field of Classification Search ................... None
See application file for complete search history.

(56) References Cited

U.S. PATENT DOCUMENTS

| 5,281,450 | A  | * | 1/1994  | Yaniv ............................. 427/510 |
| 5,499,126 | A  | * | 3/1996  | Abileah et al. ................. 349/106 |
| 2003/0113639 | A1 | * | 6/2003 | Kawase ............................. 430/7 |
| 2004/0156001 | A1 |   | 8/2004 | Moriya |
| 2005/0116741 | A1 |   | 6/2005 | Tate |
| 2005/0174513 | A1 | * | 8/2005 | Sakurada ...................... 349/106 |
| 2006/0008930 | A1 |   | 1/2006 | Toyoda et al. |
| 2006/0146232 | A1 | * | 7/2006 | Liao et al. ....................... 349/86 |
| 2006/0170848 | A1 |   | 8/2006 | Kawai et al. |
| 2006/0203164 | A1 |   | 9/2006 | Silverstein et al. |
| 2007/0252927 | A1 | * | 11/2007 | Ichihashi et al. .............. 349/106 |

(Continued)

FOREIGN PATENT DOCUMENTS

GB  2 394 718 A  5/2004

(Continued)

OTHER PUBLICATIONS

PCT/ISA/210 in PCT/JP2007/052293, mailed May 15, 2007.

(Continued)

*Primary Examiner* — Mike Stahl
(74) *Attorney, Agent, or Firm* — Buchanan Ingersoll & Rooney PC

(57) ABSTRACT

A novel liquid crystal display device is disclosed. The liquid crystal display device comprises a first substrate, a second substrate, liquid crystal held between the first substrate and the second substrate, patterned layers divided into fine areas, disposed on the first substrate, comprising at least a patterned color filter layer and a patterned first optically anisotropic layer laminated in the direction of the normal line of the substrate, and a barrier wall disposed at a boundary portion of the adjacent fine areas of the patterned layers.

19 Claims, 4 Drawing Sheets

U.S. PATENT DOCUMENTS

2009/0135352 A1 * 5/2009 Suzuki et al. ................. 349/106

FOREIGN PATENT DOCUMENTS

| JP | 7-35915 A | * | 2/1995 |
| JP | 2004-037837 A | | 2/2004 |
| JP | 2004-240102 A | | 8/2004 |
| JP | 2005-003733 A | | 1/2005 |
| JP | 2005-004124 A | | 1/2005 |
| JP | 2005-024919 A | | 1/2005 |
| JP | 2005-024920 A | | 1/2005 |
| JP | 2005-148118 A | * | 6/2005 |
| JP | 2005-275321 A | | 10/2005 |
| JP | 2006-011369 A | | 1/2006 |
| JP | 2006-023462 A | | 1/2006 |
| JP | 2006-064858 A | | 3/2006 |
| JP | 2006-078647 A | | 3/2006 |
| JP | 2007-279379 A | * | 10/2007 |

OTHER PUBLICATIONS

PCT/ISA/237 in PCT/JP2007/052293, mailed May 15, 2007.
Notification Concerning Transmittal of International Preliminary Report on Patentability (Form PCT/IB/326), International Preliminary Report on Patentability (Form PCT/IB/373), Written Opinion of the International Search Authority (Form PCT/ISA/237) mailed in corresponding International Patent Application No. PCT/JP2007/052293, Aug. 14, 2008, The International Bureau of WIPO, Geneva, CH.

* cited by examiner

LIQUID CRYSTAL DISPLAY DEVICE AND COLOR FILM PLATE, AND PROCESSES FOR PRODUCING THE SAME

BACKGROUND OF THE INVENTION

1. Technical Field of the Invention

The present invention relates to a liquid crystal display device comprising a patterned color filter layer and optically anisotropic layer on a surface such as a liquid crystal cell substrate, and a process for producing the same. The present invention also relates to a color filter plate comprising a patterned color filter layer and optically anisotropic layer, and a process for producing the same.

2. Related Art

A CRT (cathode ray tube) has been mainly employed in various display devices used for office automation (OA) equipment such as a word processor, a notebook-sized personal computer and a personal computer monitor, mobile phone terminal and television set. A liquid crystal display device (LCD) has been more and more widely used instead of a CRT, because it has a thin shape, lightweight and small electric power consumption. A liquid crystal display device comprises, at least, a liquid crystal cell and a polarizing plate. In general, a polarizing plate is produced by laminating the both surfaces of a polarizing film, which is prepared by soaking a polyvinyl alcohol film with iodine and then subjecting the same to stretching, with protective films, and, therefore, comprises a pair of protective films and a polarizing film.

For example, a transmissive LCD comprises two polarizing plates disposed on both sides of a liquid crystal cell, and may further comprise one or more optical compensatory sheets. On the other hand, a reflective LCD comprises a reflecting plate, a liquid crystal cell, one or more optical compensatory sheets, and a polarizing plate which are disposed in this order. A liquid crystal cell comprises a liquid crystal layer confined between two substrates, and electrode layers for applying a voltage to the liquid crystal layer. A liquid crystal cell has ON and OFF states on the basis of the difference in alignment state of the liquid crystal layer, and can be used in any of a transmissive type, reflective type and semi-transmissive type display devices employing any ever proposed modes such as TN (Twisted Nematic), IPS (In-Plane Switching), OCB (Optically Compensatory Bend), VA (Vertically Aligned), ECB (Electrically Controlled Birefringence) and STN (Super Twisted Nematic). Color and contrast displayed by the conventional liquid crystal display device, however, vary depending on the viewing angle. Therefore, it cannot be said that the viewing angle characteristics of the liquid crystal display device is superior to those of the CRT.

In order to improve the viewing angle properties, a retardation plate (optical compensatory sheet) has been employed for compensating birefringence generated depending on viewing angles. Till now, there has been proposed an LCD having an excellent viewing angle property of contrast by employing optical compensatory sheets having various optical properties for aforementioned wide-ranging display modes. In particular, three modes of OCB, VA and IPS have lead to have wide viewing angle properties in terms of contrast over the all directions as a wide viewing angle mode, and they have already been in widespread use as TV application for household use. Further, recently, large-sized displays of more than 30 inches have been provided.

Wide-screen LCDs suffer from light leakages from the corner portions, or, in other words, corner non-uniformities. It is considered that such phenomenon is caused by dimensional changes in the polarizer plates, which are employed in the LCDs, depending on environmental moisture. In particular for the case where a polarizer plate and an optical compensation sheet are bonded directly or bonded with an adhesive layer disposed between them, the optical compensation sheet may be changed in dimension with the polarizer plate, and, therefore, the optical characteristics of the optical compensation sheet may be varied with the dimensional change. And, in such a case, the corner non-uniformity may be worsened.

An optical compensation sheet can effectively contribute to reducing the viewing angle dependence of contrast, but cannot contribute to reducing the viewing angle dependence of color sufficiently, and reducing the viewing angle dependence of color is considered as an important problem to be solved for LCD. Viewing angle dependence of color of LCD is ascribable to difference in wavelength of three representative colors of R, G and B. Even R, G and B lights are given equal retardation, the changes in polarization states of R, G and B lights are different each other. For overcoming such problems, it is necessary to optimize wavelength dispersion of birefringence of an optically anisotropic material with respect to each of wavelengths of R, G and B. The LCD is, however, still on the way to thorough improvement in the viewing angle dependence of color, because it is still not easy to control the wavelength dispersion of birefringence of liquid crystal molecules used for ON/OFF display, or for optical compensation sheet.

There is proposed a retardation plate using a modified polycarbonate as an optical compensatory sheet in which the birefringence wavelength dispersion is controlled for the viewing angle property of color (Japanese Laid-Open Patent Publication (Tokkai), hereinafter referred to as "JPA", No. 2004-37837). By using this for a λ/4 plate in a reflective liquid crystal display device or an optical compensatory sheet in the VA mode, the viewing angle property of color can be improved. However, modified polycarbonate film has not been used widely for LCDs yet due to such reasons that, not only the raw material itself is expensive, but also the unevenness in optical properties such as bowing occurs in stretching used in the manufacturing process thereof.

On the contrary, a system has been proposed, which has the same principle as that for the viewing angle compensation in terms of contrast by an optical compensatory sheet, but compensates it independently for three colors of R, G, B (e.g., GB 2394718, JPA Nos. 2004-240102, 2005-4124, 2005-24919, 2005-24920 and 2006-78647). This can be mainly realized by a method in which a retardation plate is patterned along with a color filter etc. in a liquid crystal cell. However, in order to pattern a retardation plate in a liquid crystal cell, for example, such troublesome operations are required, in the cell, as formation of an alignment film layer, rubbing treatment, coating, alignment and stabilization of a polymerizable liquid crystal composition, formation, etching treatment of a resist layer, and elimination by peeling of the resist layer. Consequently, it is difficult to form an optically anisotropic layer having an optically uniform retardation property. In addition, there is such problem that the retardation of a retardation plate changes before and after the etching due to heat and a solvent of the photo resist that are resulted upon forming the resist pattern.

On the other hand, as a method for producing a color filter, an ink jet system is known. In an ink jet system, an ink is ejected while moving an ink jet head lying above a transparent substrate to form patterns directly, therefore no exposure and development processes are required. Consequently, in an ink jet system, the reduction in a use amount of ink and the simplification of process allow the cost to be reduced. Therefore, the ink jet system attracts attention now as a method for producing a color filter. And the process for producing an optically anisotropic layer employing such ink jet system has been also provided (JPA No. 2006-64858).

SUMMARY OF THE INVENTION

One object of the present invention is to provide a color filter plate comprising a fine-patterned optical anisotropy, and a simple and stable process for producing such color filter plate.

Another object of the invention is to provide a liquid crystal display device, in which a liquid crystal cell can be optically compensated accurately, having an excellent productivity and improved viewing angle property of color, and a simple and stable process for producing such liquid crystal display device.

In one aspect, the invention provides a liquid crystal display device comprising:
a first substrate,
a second substrate,
liquid crystal held between the first substrate and the second substrate,
patterned layers divided into fine areas, disposed on the first substrate, comprising at least a patterned color filter layer and a patterned first optically anisotropic layer laminated in the direction of the normal line of the substrate, and
a barrier wall disposed at a boundary portion of the adjacent fine areas of the patterned layers.

The fine areas may be arranged in a matrix shape.

The first optically anisotropic layer may be produced according to a process comprising applying a fluid composition containing a liquid crystalline compound having at least one reactive group such as an ethylenic unsaturated group to a surface such as a rubbed surface of an alignment layer, drying the fluid composition on the surface to form a liquid crystal phase, and then fixing the liquid crystal phase with the aid of irradiation of heat or ionizing radiation such as ultra-violet ray. The fluid composition, to be used for preparing the first optically anisotropic layer, may further comprise at least one type of radical polymerization initiator.

The liquid crystalline compound is selected from rod-like liquid crystal or discotic liquid crystal. The rod-like liquid crystal may have a smectic A phase. The rod-like liquid crystal may be selected form liquid crystal having a nematic phase and/or a smectic A phase, of which intrinsic birefringence at a wavelength λ, $\Delta n(\lambda)$, satisfies relational expressions (I) and (II) below:

$$\Delta n(450\ nm)/\Delta n(550\ nm)<1 \qquad (I)$$

$$\Delta n(650\ nm)/\Delta n(550\ nm)>1. \qquad (II)$$

The liquid crystalline compound may be also selected from discotic liquid crystalline compounds, and, in such embodiments, the first optically anisotropic layer may comprise discotic liquid crystalline molecules fixed in a homeotropic alignment state.

In another embodiment, the first optically anisotropic layer may be prepared by fixing a cholesteric phase.

As embodiments of the invention, there are provided the liquid crystal display device wherein an in-plane retardation (Re) value of the first optically anisotropic layer is not zero; and the optically anisotropic layer is a biaxial layer which gives substantially equal retardation values for light of a wavelength λ nm coming respectively in a direction rotated by +40° and in a direction rotated by −40° with respect to a normal direction of a layer plane using an in-plane slow axis as a tilt axis (a rotation axis); and the liquid crystal display device wherein the optically anisotropic layer has an in-plane retardation (Re) value ranging from 15 to 200 nm, and gives an equal retardation ranging from 50 to 250 nm when light of a wavelength λ nm coming respectively in a direction rotated by +40° and by −40° with respect to a normal direction of a layer plane using an in-plane slow axis as a tilt axis (a rotation axis).

The liquid crystal display device may further comprise an un-patterned second optically anisotropic, disposed on either the first or the second substrate.

As an embodiment of the invention, there is provided the liquid crystal display device, employing a VA mode, wherein the first optically anisotropic layer is a positive A-plate, and the second optically anisotropic layer is a negative C-plate.

In this embodiment, it is preferable that the color filter layer comprises red areas, green areas and blue areas; the areas of the first optically anisotropic layer respectively disposed on or under the red areas, the green areas and the blue areas have in-plane retardation, Re(Red), Re(green) and Re(blue) respectively; and the in-plane retardation satisfy a relational expression below;

$$Re(Red)>Re(Green)>Re(Blue).$$

As an embodiment of the invention, there is also provided the liquid crystal display device, employing an IPS mode, wherein the first optically anisotropic layer is a positive C-plate, and the second optically anisotropic layer is a positive A-plate.

In this embodiment, it is preferable that a retardation at a wavelength λ, Re(λ), of the positive A-plate satisfies relational expressions (III) and (Iv) below:

$$Re(450\ nm)/Re(550\ nm)<1 \qquad (III)$$

$$Re(650\ nm)/Re(550\ nm)>1. \qquad (IV)$$

As embodiments of the invention, there are provided the liquid crystal display device, employing an IPS-mode, wherein the first optically anisotropic layer is a positive C-plate; and the second optically anisotropic layer is a biaxial layer which has an in-plane retardation (Re) value of not zero and gives substantially equal retardation values for light of a wavelength λ nm coming respectively in a direction rotated by +40° and in a direction rotated by −40° with respect to a normal direction of a layer plane using an in-plane slow axis as a tilt axis (a rotation axis); and the liquid crystal display device, wherein the second optically anisotropic layer has an in-plane retardation (Re) value at 550 nm ranging from 20 to 150 nm, and an Nz value at 550 nm ranging from 1.5 to 7, provided that Nz is defined as $Nz=(nx-nz)/(nx-ny)$ based on in-plane refractive indexes nx and ny(nx>ny) and a thickness direction refractive index nz.

In another aspect, the invention provides a process for producing the liquid crystal display device, comprising at least [1a]-[4a] steps below in this order:

[1a] forming fine areas on a first substrate separated by barrier walls;

[2a] forming an optically anisotropic layer by ejecting a fluid composition, capable of exhibiting optical anisotropy, comprising at least one type of liquid crystalline compound from an ejection head of an ink jet system to the fine areas according to predetermined positions, drying the composition to form a liquid crystal phase, and then exposing the composition;

[3a] forming a color filter layer on the optically anisotropic layer by ejecting each ink fluid composition for a color filter from an ejection head of an ink jet system to the optically anisotropic layer according to predetermined positions, and then drying the composition; and

[4a] combining the first substrate with a second substrate; and a process for producing the liquid crystal display device, comprising at least [1b]-[4b] steps below in this order:

[1b] forming fine areas on a first substrate separated by barrier walls;

[2b] forming a color filter layer on the optically anisotropic layer by ejecting each ink fluid composition for a color filter from an ejection head of an ink jet system to the fine areas according to predetermined positions, and then drying the composition;

[3b] forming an optically anisotropic layer on the color filter layer by ejecting a fluid composition, capable of exhibiting optical anisotropy, comprising at least one type of liquid crystalline compound from an ejection head of an ink jet system to the fine areas according to predetermined positions, drying the composition to form a liquid crystal phase, and then exposing the composition; and

[4b] combining the first substrate with a second substrate.

The process may further comprise forming an alignment layer by rubbing a surface before the [2a] or [3b] step.

In another aspect, the invention provides a color filter plate comprising:

a substrate, patterned layers divided into fine areas, disposed on the substrate, comprising at least a patterned color filter layer and a patterned first optically anisotropic layer laminated in the direction of the normal line of the substrate, and a barrier wall disposed at a boundary portion of the adjacent fine areas of the patterned layers.

The color filter layer and the optically anisotropic layer may be disposed in this order or in on the substrate, and the optically anisotropic layer and the color filter layer may be disposed in this order on the substrate.

In another aspect, the invention provides a process for producing a color filter plate, comprising at least [1a]-[4a] steps below in this order:

[1a] forming fine areas on a substrate separated by barrier walls;

[2a] forming an optically anisotropic layer by ejecting a fluid composition, capable of exhibiting optical anisotropy, comprising at least one type of liquid crystalline compound from an ejection head of an ink jet system to the fine areas according to predetermined positions, drying the composition to form a liquid crystal phase, and then exposing the composition; and

[3a] forming a color filter layer on the optically anisotropic layer by ejecting each ink fluid composition for a color filter from an ejection head of an ink jet system to the optically anisotropic layer according to predetermined positions, and then drying the composition; and a process for producing a color filter plate, comprising at least [1b]-[4b] steps below in this order:

[1b] forming fine areas on a substrate separated by barrier walls;

[2b] forming a color filter layer on the optically anisotropic layer by ejecting each ink fluid composition for a color filter from an ejection head of an ink jet system to the fine areas according to predetermined positions, and then drying the composition; and

[3b] forming an optically anisotropic layer on the color filter layer by ejecting a fluid composition, capable of exhibiting optical anisotropy, comprising at least one type of liquid crystalline compound from an ejection head of an ink jet system to the fine areas according to predetermined positions, drying the composition to form a liquid crystal phase, and then exposing the composition.

Figure 1:
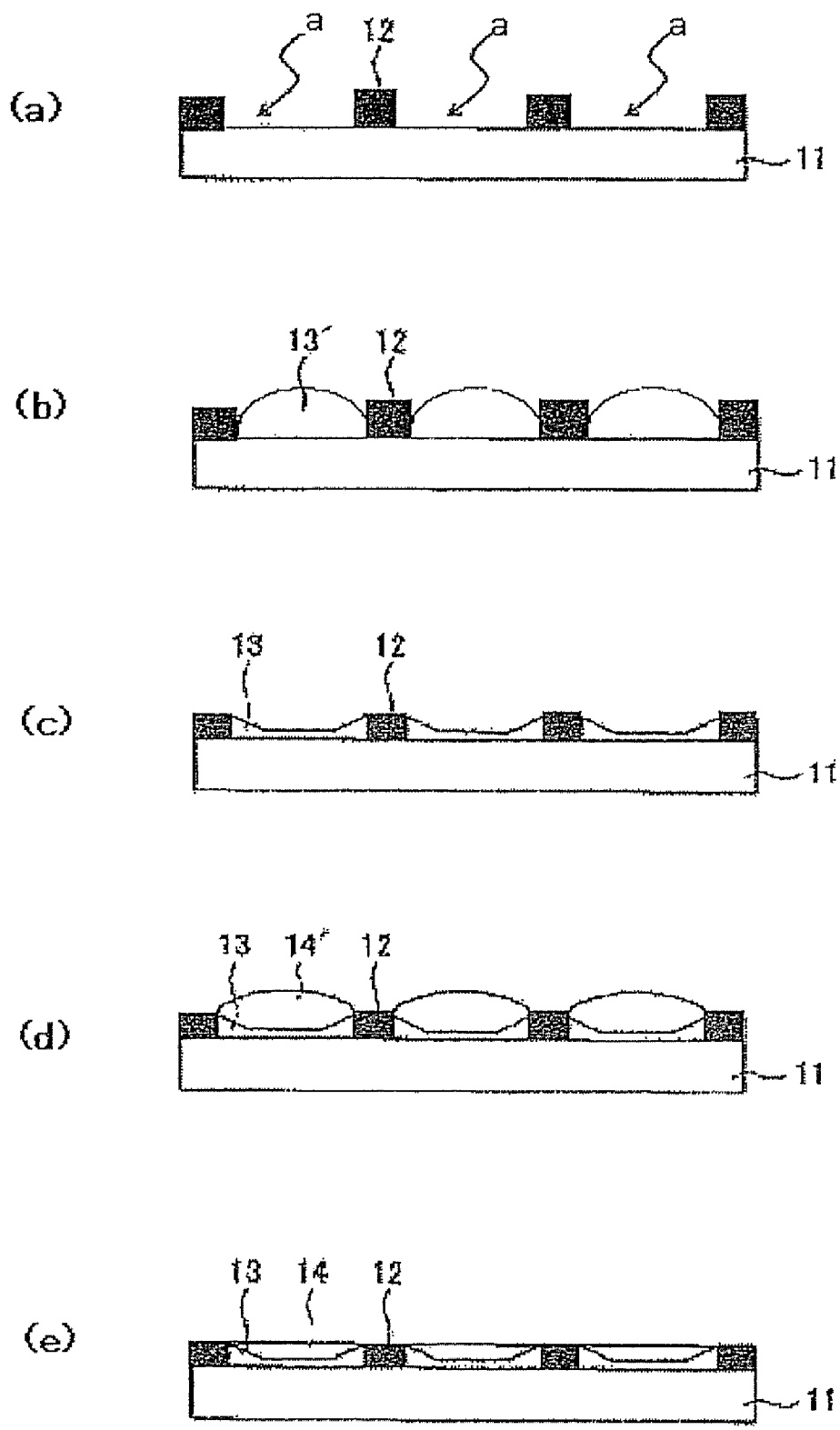
FIG. 1 is a rough schematic drawing showing one example of a flow of the producing process of the present invention.

In these drawings, reference numerals mean as follows:
1 pixel area of liquid crystal element;
2 pixel electrode;
3 display electrode;
4 rubbing direction;
5$a$, 5$b$ mean director of liquid crystal molecules in the black state;
6$a$, 6$b$ mean director of liquid crystal molecules in the white state;
7$a$, 7$b$, 19$a$, 19$b$ protective films for polarizer film;
11 transparent substrate;
12 black matrix (barrier wall);
13 optically anisotropic layer;
14 color filter layer;
21 substrate to be transferred;
22 black matrix (barrier wall)
23 color filter layer;
24 solid optically anisotropic layer;
25 transparent electrode layer;
26 alignment layer;
27 patterned optically anisotropic layer;
31 liquid crystal;
32 TFT;
33 polarizing layer;
34 cellulose acetate film (polarizing plate-protective film),
35 cellulose acetate film, or optical compensatory sheet;
36 polarizing plate; and
37 liquid crystal cell.

PREFERRED EMBODIMENT OF THE INVENTION

The present invention will be described in detail.

It is to be noted, in this description, that the term " . . . to . . . " is used as meaning a range inclusive of the lower and upper values disposed therebefore and thereafter.

In this specification, Re($\lambda$) and Rth($\lambda$) represent in-plane retardation and thickness-wise retardation at wavelength $\lambda$, respectively. Re($\lambda$) is measured using KOBRA 21ADH or WR (from Oji Scientific Instruments), by irradiating the film with a $\lambda$-nm light in the direction of normal line of the film.

For the case where the film to be measured can be expressed by a monoaxial or biaxial index ellipsoid, Rth ($\lambda$) can be calculated by the method as described below.

Rth($\lambda$) is calculated by KOBRA 21ADH or WR is calculated based on six Re($\lambda$) values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an a tilt axis (a rotation axis; defined in an arbitrary in-plane direction if the film has no slow axis in plane); a value of hypothetical mean refractive index; and a value entered as a thickness value of the film.

When a sample film gives no retardation, zero, for incoming light in the direction rotated at a certain angle with respect to the normal direction of the film using an in-plane slow axis as a rotation axis, any retardation values obtained at angles larger than that angle will be calculated by KOBRA 21ADH or WR, after being inverted in the sign to minus.

It is to be noted that Rth can be also calculated from equations (1) and (2) below, based on two retardation values measured for incoming light in two rotated directions, while assuming the slow axis as a tilt axis (a rotation axis: defined in an arbitrary in-plane direction if the film has no slow axis); a hypothetical value of the mean refractive index, and an entered value of the thickness.

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{ny\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$ Equation (1)

$$Rth = \{(nx + ny)/2 - nz\} \times d$$ Equation (2)

Notes:

In the equation, $Re(\theta)$ represents retardation value in the direction rotated by angle $\theta$ from the direction of normal line.

In the equations, nx represents in-plane refractive index in the direction of slow axis; ny represents in-plane refractive index in the direction normal to nx; nz represents refractive index in the direction normal to nx and ny; and d is a thickness of the film.

For any films which cannot be expressed by a monoaxial or biaxial index ellipsoid, that is so-called, optic-axis-free film, $Rth(\lambda)$ is calculated by the procedures below.

The $Re(\lambda)$ is measured by using KOBRA-21ADH (manufactured by Oji Scientific Instruments) for an incoming light of a wavelength $\lambda$ nm in a vertical direction to a film-surface. The $Rth(\lambda)$ is calculated by using KOBRA-21ADH based on plural retardation values which are measured for incoming light of a wavelength $\lambda$ nm in eleven directions which are decided by a 100 step rotation from $-50°$ to $+50°$ with respect to the vertical direction of the film using an in-plane slow axis, which is decided by KOBRA 21ADH, as an a tilt axis (a rotation axis); value of hypothetical mean refractive index; and a value entered as a thickness value of the film.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some major optical films are listed below:

cellulose acylate (1.48), cycloolefin polymer (1.52), polycarbonate (1.59), polymethylmethacrylate (1.49) and polystyrene (1.59).

KOBRA 21ADH or WR calculates nx, ny and nz, upon enter of the hypothetical values of these mean refractive indices and the film thickness. Base on thus-calculated nx, ny and nz, $Nz=(nx-nz)/(nx-ny)$ is further calculated.

The sings of Rth values of samples are decided as follows:

When an retardation, which is measured for incoming light at 550 nm in a direction rotated by $+20°$ with respect to the normal direction of a sample using an in-plane slow axis as an a tilt axis (a rotation axis), is more than the Re value of the sample, the sign of the Rth value is considered positive (+); and when the retardation is less than the Re value of the sample, the sign of the Rth value is considered negative (−). However, for a sample whose $\sqrt[3]{Rth/Re}$ value is equal to or more than 9, the slow axis of the sample is decided with an inspection plate of a polarizing plate by polarization microscope observation in the direction rotated by $+40°$ with respect to the normal line of the sample using an in-plane slow axis as an a tilt axis (a rotation axis). Such observation may be carried out using a polarization microscope provided with a free rotating base. When the decided slow axis is parallel to the film plane of the sample, the sign of the Rth value is considered positive (+); and when the decided slow axis is parallel to the thickness direction of the sample, the sign of the Rth value is considered negative (−).

In this specification, $\lambda$ is 611±5 nm, 545±5 nm and 435±5 nm for R, G and B. respectively, and denotes 545±5 nm or 590±5 nm if no specific description is made on color.

It is to be noted that, regarding angles, the term "substantially" in the context of this specification means that a tolerance of less than ±5° with respect to the precise angles can be allowed. Difference from the precise angles is preferably less than 4°, and more preferably less than 3°. It is also to be noted that, regarding retardation values, the term "substantially" in the context of this specification means that a tolerance of less than ±5% with respect to the precise values can be allowed. It is also to be noted that the term "The Re value is not zero" in the context of this specification means that the absolute value Re is not less than 5 nm. The measurement wavelength for refractive indexes is a visible light wavelength, unless otherwise specifically noted. It is also to be noted that the term "visible light" in the context of this specification means light of a wavelength falling within the range from 400 to 700 nm.

[Process for Producing Liquid Crystal Display Device]

Firstly, one example of the process for producing the liquid crystal display device of the invention will be described while referring to FIG. 1.

On a transparent substrate 11 composed of glass etc., a black matrix 12 (barrier walls) of dot pattern is formed using a negative type black matrix resist material according to a photo lithographic method to form plural fine areas separated by the barrier walls 12 (FIG. 1(A)). Incidentally, in the formation of the black matrix 12, there is no particular limitation on the material and process for forming the black matrix, and the black matrix may be formed according to a method other than the photo lithographic method. The pattern of black matrix 12 is not limited to the dot pattern. There is no particular limitation on the alignment of a color filter to be formed, and any of dot alignment, stripe alignment, mosaic alignment and delta alignment can be used.

The black matrix 12 is preferably subjected to plasma treatment after the formation with a gas of fluoro-containing compound (such as $CF_4$) so that the surface thereof is treated to be ink-rejecting. The ink-rejecting black matrix 12 may be obtained according to a method other than the above-described plasma treatment. For example, the ink-rejecting black matrix can be obtained by producing the black matrix using a material comprising an ink-rejecting agent, or using an ink-rejecting material.

Next, a fluid composition 13', e.g., a solution, which exhibits an intended optical anisotropy, is ejected by using an ink jet apparatus to the fine areas separated by the black matrix 12, if desired, having been subjected to the above mentioned ink-rejecting treatment, to form layers of the fluid on the fine areas. The fluid preferably comprises at least one type of liquid crystalline compound and is preferably prepared so that it forms a liquid crystal phase after drying. The fluid is merely required to have sufficient properties for ejection from an ink jet apparatus, and any types of fluid may be used. Although dispersions in which a part or whole of material such as a liquid crystalline compound are dispersed may be used, solutions are preferably used. After being ejected to the fine areas, the fluid is dried to form a liquid crystal phase, and is subjected to irradiation with light, to form a first optically anisotropic layer 13 (FIG. 1(C)). In order to form a liquid crystal phase, if desired, it may be heated, and, in that case, any heating apparatus may be used.

To each optically anisotropic layer 13 formed in the manner described above as a first layer, an ink fluid 14' is secondarily ejected (FIG. 1(D)), dried and, if desired, subjected to irradiation with light to form a color filter layer 14 as a second layer (FIG. 1(E)).

There is no particular limitation on the ejection condition of the fluid such as ink upon forming the optically anisotropic layer 13 and color filter layer 14, but, when a fluid for forming the optically anisotropic layer and an ink for forming the color filter layer have a high viscosity, it is preferred to eject these with a reduced viscosity under room temperature or elevated temperatures (such as 20-70° C.) in terms of ejection stability. Since the variation of viscosity of the ink etc. has directly a significant influence on the droplet size and droplet ejection rate to result in an image quality degradation, the temperature of ink etc. is preferably kept as constant as possible.

An ink jet head (hereinafter, it may also be simply referred to as a head) for use in the process of the invention is not particularly limited, and publicly known various ones can be used. A head of the continuous type or dot on-demand type may be used. Among the dot on-demand type, as a thermal head, a type having such operative valve for ejection as described in JPA No. H9-323420 is preferred. In the case of a piezo head, for example, heads described in EP 277,703 A, EP 278,590 A etc. can be used. A head having a temperature-controlling function is preferred so that the temperature of a composition can be regulated. It is preferred that the ejection temperature is controlled so that the viscosity at ejection becomes 5-25 mPa·s, and that the composition temperature is controlled so as to give the fluctuation range of the viscosity of +5% or less. As to the drive frequency, operation at 1-500 kHz is preferred.

The order of the optically anisotropic layer 13 and the color filter layer 14 may be interchanged, that is, the optically anisotropic layer 13 may be formed on the color filter layer 14. The embodiment can be produced by interchanging the order of the step of forming the optically anisotropic layer 13 and the step of forming the color filter layer 14 in the above example of the producing process.

In addition, a step of preparing an alignment layer may be carried out prior to the step of preparing the optically anisotropic layer. For example, the alignment layer can be prepared by applying a fluid material containing polyvinyl alcohol, soluble polyimide or the like to a surface, drying it to form a polymer layer, and, if necessary, rubbing the surface of the polymer film. The fluid containing a liquid crystal compound for preparing the first optically anisotropic layer may be ejected to the rubbed surface of the alignment layer. The alignment layer may be prepared according to an ink-jet method or any methods other than the ink-jet method.

The optically anisotropic layer 13 may be formed by using a fluid, such as a solution, of the same type, or may be formed by using different fluids, such as solutions, containing materials different from each other and/or having different formulations (blending amounts) from each other so that each of them exhibits the optical anisotropy optimized relative to each hue of the color filter layer 14 that is formed thereon. When plural different fluids are used relative to hues of the color filter layer, the first optically anisotropic layer 13 may be formed by carrying out the ejections of all of the fluids one after another, and then drying them concurrently, or by carrying out the set of the ejection of each fluid and drying it repeatedly. Similarly, the color filter layer 14 may be formed by carrying out the ejections of all of the ink fluids (e.g., ink fluids for preparing an R layer, G layer and B layer) one after another, and then drying them concurrently, or by carrying out the set of the ejection of each fluid and drying it repeatedly. In addition, the color of a color filter needs not to be limited to three colors of red, green and blue. A color filter may be of multi-primary colors.

Thus, the first substrate, having thereon an optically anisotropic layer 13 and a color filter layer 14 at each fine area, corresponding each pixel, separated by black matrix 12 (barrier wall), is obtained. As mentioned above, the first optically layer 13 and the color filter layer 14 are formed by ejecting the fluid, which is prepared so as to exhibit a predetermined optical anisotropy, and the ink-fluid (e.g., red, green or blue ink fluid), and then drying them. After that, the first substrate is laminated with the second substrate. Before the lamination, a transparent electrode layer and/or an alignment layer maybe formed on the color filter layer 14. For example, as described in JPA No. H11-248921 and Japanese Patent No. 3255107, it is preferred, in terms of cost reduction, to form a base by superimposing colored resin compositions forming a color filter, forming a transparent electrode thereon, and, according to need, forming a spacer by superimposing protrusions for divided alignment.

A liquid crystal material may be poured into a gap between the facing surfaces of the first and second substrates to form a liquid crystal layer; and, then, a liquid crystal cell is produced. The first substrate is preferably disposed so that the surface on which the optically anisotropic layer and the color filter layer have been formed lies inside, that is, becomes a facing surface. Then, polarizing plates, optical compensatory films etc. can be laminated on the outside surfaces of both substrates, respectively, to produce a liquid crystal display device.

According to the process of the invention, after forming barrier walls corresponding a black matrix, the fluid for forming an optically anisotropic layer and the ink fluids for forming a color filter layer are applied to predetermined regions by using an ink jet system; and, therefore, it is possible to form accurately the optically anisotropic layer and the color filter layer in predetermined regions on the first substrate. Consequently, the desired liquid crystal cell can be obtained, without making the construction complex, with a small number of steps.

In the description of the method of the invention, an example was adopted in which the ink ejection by an ink jet method was used to form an optically anisotropic layer and color filter layer in respective fine areas. However, the liquid crystal display device or the color filter plate of the invention is not limited to the embodiment produced by such method, and, needless to say, embodiments, in which an optically anisotropic layer and/or a color filter layer has been formed by utilizing a method other than the ink jet method, for example, a printing method or the like, also fall within the scope of the invention.

[Substrate]

Among pair of substrates employed in the liquid crystal display device of the invention, at least one of them has a laminate body of a patterned optically anisotropic layer for viewing angle compensation of a liquid crystal cell and a color filter layer thereon. In addition, the optically anisotropic layer preferably has the optical property optimized, in terms of viewing angle compensation of the liquid crystal cell, relative to the hue of the color filter layer (for example, for each color of R, G, B) disposed on or under thereof. Such substrate may be used for either one, or both of a pair of substrates of a liquid crystal cell. There is no particular limitation on the material of the substrate provided that it is transparent, desirably it has a small birefringence, and glass, a low birefringence polymer or the like is used.

Figure 2:
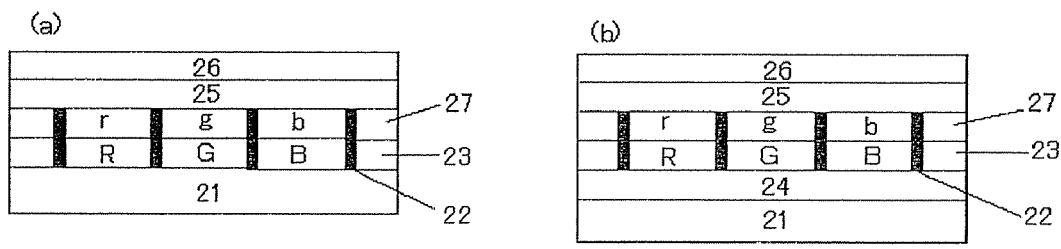
FIG. 2 is a rough cross-sectional drawing of one example of a substrate employed in the liquid crystal display device of the invention.

FIG. 2 shows a rough cross-sectional drawing of one example of substrate that can be utilized for the liquid crystal display device of the invention.

The liquid crystal cell substrate, shown in FIG. 2(A), comprises a black matrix 22 disposed on a transparent substrate 21 as the barrier wall, and a patterned color filter layer 23 and a first optically anisotropic layer 27 formed by ejection from an ink jet system, on fine areas separated by the barrier wall. It further has a transparent electrode layer 25 and an alignment layer 26 thereon. In FIG. 2, an embodiment is shown in which the color filter layer 23 of R, G, B has been formed, but a color filter layer composed of a layer of R, G, B, W (white), which is frequently used recently, may be formed. The optically anisotropic layer 27 is divided into respective r, g, b regions, which have the optimal retardation for respective hues of R, G, B of the filter layer 23.

Further, as shown in FIG. 2(B), the liquid crystal cell may comprise two optically anisotropic layers, that is, the patterned first optically anisotropic layer 27 and the unpatterned (solid) second optically anisotropic layer 24. When comprising two optically layers, the unpatterned second optically anisotropic layer 24 may be formed on the color filter plate having the patterned first optically anisotropic layer 27 thereon, or, although not shown as a drawing, it may be formed on the another substrate facing the color filter plate. Another substrate facing the color filter plate generally has a driving electrode such as a TFT array electrode thereon. And, therefore, being employed in an active TFT LCD, the layer 24 is preferably disposed above a silicon layer, in terms of heat-resistance of the optically anisotropic layer, however, the position of the layer 24 is not limited to this position.

[Liquid Crystal Display Device]

Figure 3:
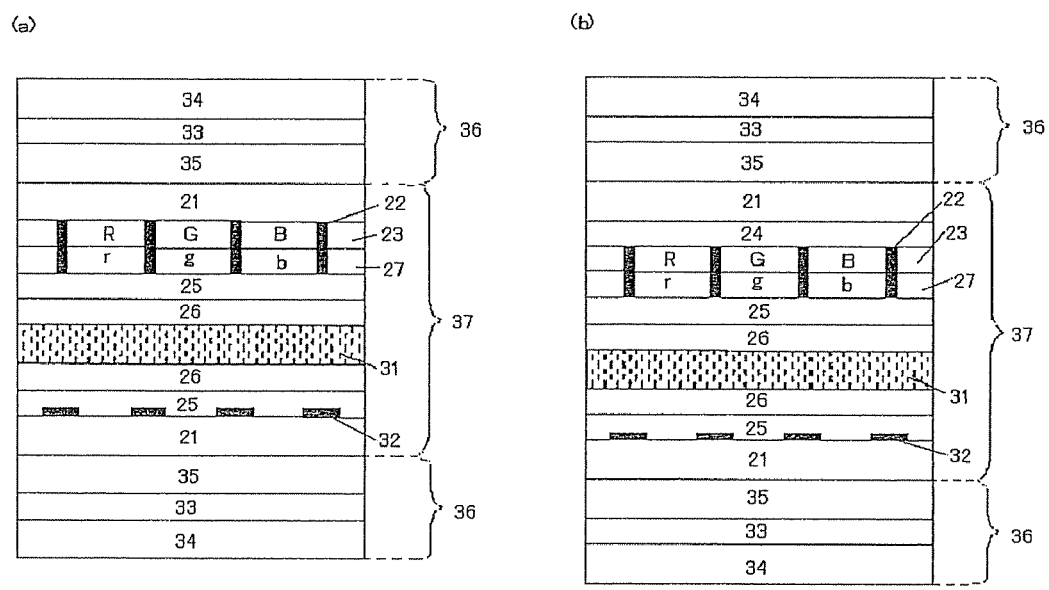
FIG. 3 is a rough cross-sectional drawing of one example of the liquid crystal display device of the invention.

FIG. 3 is a rough cross-sectional drawing of one example of the liquid crystal display device of the invention.

Each of examples in FIGS. 3(A) and 3(B) is a liquid crystal display device comprising a liquid crystal cell 37 which comprises the substrate shown in either FIG. 2(A) or 2(B) as an upper substrate, the glass substrate 21 having a transparent electrode layer 25 with a TFT matrix 32 and an alignment layer 26 thereon as an opposed substrate, and liquid crystal 31 therebetween. On both surface sides of the liquid crystal cell 37, there is disposed a polarizing plate 36 composed of protective layers 34 and 35 and a polarizing layer 33 between them. The protective layers 34 and 35 may be a polymer film such as a cellulose triacetate (TAC) film. The polymer film to be used as the protective layer 35 disposed on the liquid crystal cell side may be selected from polymer films having optical properties required for an optical compensatory sheet, or may be selected from same alternatives as those for the protective layer 34.

Although not shown as a drawing, an embodiment of a reflective liquid crystal display device may comprise a single polarizing plate disposed on the viewer side, and a reflective film disposed on the backside of the liquid crystal cell or on the inside face of the downside substrate of the liquid crystal cell. Of course, a front light may be provided on the viewer side of the liquid crystal cell. One possible embodiment of the invention is a semi-transmissive liquid crystal display device, comprising a transmissive portion and a reflective portion provided in each pixel. There is no particular limitation on the display mode to be employed in the liquid crystal display device of the invention, and the invention can be employed in any types of liquid crystal display devices such as transmissive and reflective liquid crystal display devices. Among these, there have been demands for improvements in viewing angle properties, in terms of color, of VA and IPS mode liquid crystal display devices; and the invention is effective in the VA and IPS mode embodiments.

Hereinafter, for this embodiment, materials to be used for producing, producing processes or the like will be described in detail, but the invention is not limited to this embodiment. In addition, for other embodiments, it is possible to produce these while referring to the following description and conventionally publicly known methods.

[Substrate]

According to the liquid crystal display device of the invention, the substrate having the optically anisotropic layer and the color filter layer thereon is not particularly limited, and substrates composed of various materials conventionally used as a substrate for a liquid crystal cell can be used. For example, a metallic substrate, metal-laminated substrate, glass, ceramic, synthetic resin film can be used. Particularly preferably, glass and a synthetic film having transparency and a good dimension stability can be mentioned.

[First Optically Anisotropic Layer]

According to the invention, the substrate has at least a first optically anisotropic layer thereon. There is no limitation on materials and processes to be used for preparing the first optically anisotropic layer, provided that it is possible to obtain the first optically anisotropic layer which can exhibit an Re, being not 0, for incoming light in at least a direction, namely exhibit anisotropic properties; however, in terms of easiness of preparing it in a liquid crystal cell and easiness of controlling its optical properties, it is preferable that the first optically anisotropic layer is formed by fixing a liquid crystal phase of a composition containing a liquid crystal compound. The composition may be prepared so as to be UV-hardenable, and preferably contains a radical polymerization initiator and/or cation polymerization initiator. The composition may also comprise a compound having a polymerizable group that has reactivity to the polymerization initiator. Such polymerizable compound may be selected from liquid crystalline compounds or from compounds capable of existing in liquid crystal phase without destroying the state; or may be added to the liquid crystal phase in an amount less than a sufficient amount to destroy the state. The addition amount is preferably 0.1-50% by weight, further preferably 1.0-30% by weight of the solid content of the fluid composition.

According to the invention, the first optically anisotropic layer, as described above, contributes to compensating birefringence of the liquid crystal cell in the oblique viewing angle. According to one possible embodiment of the invention, the first optically anisotropic layer alone has sufficient viewing angle compensation performance; and according to another possible embodiment of the invention, the combination of the first optically anisotropic layer and other layer(s) has sufficient viewing angle compensation performance. The first optically anisotropic layer is preferably prepared by using a composition containing at least one liquid crystalline compound. Further, when the producing process of the invention is utilized, the first optically anisotropic layer is formed from a fluid, containing at least one type of liquid crystalline compound, which is prepared so as to exhibit optical anisotropy. The fluid may be prepared as a solution or a dispersion of the liquid crystalline compound, but the solution is preferred.

In general, liquid crystalline compounds can be classified into a rod-like type and a disc-shaped type on the basis of the molecular structure thereof. Examples of the rod-like type or the disc-shaped type liquid crystalline compound include low molecular type and high molecular type compounds. The term "polymer" generally means compounds having a polymerization degree of 100 or more (DoiMasao; Polymer Physics•Phase transition Dynamics, page 2 Iwanami Shoten, 1992). In the embodiment, although any types of liquid crystalline compounds can be used, the use of a rod-like liquid crystalline compound or a disc-shaped liquid crystalline compound is preferred. Mixtures of two types or more of the rod-like liquid crystalline compounds, two types or more of the disc-shaped liquid crystalline compounds, or the rod-like liquid crystalline compound and disc-shaped liquid crystalline compound may be used. In terms of small alteration due to temperature and humidity, at least one rod-like liquid crystalline compound or a disc-shaped liquid crystalline compound having a reactive group is preferably used for preparing the layer. The mixture being used, further preferably at least one type has two or more reactive groups in one liquid crystal molecule. Two types or more liquid crystalline compounds may be used, and in such a case, at least one type preferably has two or more reactive groups.

The thickness of the optically anisotropic layer is preferably 0.1 to 20 μm, further preferably 0.5 to 10 μm.

Examples of the rod-like liquid-crystalline compound include azomethine compounds, azoxy compounds, cyanobiphenyl compounds, cyanophenyl esters, benzoate esters, cyclohexanecarboxylic acid phenyl esters, cyanophenylcyclohexane compounds, cyano-substituted phenylpyrimidine compounds, alkoxy-substituted phenylpyrimidine compounds, phenyldioxane compounds, tolan compounds and alkenylcyclohexylbenzonitrile compounds. Not only the low-molecular-weight, liquid-crystalline compound as listed in the above, high-molecular-weight, liquid-crystalline compound may also be used. High-molecular-weight liquid-crystalline compounds may be obtained by polymerizing low-molecular-weight liquid-crystalline compounds having at least one polymerizable group. Among such low-molecular-weight liquid-crystalline compounds, liquid-crystalline compounds represented by a formula (I) are preferred.

$$Q^1\text{-}L^1\text{-}A^1\text{-}L^3\text{-}M\text{-}L^4\text{-}A^2\text{-}L^2\text{-}Q^2 \qquad \text{Formula (I)}$$

In the formula, $Q^1$ and $Q^2$ respectively represent a polymerizable group. $L^1$, $L^2$, $L^3$ and $L^4$ respectively represent a single bond or a divalent linking group, and it is preferred that at least one of $L^3$ and $L^4$ represents —O—CO—O—. $A^1$ and $A^2$ respectively represent a $C_{2\text{-}20}$ spacer group. M represents a mesogen group.

In formula (I), $Q^1$ and $Q^2$ respectively represent a polymerizable group. The polymerization reaction of the polymerizable group is preferably addition polymerization (including ring opening polymerization) or condensation polymerization. In other words, the polymerizable group is preferably a functional group capable of addition polymerization reaction or condensation polymerization reaction. Examples of polymerizable groups are shown below.

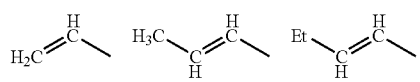

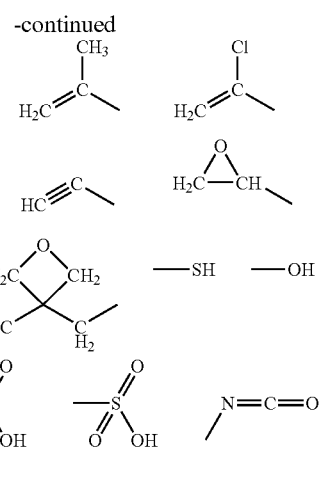

$L^1$, $L^2$, $L^3$ and $L^4$ independently represent a divalent linking group, and preferably represent a divalent linking group selected from the group consisting of —O—, —S—, —CO—, —NR$^2$—, —CO—O—, —O—CO—O—, —CO—NR$^2$—, —NR$^2$—CO—, —O—CO—, —O—CO—NR$^2$—, —NR—CO—O— and —NR$^2$—CO—NR$^2$—. $R^2$ represents a $C_{1\text{-}7}$ alkyl group or a hydrogen atom. It is preferred that at least one of $L^3$ and $L^4$ represents —O— or —O—CO—O— (carbonate group). It is preferred that $Q^1$-$L^1$ and $Q^2$-$L^2$-are respectively CH$_2$=CH—CO—O—, CH$_2$=C (CH$_3$)—CO—O— or CH$_2$=C(Cl)—CO—O—CO—O—; and it is more preferred they are respectively CH$_2$=CH—CO—O—.

In the formula, $A^1$ and $A^2$ preferably represent a $C_{2\text{-}20}$ spacer group. It is more preferred that they respectively represent $C_{2\text{-}12}$ aliphatic group, and much more preferred that they respectively represent a $C_{2\text{-}12}$ alkylene group. The spacer group is preferably selected from chain groups and may contain at least one unadjacent oxygen or sulfur atom. And the spacer group may have at least one substituent such as a halogen atom (fluorine, chlorine or bromine atom), cyano, methyl and ethyl.

Examples of the mesogen represented by M include any known mesogen groups. The mesogen groups represented by a formula (II) are preferred.

$$\text{—}(\text{—}W^1\text{-}L^5\text{)}_n\text{-}W^2\text{—} \qquad \text{Formula (II)}$$

In the formula, $W^1$ and $W^2$ respectively represent a divalent cyclic aliphatic group, a divalent aromatic group or a divalent hetero-cyclic group; and $L^5$ represents a single bond or a linking group. Examples of the linking group represented by $L^5$ include those exemplified as examples of $L^1$ to $L^4$ in the formula (I) and —CH$_2$—O— and —O—CH$_2$—. In the formula, n is 1, 2 or 3.

Examples of $W^1$ and $W^2$ include 1,4-cyclohexanediyl, 1,4-phenylene, pyrimidine-2,5-diyl, pyridine-2,5-diyl, 1,3,4-thiazole-2,5-diyl, 1,3,4-oxadiazole-2,5-diyl, naphtalene-2,6-diyl, naphtalene-1,5-diyl, thiophen-2,5-diyl, pyridazine-3,6-diyl. 1,4-cyclohexanediyl has two stereoisomers, cis-trans isomers, and the trans isomer is preferred. $W^1$ and $W^2$ may respectively have at least one substituent. Examples the substituent include a halogen atom such as a fluorine, chlorine, bromine or iodine atom; cyano; a $C_{1\text{-}10}$ alkyl group such as methyl, ethyl and propyl; a $C_{1\text{-}10}$ alkoxy group such as methoxy and ethoxy; a $C_{1\text{-}10}$ acyl group such as formyl and acetyl; a $C_{2\text{-}10}$ alkoxycarbonyl group such as methoxy carbonyl and ethoxy carbonyl; a $C_{2\text{-}10}$ acyloxy group such as acetyloxy and propionyloxy; nitro, trifluoromethyl and difluoromethyl.

Preferred examples of the basic skeleton of the mesogen group represented by the formula (II) include, but are not to be limited to, these described below. And the examples may have at least one substituent selected from the above.

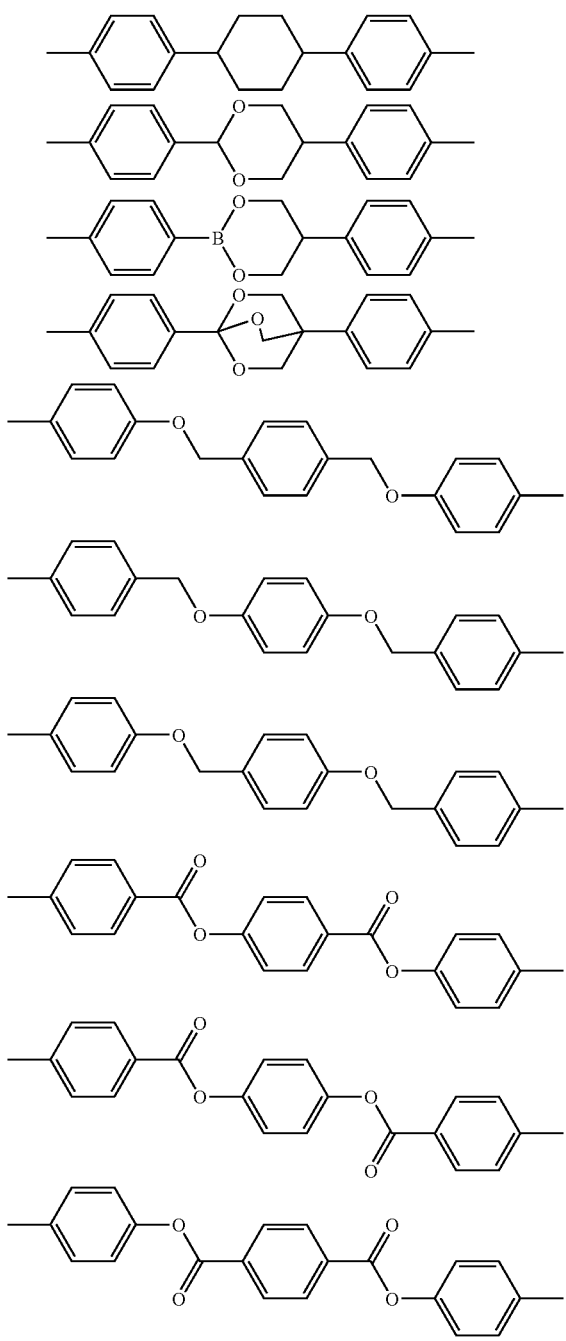
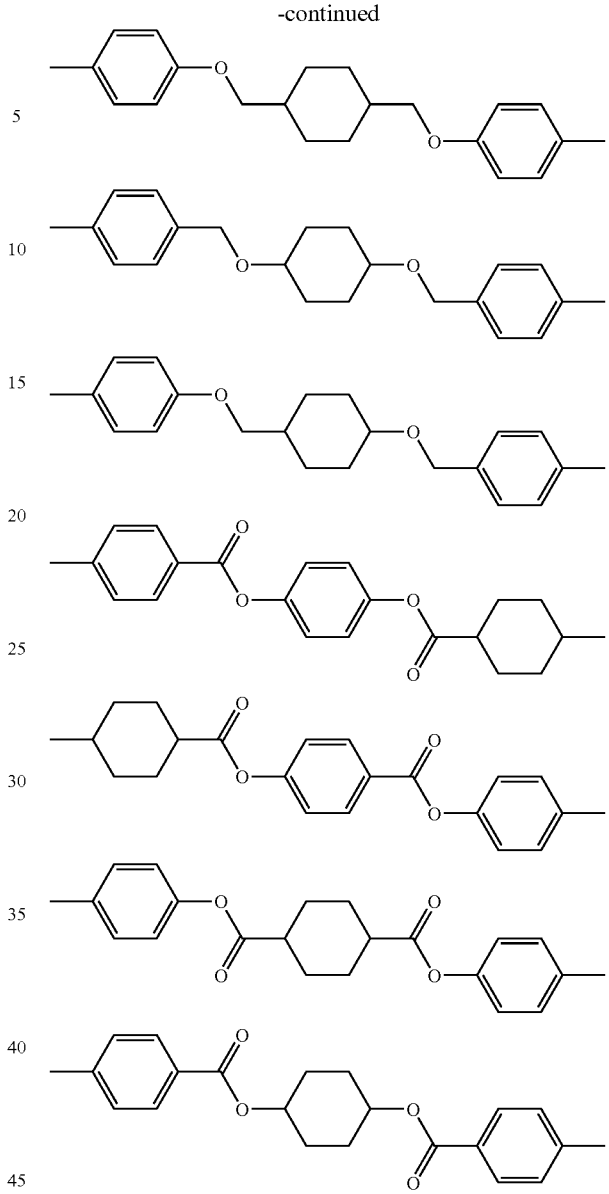
Examples the compound represented by the formula (I) include, but are not to be limited to, these described below. The compounds represented by the formula (I) maybe prepared according to a method described in a gazette of Tokkohyo No. hei 11-513019.
I-1
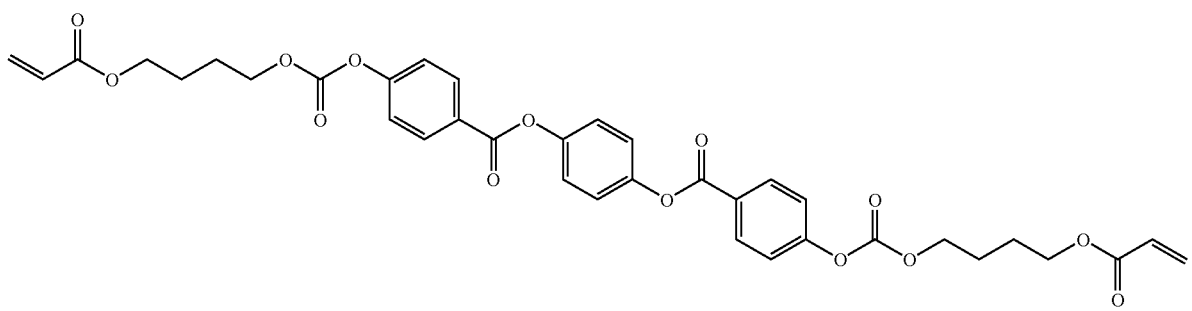

-continued
I-2
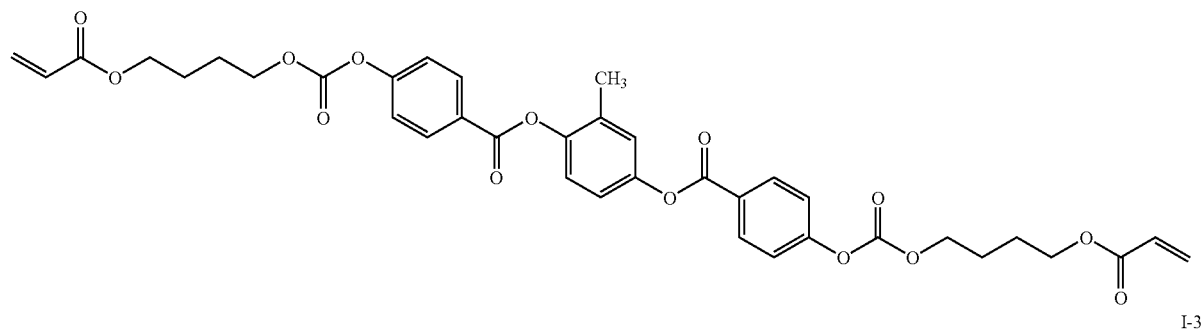
I-3
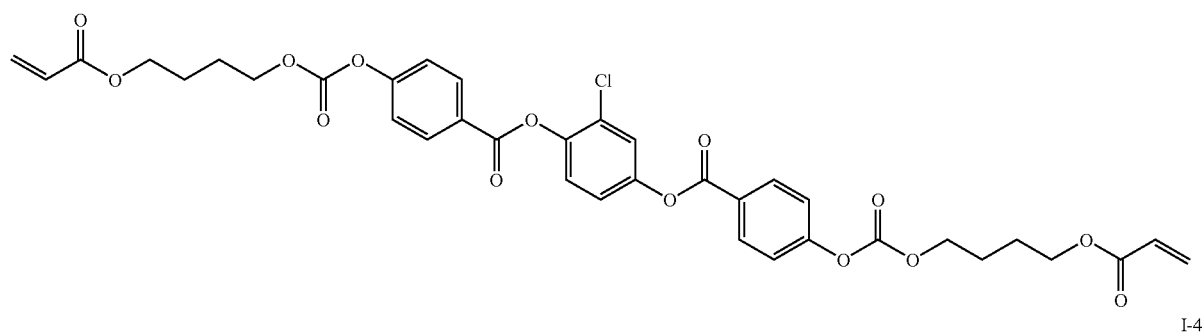
I-4
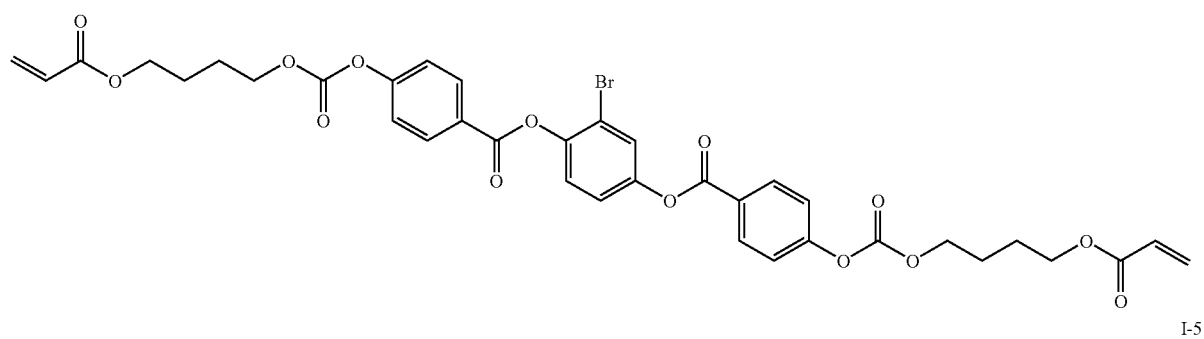
I-5
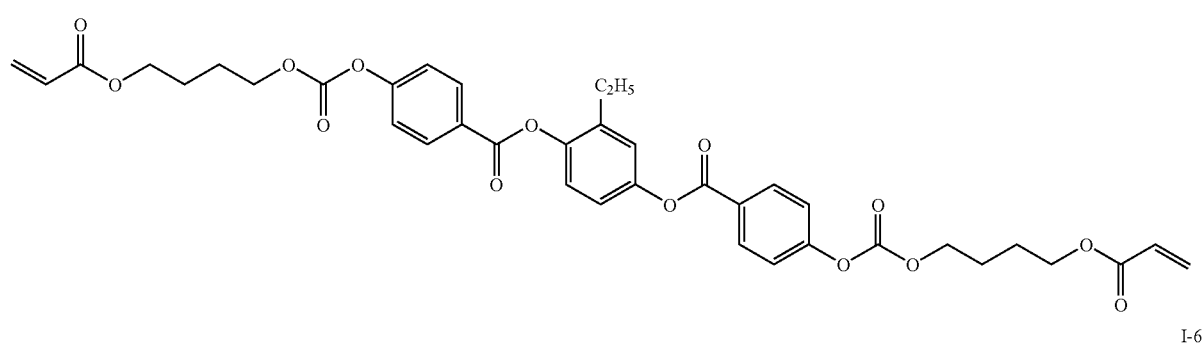
I-6
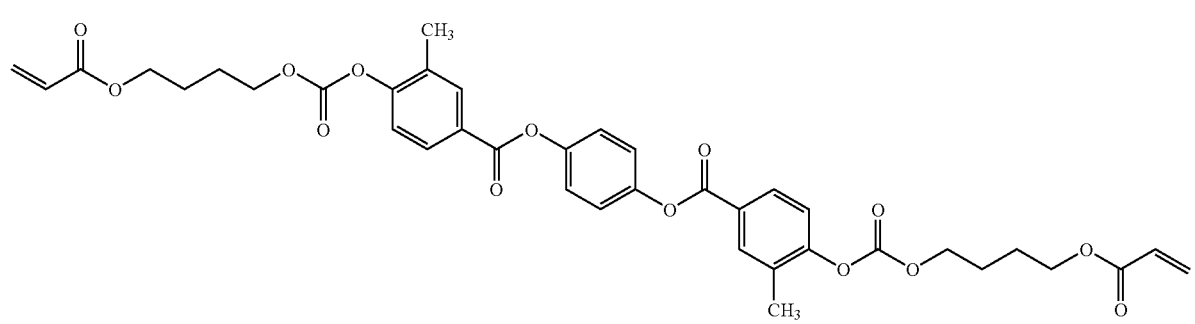

-continued
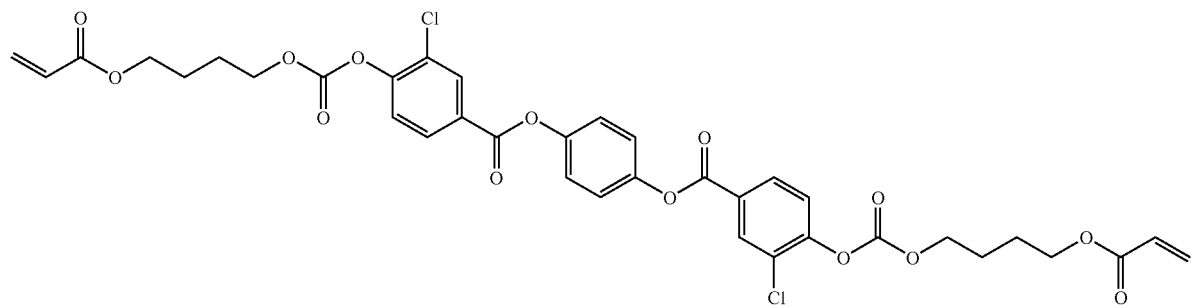
I-7
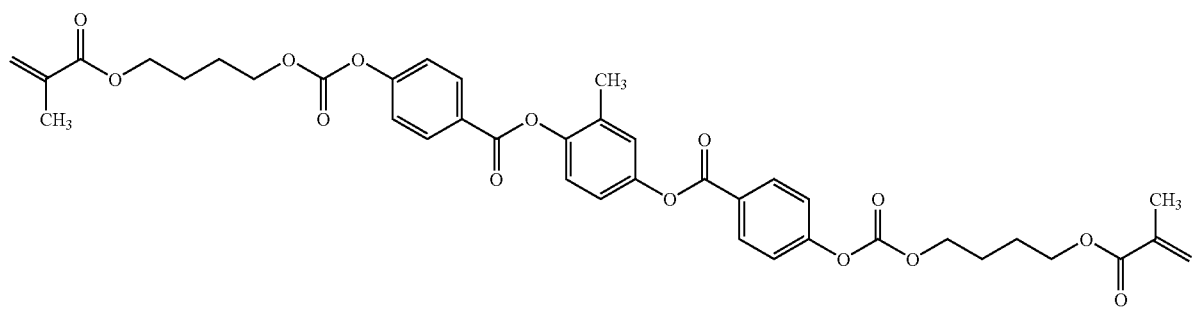
I-8
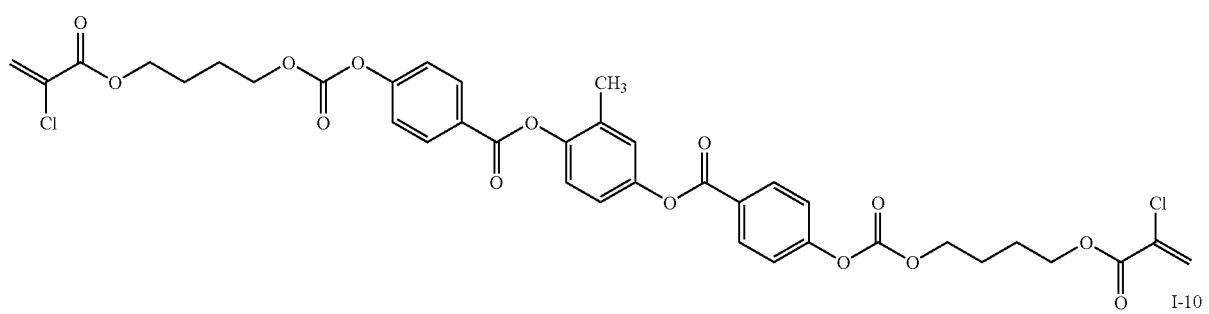
I-9
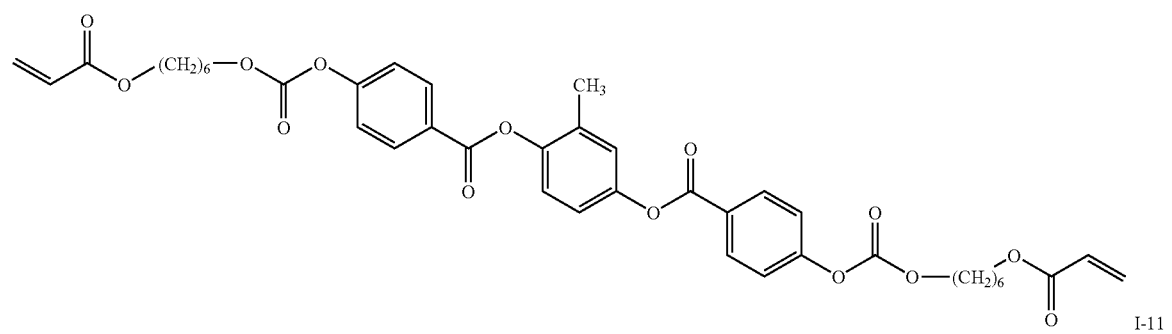
I-10
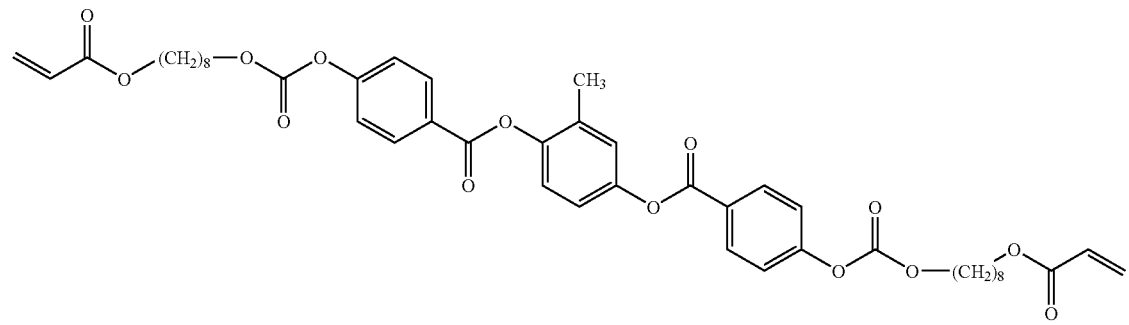
I-11

-continued
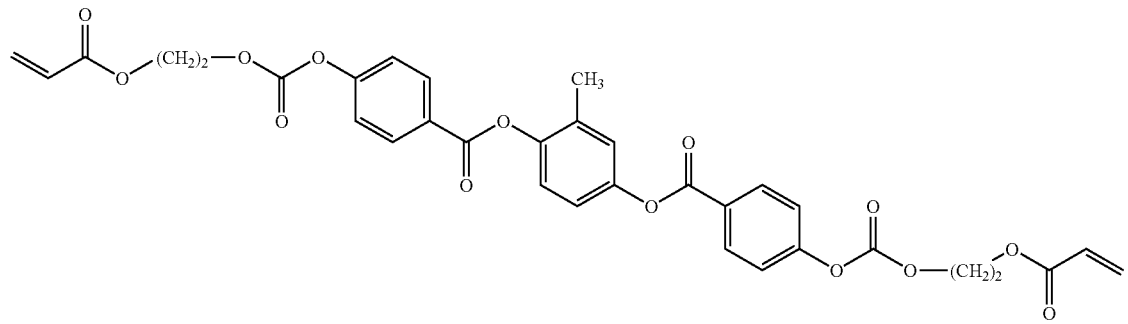
I-12
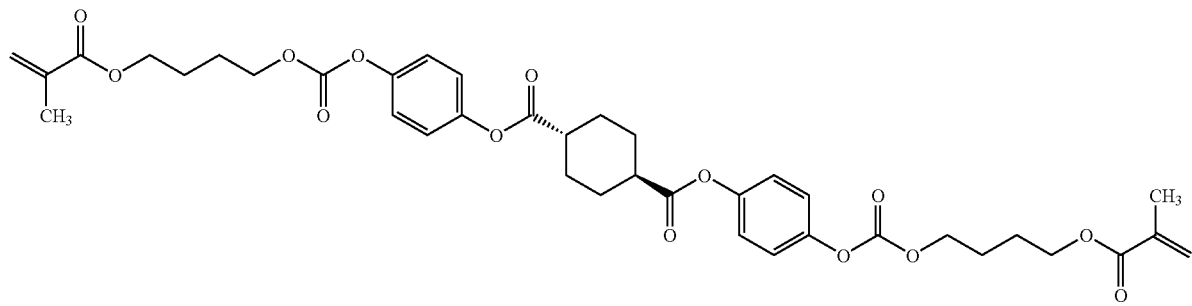
I-13
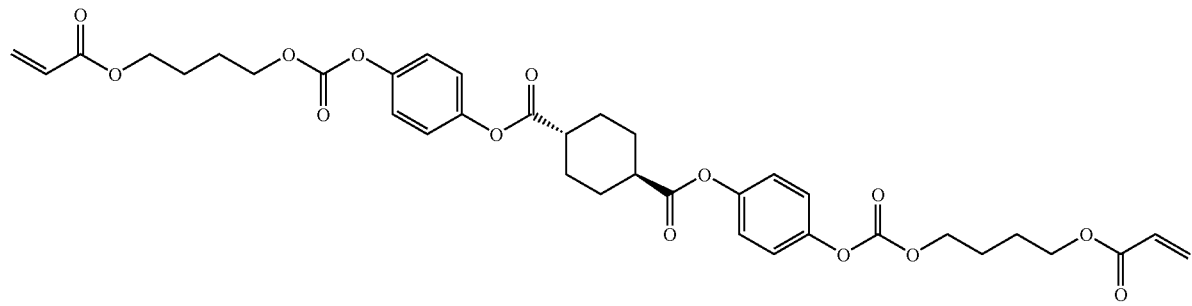
I-14
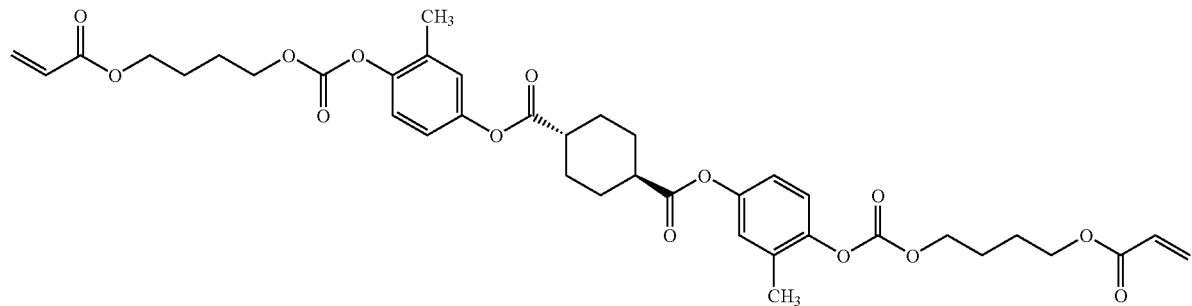
I-15
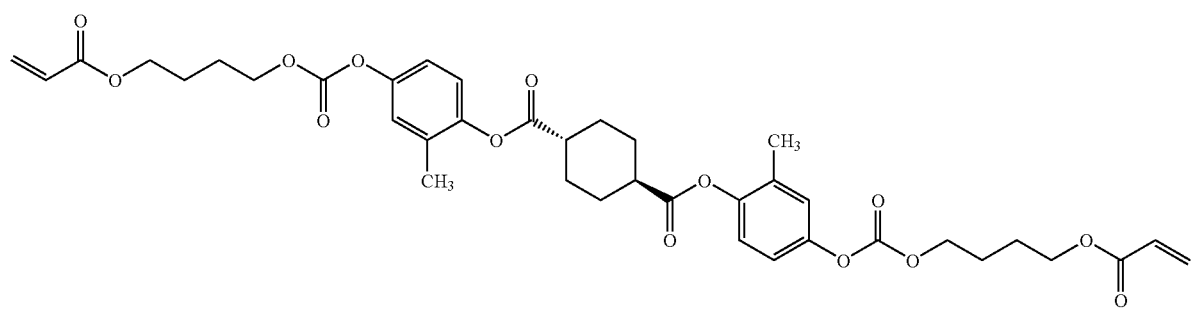
I-16

I-17
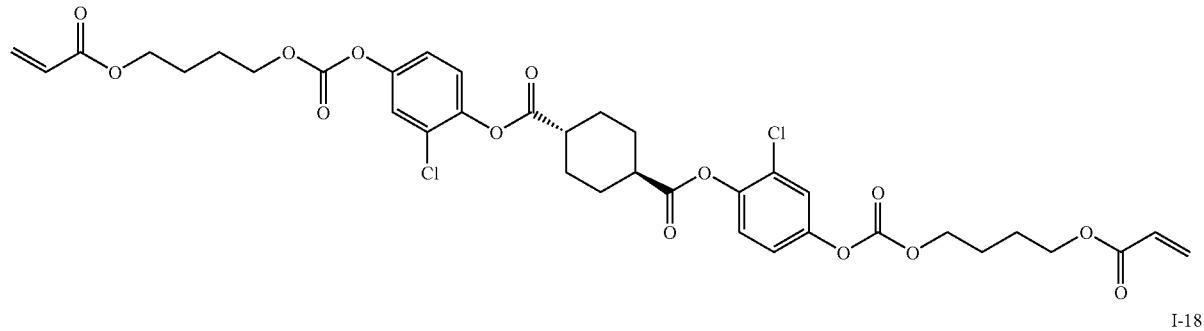
I-18
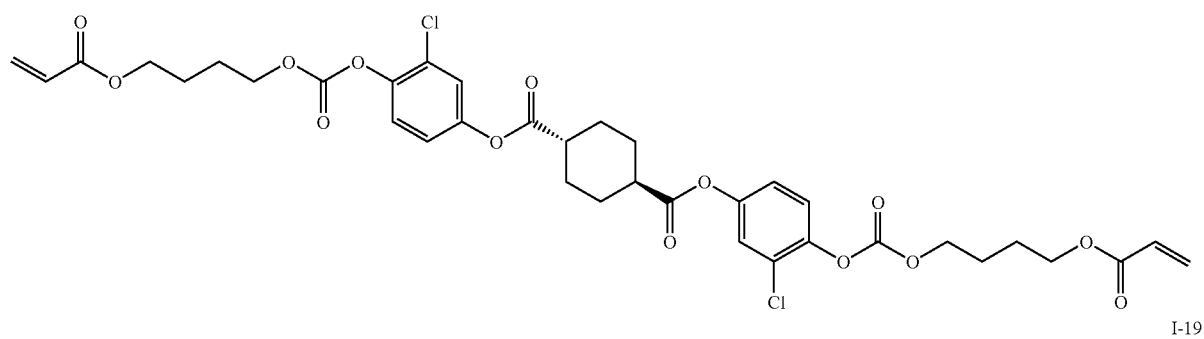
I-19
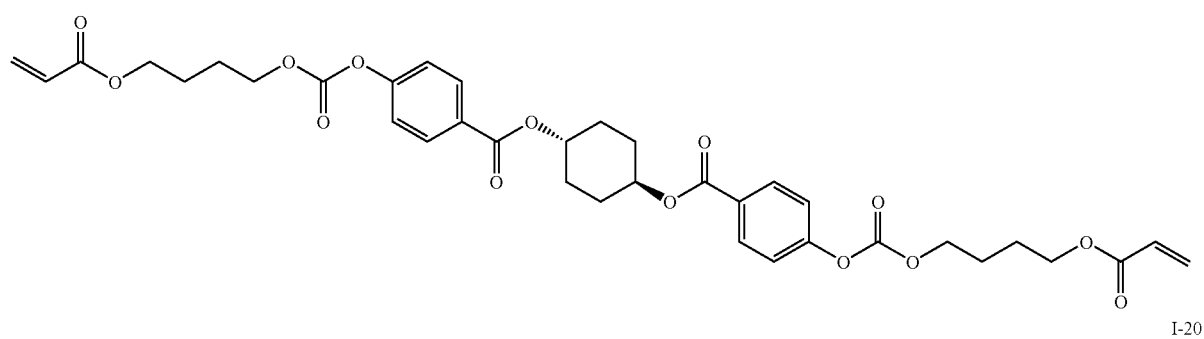
I-20
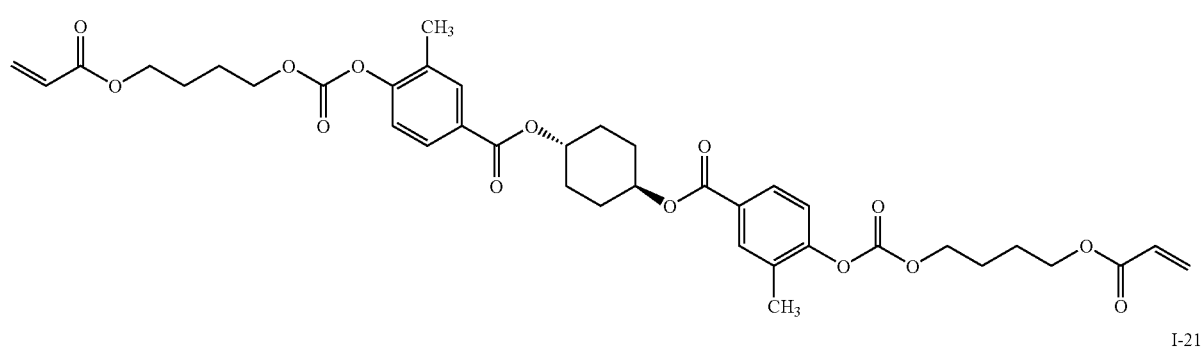
I-21
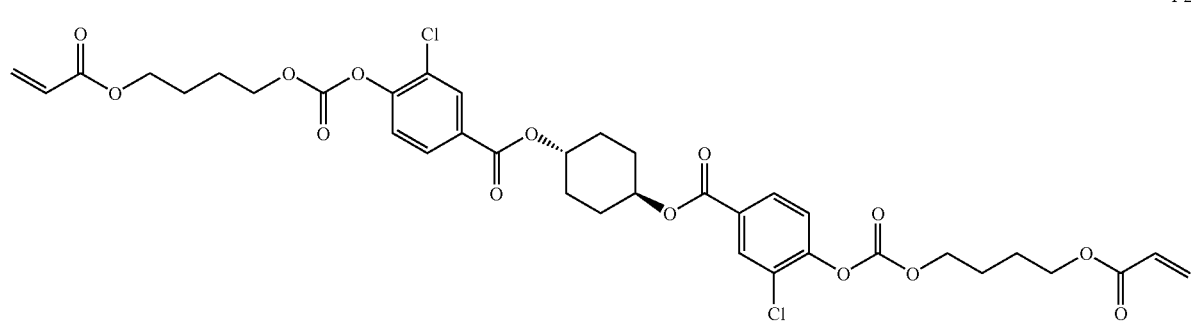

-continued
I-22
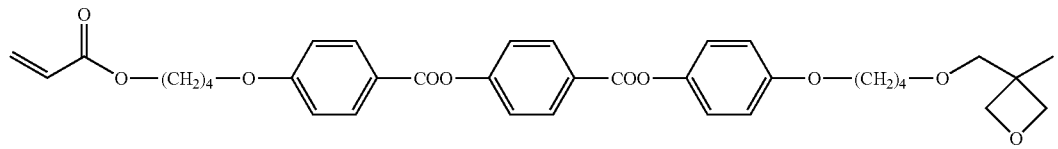
I-23
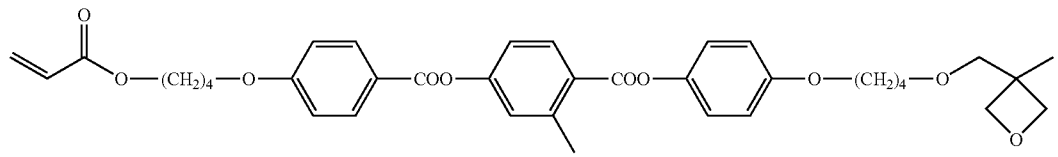
I-24
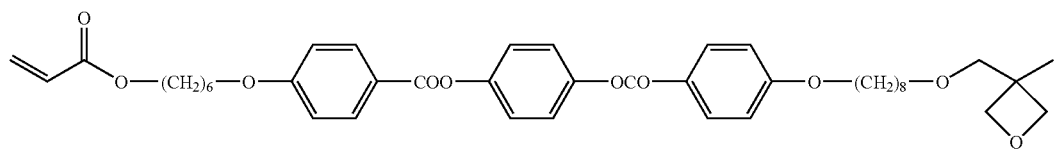
I-25
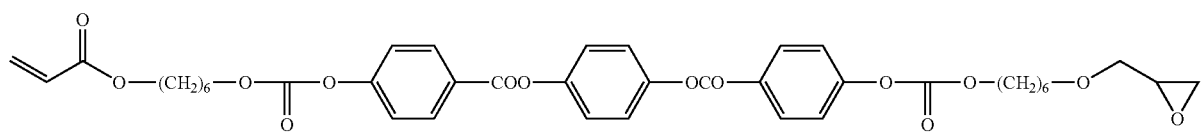
I-26
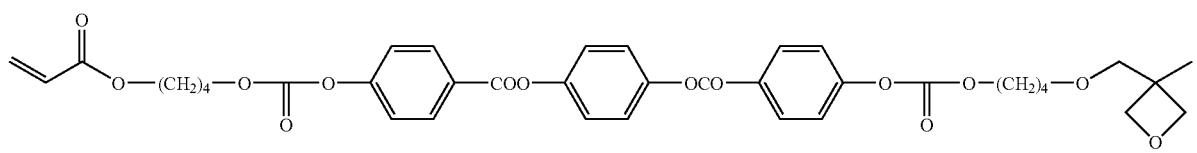
I-27
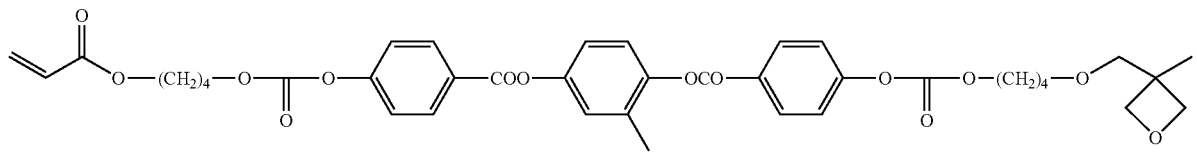
I-28
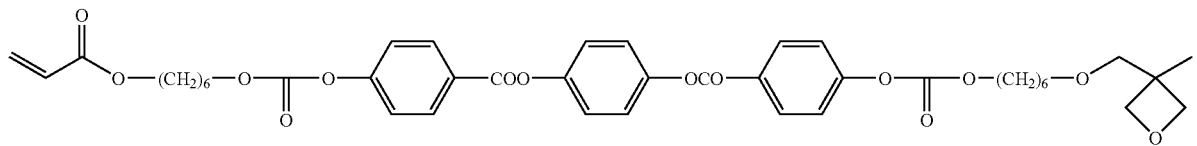
I-29
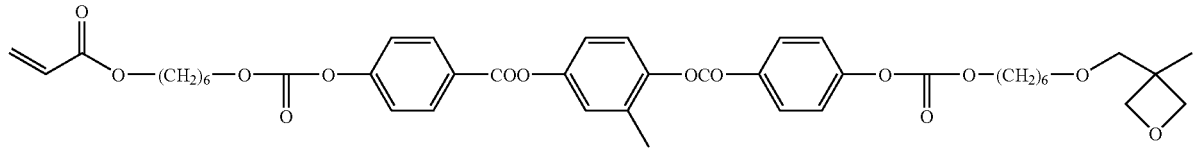

The rod-like liquid crystal compounds may be selected from any liquid crystal compounds exhibiting a smectic A. Examples of such liquid crystal compound include, but are not to be limited to, those shown below.
(II-25)
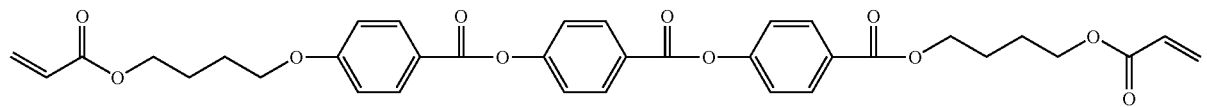
(II-26)
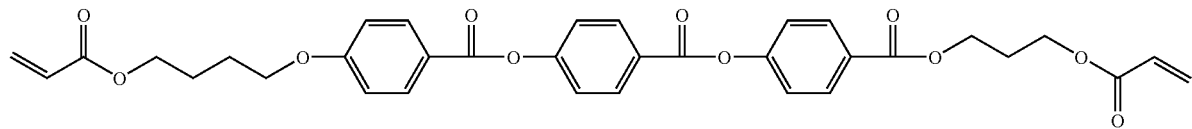
(II-27)
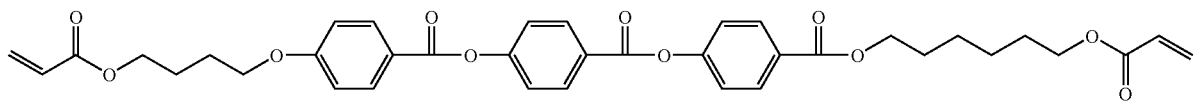
(II-28)
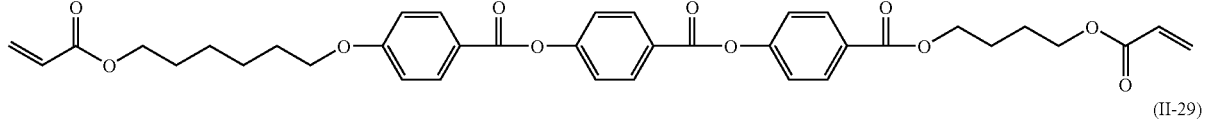
(II-29)
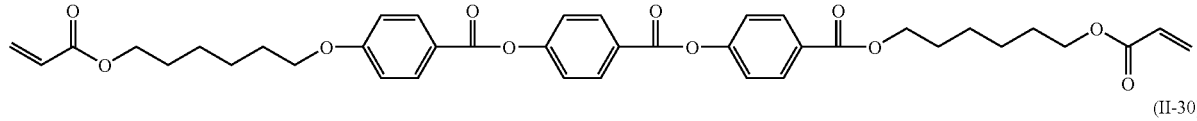
(II-30)
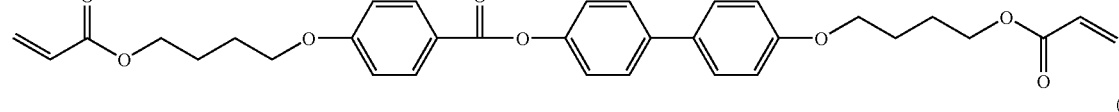
(II-31)
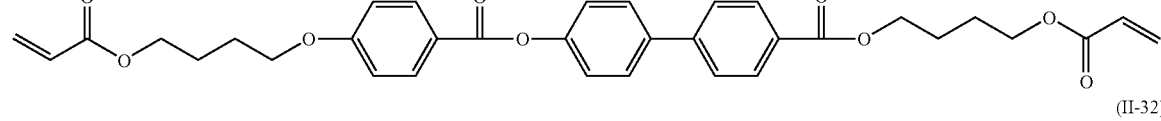
(II-32)
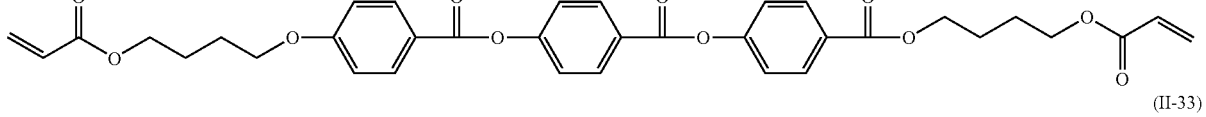
(II-33)
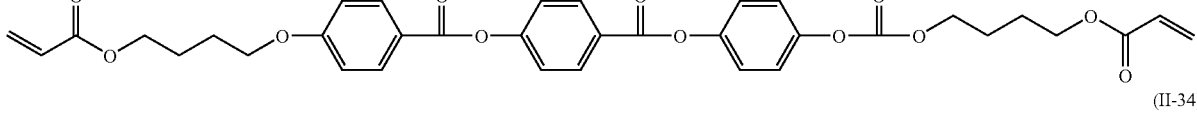
(II-34)
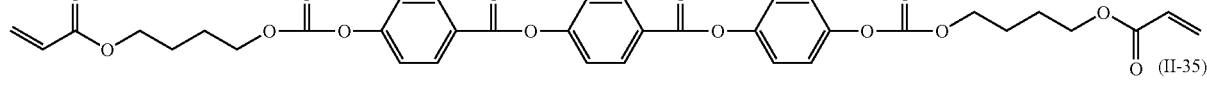
(II-35)
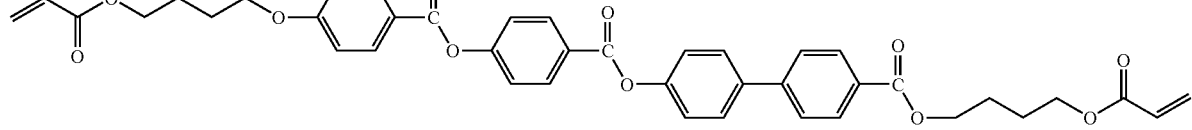

-continued
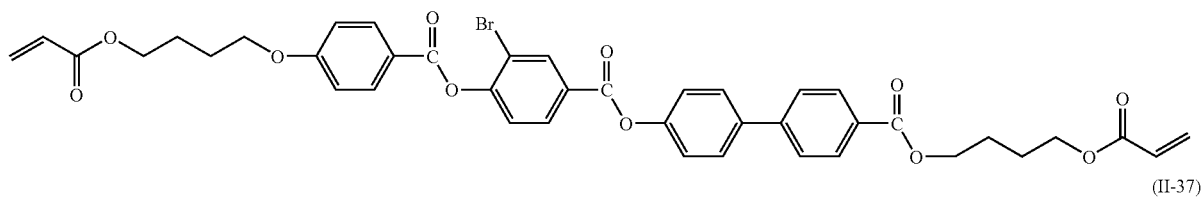
(II-36)
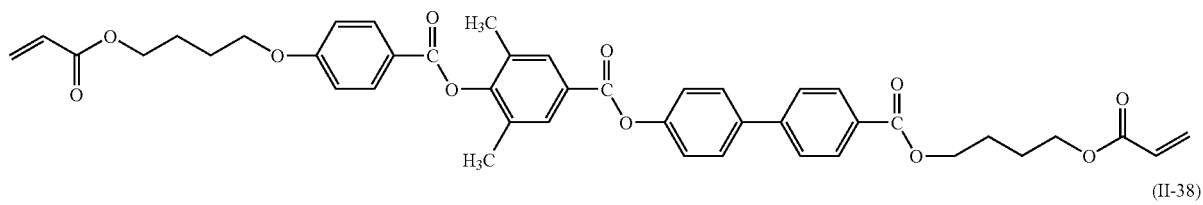
(II-37)
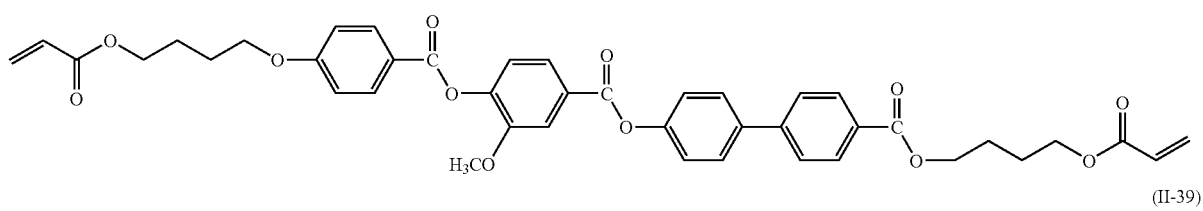
(II-38)
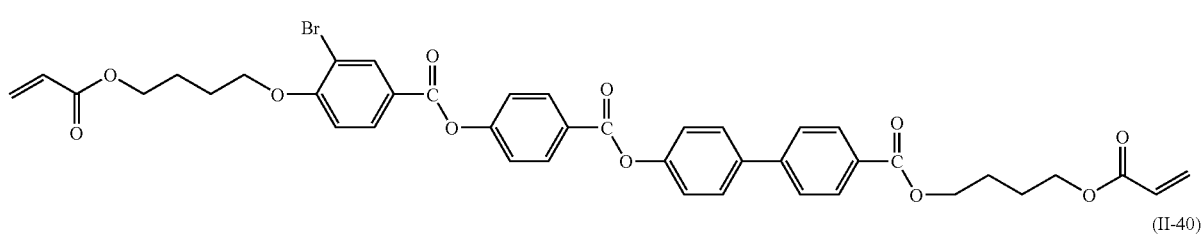
(II-39)
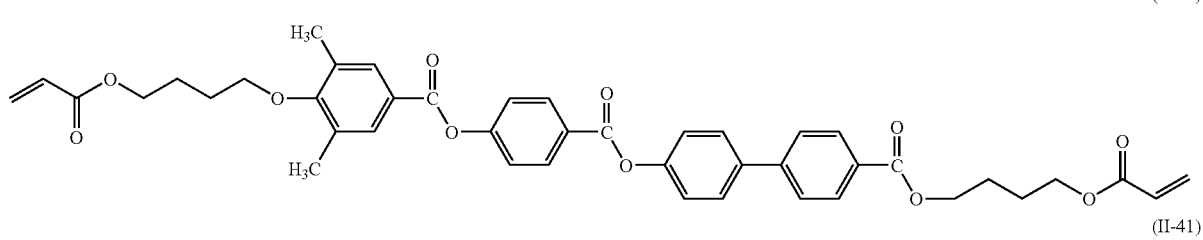
(II-40)
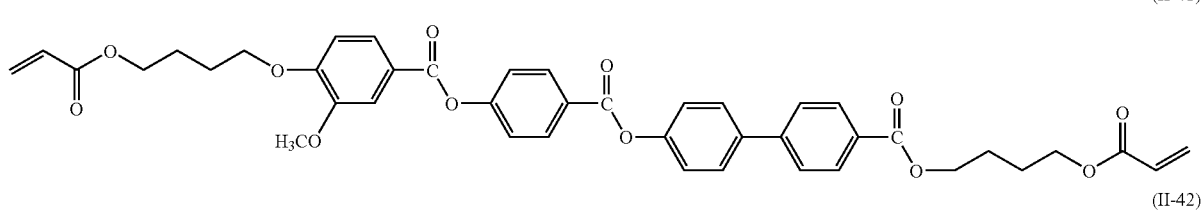
(II-41)
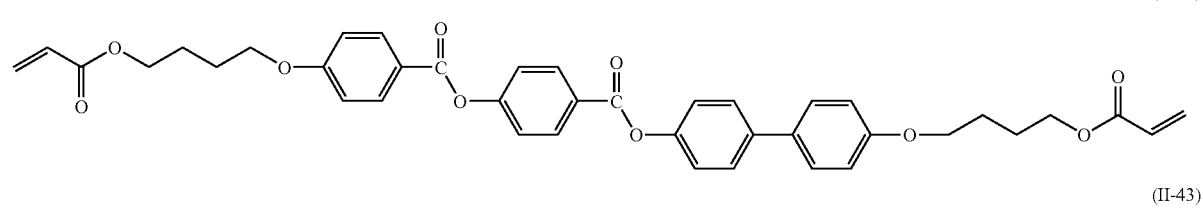
(II-42)
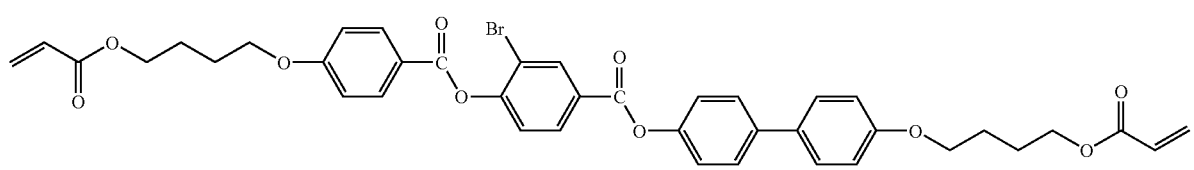
(II-43)

As one embodiment of the invention, there is an embodiment in which a discotic liquid crystal is used for preparing he optically anisotropic layer. The optically anisotropic layer is preferably a layer of polymer obtained by polymerization (curing) of a layer constituted of a low molecular weight liquid crystalline discotic compound such as monomer, or a polymerizable liquid crystalline discotic compound. Examples of the discotic (disc-like) compound include benzene derivatives described in a research paper of C. Destrade et al., Mol. Cryst. vol. 71, p 111 (1981), truxene derivatives described in research papers of C. Destrade et al., Mol. Cryst. vol. 122, p 141 (1985), Physicslett, A, vol. 78, p 82 (1990), cyclohexane derivatives described in a research paper of B. Kohne, et al., Angew. Chem. vol. 96, p 70 (1984), and azacrown-based and phenylacetylene-based macrocycles described in a research paper of J. M. Lehnet al., J. Chem. Commun., p 1794 (1985) and in a research paper of J. Zhang et al., J. Am. Chem. Soc. vol. 116, p 2655 (1994). The discotic (disc-like) compound generally has such construction that these molecules lie as a disk-like mother nucleus at the molecule center, to which such groups (L) as linear alkyl groups or alkoxy groups, or substituted benzoyloxy groups are substituted radially. It shows liquid crystalline properties and includes compounds generally called discotic liquid crystal. When aggregates of such molecules align evenly, a negative optically uniaxial property is shown, but the instance is not limited to this description. Further, in the invention, "it has been formed from a disk-like compound" does not necessarily mean that the finally formed compound is the aforementioned compound. For example, when the aforementioned low molecular discotic liquid crystal has a group capable of reaction by heat, light etc., a compound, which is resulted from polymerization or crosslinking through the reaction by heat, light etc. to have a high molecular weight and lose liquid crystalline property, is also included.

According to the invention, the discotic liquid-crystalline compound represented by the formula (III) shown below are preferably used.

D(-L-P)$_n$    Formula (III)

In the formula, D is a discotic core; L represents a divalent liking group; P represents a polymerizable group; n is an integer ranging from 4 to 12.

Preferred examples of the discotic core (D), the divalent linking group (L) and the polymerizable group (P) are respectively (D1) to (D15), (L1) to (L25) and (P1) to (P18) described in JPA No. 2001-4837; and the descriptions regarding the discotic core (D), the divalent linking group (L) and the polymerizable group (P) may be preferably applicable to this embodiment.

Preferred examples of the discotic compound are shown below.

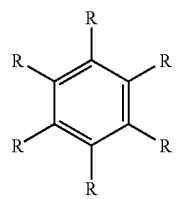

TE-1

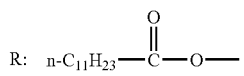

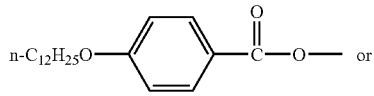

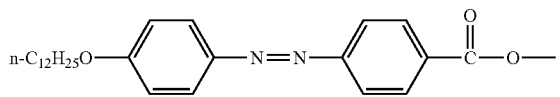

TE-2

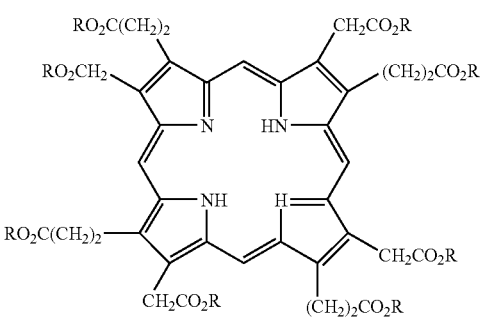

TE-3

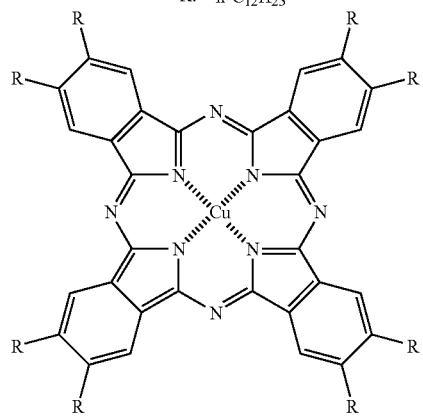

TE-4

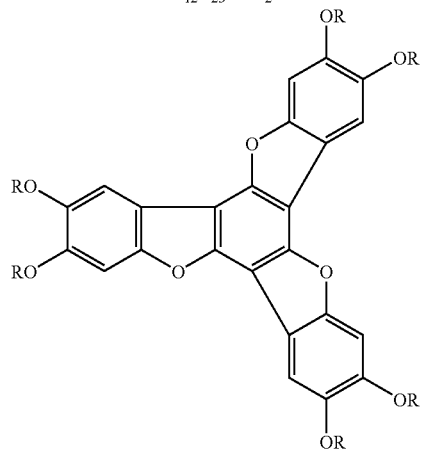

-continued
TE-5
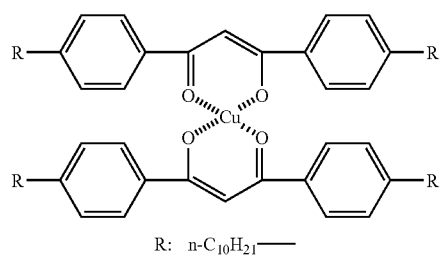
R: n-C₁₀H₂₁—
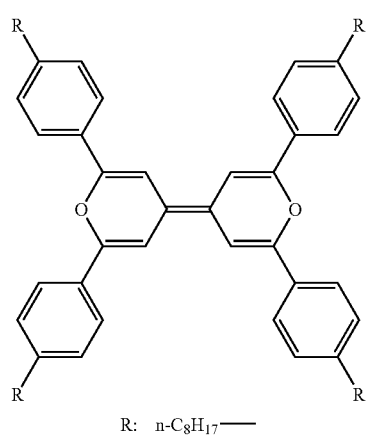
R: n-C₈H₁₇—
TE-6
TE-7
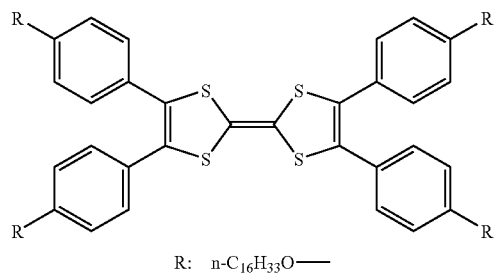
R: n-C₁₆H₃₃O—
TE-8
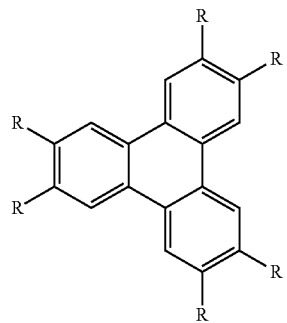
(1)
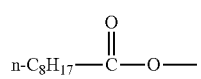
n-C$_m$H$_{2m+1}$O—
m: an integer from 2 to 15
(2)
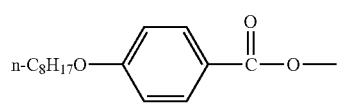
(3)
-continued
(4)
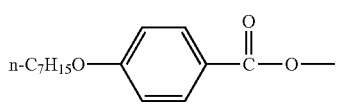
(5)
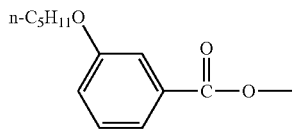
(6)
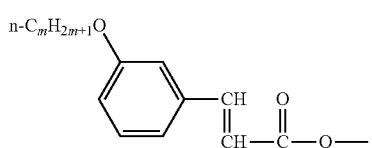
m: an integer from 7 to 10
(7)
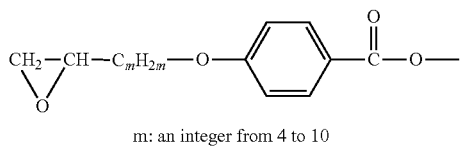
m: an integer from 4 to 10
(8)
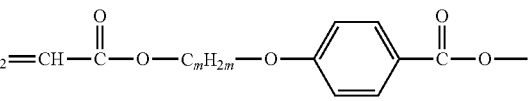
m: an integer from 4 to 10
TE-9
(1)
R: n-C₁₀H₂₁C(O)O—
(2)
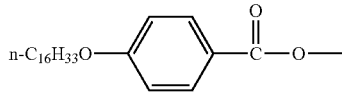
(3)
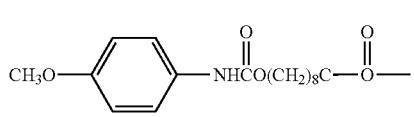

-continued

TE-10

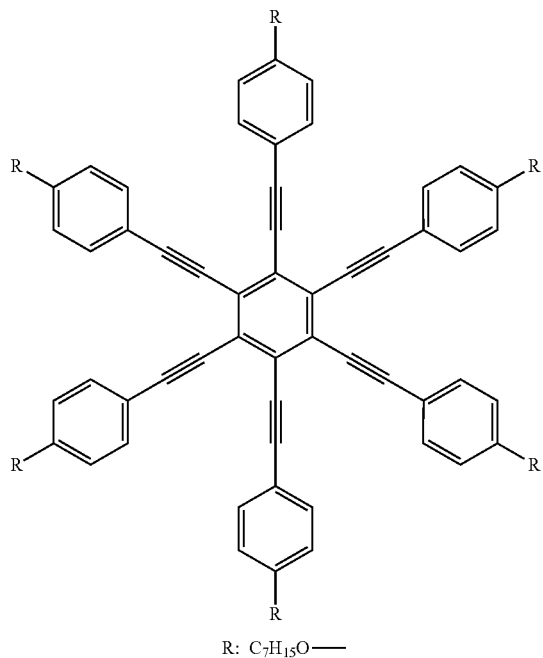

R: C$_7$H$_{15}$O—

TE-11

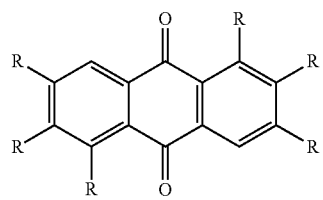

R: n-C$_{13}$H$_{27}$$\overset{O}{\overset{\|}{C}}$—O— (1)

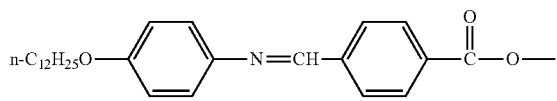 (2)

The aforementioned optically anisotropic layer is preferably a layer prepared by applying a fluid containing a liquid crystalline compound (for example, a solution of a liquid crystalline compound) to regions separated by the black matrix (barrier walls) with an ink jet system, aligning the same in an alignment state showing an intended liquid crystal phase, and then stabilizing the aligned state by irradiation with heat or ionizing radiation. When the optically anisotropic layer shows biaxial property, it is possible to compensate accurately the viewing angle of various types of liquid crystal cells, in particular a liquid crystal cell of the VA mode, which is preferred. Preferable examples of the liquid crystal composition capable of exhibiting biaxial property include those described in JPA No. 2005-338744. Using a rod-like liquid-crystalline compound to form a film exhibiting optical biaxiality, it is necessary to align rod-like molecules in a twisted cholesteric orientation, or in a twisted hybrid cholesteric orientation in which the tilt angles of the molecules are varied gradually in the thickness-direction, and then to distort the twisted cholesteric orientation or the twisted hybrid cholesteric orientation by irradiation of polarized light. Examples of the method for distorting the orientation by the polarized light irradiation include a method of using a dichroic liquid-crystalline polymerization initiator (EP1389199A1), and a method of using a rod-like liquid-crystalline compound having in the molecule thereof a photo-alignable functional group such as cinnamoyl group (JPA No. 2002-6138). The present invention can adopt any of these methods.

When a rod-like liquid crystalline compound and disc-shaped liquid crystalline compound having a reactive group are used as a liquid crystalline compound, they may have been stabilized in any alignment state of horizontal alignment, vertical alignment, tilt alignment, hybrid alignment and twisted alignment. The horizontal alignment means that an alignment state in which discotic molecules are aligned with their core disc-planes parallel to the layer plane. But, it does not require that they are parallel strictly and means, in the present description, that an alignment has an inclination angle of less than 10 degrees that is formed relative to the horizontal plane.

When laminating two or more optically anisotropic layers formed of a liquid crystalline composition, there is no particular limitation on the combination of liquid crystalline compounds. Thus, a laminate of layers all of which comprise stabilized disc-shaped liquid crystalline compounds, a laminate of layers all of which comprise stabilized rod-like liquid crystalline compounds, and a laminate of a layer comprising a stabilized disc-shaped liquid crystalline compound and a layer comprising a stabilizing rod-like liquid crystalline compound may be used. There is also no particular limitation on the combination of alignment states of respective layers. Optically anisotropic layers having the same alignment states may be laminated, or optically anisotropic layers having different alignment states may be laminated.

[A-Plate or C-Plate]

The term "positive C-plate" is used for any monoaxial birefringent layers with the optical axis along with the thickness direction, in which the thickness-direction refraction index is larger than the in-plane refraction index. A positive C-plate may be prepared by curing a polymerizable liquid crystal composition in a vertical alignment state.

The term "positive A-plate" used for any monoaxial birefringent layers with the optical axis parallel to the layer plane, in which the slow axis refraction index is lager than the thickness-direction refraction index. A positive A-plate may be prepared by curing a polymerizable rod-like liquid crystal composition in a homogenous alignment state.

A positive A-plate may be employed as a second optically anisotropic layer described later. When a positive A-plate is prepared as a second optically anisotropic layer, rod like liquid crystal to be used for preparing it is preferably selected from those exhibiting a nematic phase and/or a smectic A phase and having Δn showing a reverse dispersion wavelength-dependency in visible region, in particular, having Δn satisfying the following relational expressions (I) and (II), and more preferably satisfying (I)-1 and (II)-1:

$$\Delta n(450 \text{ nm})/\Delta n(550 \text{ nm}) < 1 \quad (I)$$

$$\Delta n(650 \text{ nm})/\Delta n(550 \text{ nm}) > 1 \quad (II)$$

$$0.60 < \Delta n(450 \text{ nm})/\Delta n(550 \text{ nm}) < 0.99 \quad (I)\text{-}1$$

$$1.01 < \Delta n(650 \text{ nm})/\Delta n(550 \text{ nm}) < 1.35 \quad (II)\text{-}1$$

By employing liquid crystal materials having Δn showing a reverse dispersion wavelength-dependency in visible region, it is possible to produce the first optically anisotropic layer as a positive A-plate and C-plate, having Re showing a reverse dispersion wavelength-dependency in visible region, without controlling the thickness layers of the first optically anisotropic layers disposed on fine areas. It is also possible to produce a positive A-plate satisfying the relational expression, Re (Red)>Re (Green)>Re (blue) by controlling the thickness layers of the first optically anisotropic layers disposed on red, green and blue areas. In such a case, liquid crystal to be used for preparing it may be selected for any liquid crystals such as those having Δn satisfying or not satisfying the relational expressions (I) and (II). It is to be noted that Re(Red), Re(Green) and Re (blue) respectively means in-plane retardations of the areas of the first optically anisotropic layer respective disposed on or under the red areas, green areas and blue areas of the color filter layer such as an RGB color filter and RGBW color filter.

Examples of the rod-like liquid crystal satisfying the expressions (I) and (II) include those described in the specification of Japanese Patent Application No. 2006-339233 as the compounds represented by the formula (1) or (2), such as those shown below.

The first optically anisotropic layer is preferably formed by applying a coating fluid containing a liquid crystalline compound, undermentioned polymerization initiator and other additives to a surface with an ink jet system. As the solvent for use in preparing the coating fluid, an organic solvent is preferably used. Examples of the organic solvent include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone), and ethers (e.g., tetrahydrofuran, 1,2-dimethoxyethane). Alkyl halides and ketones are preferred. Two or more types of organic solvent may be used in a mixture.

[Stabilizing Alignment State of Liquid Crystal Composition]

After being aligned in a predetermined alignment state, the liquid crystal composition is stabilized in the state. Stabilizing is preferably carried out by the polymerization reaction of the polymerizable groups contained in the liquid-crystalline molecules. The polymerization reaction includes thermal

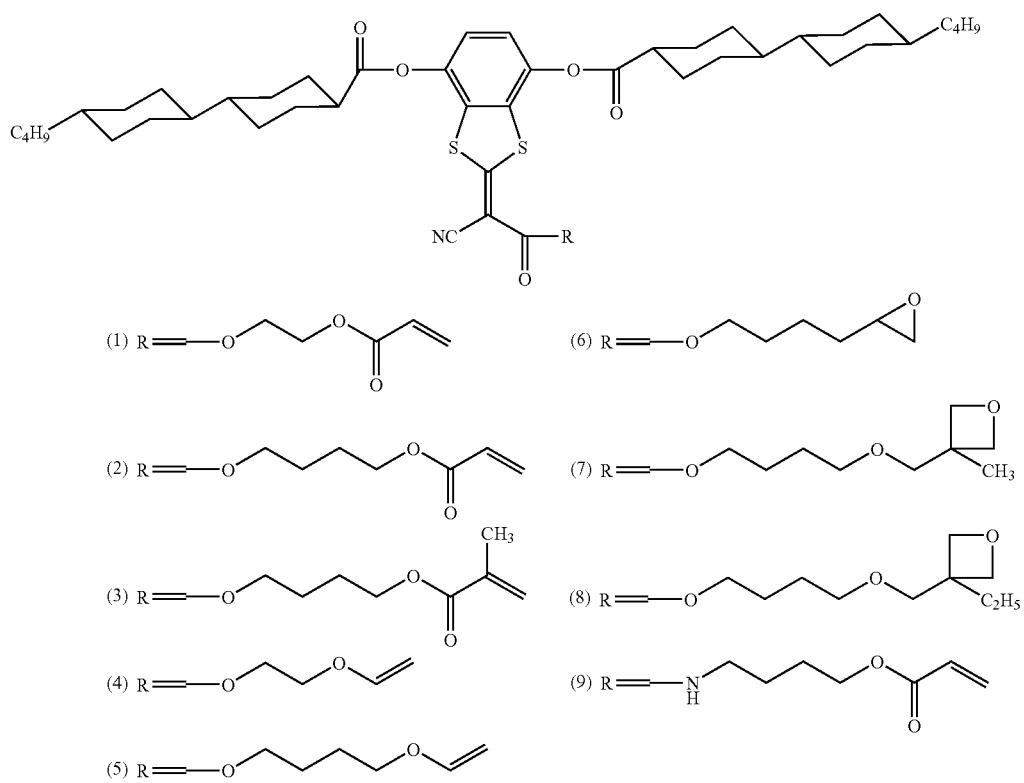

The term "negative C-plate" is used for any monoaxial birefringent layers with the optical axis along with the thickness direction, in which the thickness-direction refraction index is smaller than the in-plane refraction index. A negative C-plate may be prepared by curing a polymerizable discotic liquid crystal composition in a horizontal alignment state, or by curing a polymerizable rod-like liquid crystal composition in a cholesteric alignment state.

The term "negative A-plate" used for any monoaxial birefringent layers with the optical axis parallel to the layer plane, in which the slow axis refraction index is equal to the thickness-direction refraction index. A negative-plate may be prepared by curing a polymerizable discotic liquid crystal composition in a vertical alignment state.

polymerization reaction using a thermal polymerization initiator and photo-polymerization reaction using a photo-polymerization initiator. Photo-polymerization reaction is preferred. Examples of photo-polymerization initiators include alpha-carbonyl compounds (described in U.S. Pat. Nos. 2,367,661 and 2,367,670), acyloin ethers (described in U.S. Pat. No. 2,448,828), alpha-hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimers and p-aminophenyl ketone (described in U.S. Pat. No. 3,549,367), acridine and phenazine compounds (JPA No. S 60-105667 and U.S. Pat. No. 4,239,850) and oxadiazole compounds (described in U.S. Pat. No. 4,212,970).

The amount of the photo-polymerization initiators to be used is preferably 0.01 to 20% by weight, more preferably 0.5 to 5% by weight on the basis of solids in the coating liquid. Irradiation for polymerizing the liquid-crystalline molecules preferably uses UV rays. The irradiation energy is preferably 20 mJ/cm² to 10 J/cm², and more preferably 100 to 800 mJ/cm². Irradiation may be carried out in a nitrogen gas atmosphere and/or under heating to accelerate the photo-polymerization reaction.

The first optically anisotropic layer may exhibit in-plane retardation attributed to photoinduced orientation with the aid of polarized light irradiation. The polarized light irradiation may be carried out at the same time with photo-polymerization process in the fixation of orientation, or the polarized light irradiation may precede and then may be followed by non-polarized light irradiation for further fixation, or the non-polarized light irradiation for fixation may precede and the polarized light irradiation may succeed for the photoinduced orientation. The optically anisotropic layer exhibiting in-plane retardation attributed to the photoinduced orientation with the aid of the polarized light irradiation is excellent in particular for optical compensation of VA-mode liquid crystal display device.

[Photo-alignment by Irradiation of Polarized Light]

The aforementioned first optically anisotropic layer may be a layer in which an in-plane retardation has been expressed by the photo-alignment through irradiation of polarized light. In order to obtain a large in-plane retardation, it is necessary to effect the irradiation of polarized light firstly after coating and aligning a liquid crystalline compound layer. The irradiation of polarized light is preferably carried out under an inert gas atmosphere with an oxygen concentration of 0.5% or less. The irradiation energy is preferably from 20 mJ/cm² to 10 J/cm², further preferably 100-800 mJ/cm². The luminance is preferably 20-1000 mW/cm², more preferably 50-500 mW/cm², further preferably 100-350 mW/cm². Although there is no particular limitation on the type of liquid crystalline compound that is cured by the irradiation of polarized light, a liquid crystalline compound having an ethylenic unsaturated group as a reactive group is preferred. The irradiation wavelength has a peak preferably at 300-450 nm, further preferably at 350-400 nm.

[Post-curing by Irradiation of Ultraviolet Rays after Irradiation of Polarized Light]

By further irradiating the aforementioned first optically anisotropic layer with polarized or unpolarized ultraviolet rays after the initial irradiation of polarized light (irradiation for photo-alignment), the reaction rate of a reactive group is enhanced (post-curing) to allow the layer to be produced at a large transfer speed, as well as to be improved in adhesiveness etc. The post-curing may be effected by the irradiation of either polarized light or unpolarized light, but the use of polarized light is preferred. Further, twice or more of post-curing is preferred. In that case, polarized light alone, unpolarized light alone, or a combination of polarized and unpolarized lights may be used. In the case of the combination, polarized light is preferably irradiated prior to the irradiation of unpolarized light. At the irradiation of ultraviolet rays, the substitution by an inert gas may or may not be carried out, but the irradiation is preferably carried out under an inert gas atmosphere with an oxygen concentration of 0.5% or less. The irradiation energy is preferably from 20 mJ/cm² to 10 J/cm², further preferably from 100 to 800 mJ/cm². The illuminance is preferably from 20 to 1000 mW/cm², more preferably from 50 to 500 mW/cm², further preferably from 100 to 350 mW/cm². In the case of the irradiation of polarized light, the irradiation wavelength has a peak at preferably from 300 to 450 nm, further preferably from 350 to 400 nm. In the case of the irradiation of unpolarized light, it has a peak at preferably from 200 to 450 nm, further preferably from 250 to 400 nm.

The optical property of the aforementioned first optically anisotropic layer has been preferably regulated to the optimal optical properties for the viewing angle compensation upon the entrance of R light, G light and B light, respectively. That is, it is preferred that, when a color filter layer is colored in red to be used for forming an R layer of a color filter, the optical property of the optically anisotropic layer has been regulated to be optimal for the viewing angle compensation upon entrance of R light; when it is colored in green, the optical property of the optically anisotropic layer has been regulated to be optimal for the viewing angle compensation upon entrance of G light; and when it is colored in blue, the optical property of the optically anisotropic layer has been regulated to be optimal for the viewing angle compensation upon entrance of B light. The optical property of the optically anisotropic layer can be regulated in a preferable range, for example, by regulating the type of a liquid crystalline compound, type or addition amount of an alignment-controlling agent; the type of an alignment film, and rubbing treatment condition and thickness of an alignment film; or the condition of irradiation of polarized light.

[Aid for Horizontal Alignment]

At least one compound represented by a formula (1), (2) or (3) shown below may be added to the composition used for forming the optically anisotropic layer, in order to promote aligning the liquid-crystalline molecules horizontally. It is to be noted that the term "horizontal alignment" means that, regarding rod-like liquid-crystalline molecules, the molecular long axes thereof and a layer plane are parallel to each other, and, regarding discotic liquid-crystalline molecules, the disk-planes of the cores thereof and a layer plane are parallel to each other. However, they are not required to be exactly parallel to each other, and, in the specification, the term "horizontal alignment" should be understood as an alignment state in which molecules are aligned with a tilt angle against a layer plane less than 10 degree. The tilt angle is preferably from 0 to 5 degree, more preferably 0 to 3 degree, much more preferably from 0 to 2 degree, and most preferably from 0 to 1 degree.

The formula (1) to (3) will be described in detail below.

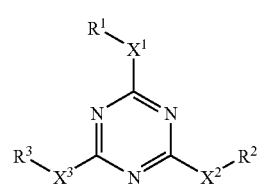

Formula (1)

In the formula, $R^1$, $R^2$ and $R^3$ respectively represent a hydrogen atom or a substituent; and $X^1$, $X^2$ and $X^3$ respectively represent a single bond or a divalent linking group. Preferred examples of the substituent represented by $R^1$, $R^2$ or $R^3$ include substituted or non-substituted alkyls (preferably non-substituted alkyls or fluoro-substituted alkyls), substituted or non-substituted aryls (preferably aryls having at least one non-substituted alkyl or fluoro-substituted alkyl), substituted or non-substituted aminos, substitute or non-substituted alkoxys, substituted or non-substituted alkylthios and halogens. The $X^1$, $X^2$ and $X^3$ respectively represent a divalent linking group; preferably represent a divalent group selected from the group consisting of an alkylene, an alkenylene, a divalent aromatic group, a divalent cyclic group, —CO—, —NR$^a$— (R$^a$ represents a C$_{1-5}$ alkyl or a hydrogen atom), —O—, —S—, —SO—, —SO$_2$— and combinations thereof; and more preferably represent a divalent linking group selected from the group consisting of an alkylene, phenylene, —CO—, —NR$^a$—, —O—, —S— and —SO$_2$— and any combinations thereof. The number of carbon atoms of the alkylene preferably ranges from 1 to 12. The number of carbon atoms of the alkenylene preferably ranges from 2 to 12. The number of carbon atoms of the divalent aromatic group preferably ranges from 6 to 10.

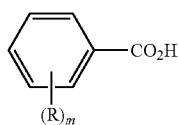

Formula (II)

In the formula, R represents a substituent, m is an integer from 0 to 5. When m is 2 or more, plural R may be same or different each other. Preferred examples of the substituent represented by R are same as those exemplified as examples of R$^1$, R$^2$ or R$^3$ in the formula (I). In the formula (II), m preferably represents an integer ranging from 1 to 3, and is more preferably 2 or 3.

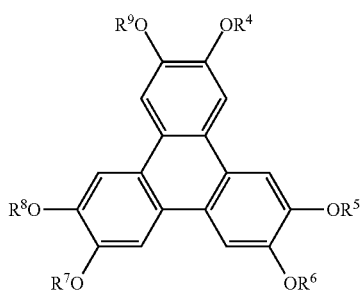

Formula (3)

In the formula, R$^4$, R$^5$, R$^6$, R$^8$ and R$^9$ respectively represent a hydrogen atom or a substituent. Preferred examples of the substituent represented by R$^4$, R$^5$, R$^6$, R$^7$, R$^8$ and R$^9$ are same as those exemplified as examples of R$^1$, R$^2$ or R$^3$ in the formula (I)

Examples of the planar alignment agent, which can be used in the present invention, include those described in JPA No. 2005-09924B and the methods for preparing such compounds are described in the document.

The amount of the compound represented by the formula (1), (2) or (3) is preferably from 0.01 to 20 weight %, more preferably from 0.01 to 10 weight % and much more preferably from 0.02 to 1 weight %. One type compound may be selected from the formula (1), (2) or (3) and used singly, or two or more type of compounds may be selected from the formula (1), (2) or (3) and used in combination.

[Aid for Vertical Alignment]

At least one compound capable of aligning liquid crystalline molecules in a substantial vertical alignment state at an air-interface or an alignment layer-interface may be added to the composition used for forming the optically anisotropic layer, so that liquid-crystalline molecules horizontally are substantially aligned vertically. Examples of the aid for vertical alignment of rod-like liquid crystal include those described in JPA No. 2006-106662; and examples of the method for controlling the vertical alignment of discotic liquid crystal include those described in JPA Nos. 2005-222004, 2005-196015, 2005-196016, 2006-85098, 2006-106662 and 2006-113500. It is to be noted that the term "vertical alignment" means that, regarding rod-like liquid-crystalline molecules, the molecular long axes thereof and a layer plane are vertical to each other, and, regarding discotic liquid-crystalline molecules, the disk-planes of the cores thereof and a layer plane are vertical to each other. However, they are not required to be exactly vertical to each other, and, in the specification, the term "vertical alignment" should be understood as an alignment state in which molecules are aligned with a tilt angle against a layer plane ranging from 70 to 90 degree. The tilt angle is preferably from 75 to 90 degree, and more preferably from 80 to 90 degree.

[Alignment Layer]

As described above, an alignment layer may be utilized in order to form the optically anisotropic layer. The alignment layer is generally provided on a transparent substrate or a color filter layer coated on the transparent substrate. The alignment layer functions so as to define the alignment direction of a liquid crystalline compound that is provided thereon. Any layer may be used as an alignment layer provided that it can give the alignment property to the optically anisotropic layer. Examples of the preferable alignment layer include a layer of an organic compound (preferably polymer) having been subjected to rubbing treatment, an oblique evaporation layer of an inorganic compound and a layer having micro grooves, further, an accumulated film of ω-tricosanoic acid, dioctadecylmethylammonium chloride or methyl stearate formed by a Langmuir-Blodgett method (LB film), and layers formed by aligning dielectric materials by applying an electric field or magnetic field.

Examples of the organic compound for the alignment layer include polymers such as polymethyl methacrylate, acrylic acid/methacrylic acid copolymer, styrene/maleinimide copolymer, polyvinyl alcohol, poly(N-methylol acrylamide), styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropylene and polycarbonate, and compounds such as a silane coupling agent. Examples of preferable polymers can include polyimide, polystyrene, polymers of styrene derivatives, gelatin, polyvinyl alcohol and alkyl-modified polyvinyl alcohol having an alkyl group (preferably having six or more carbon atoms).

Polymer is preferably used for forming an alignment layer. The type of polymer that is utilizable can be determined in accordance with the alignment (particularly an average tilt angle) of a liquid crystalline compound. For example, in order to align horizontally the liquid crystalline compound, a polymer that does not lower the surface energy of the alignment layer (ordinary polymer for alignment) is used. As to specific types of polymers, there are descriptions in various documents about a liquid crystal cell or an optical compensatory sheet. For example, polyvinyl alcohol or modified polyvinyl alcohol, copolymer with polyacrylic acid or polyacrylic acid ester, polyvinyl pyrrolidone, cellulose or modified cellulose are preferably used. Raw materials for the alignment layer may have a functional group capable of reacting with a reactive group of a liquid crystalline compound. The reactive group can be introduced by introducing a repeating unit having a reactive group in a side chain, or as a substituent of a cyclic group. The use of an alignment layer that forms a chemical bond with a liquid crystalline compound at the interface is more preferred. Such alignment layer is described in JPA NO. H9-152509, and modified polyvinyl alcohol to which an acrylic group is introduced in a side chain thereof using acid chloride or Karenz MOI (manufactured by SHOWA DENKO K.K.) is particularly preferred. The thickness of the alignment layer is preferably from 0.01 to 5 μm, further preferably from 0.05 to 2 μm.

In addition, a polyimide (preferably a fluorine atom-containing polyimide) film widely used as the alignment layer of LCD is also preferred as an organic alignment layer. This can be obtained by coating polyamic acid (such as LQ/LX series manufactured by Hitachi Chemical Co., Ltd., or SE series manufactured by NISSAN CHEMICAL INDUSTRIES, LTD.) on the substrate surface, burning the same at 100-300° C. for 0.5-1 hour, and then rubbing the same.

As to the rubbing treatment, a treatment method which is widely adopted as a step of aligning liquid crystal in an LCD can be utilized. That is, a method, in which the surface of the alignment layer is rubbed with paper, gauze, felt, rubber, nylon or polyester fiber in a predetermined direction to attain alignment, can be used. In general, it is practiced by carrying out the rubbing around several times using a cloth obtained by grafting uniformly fibers having a uniform length and thickness.

As a vapor deposition material for an inorganic oblique vapor deposition film, SiO is a representative example, and metal oxides such as $TiO_2$ and $ZnO_2$, fluorides such as $MgF_2$, and further metals such as Au and Al can be mentioned. Incidentally, any metal oxides may be used as an oblique vapor deposition material provided that it has a high permittivity, and they are not limited to those described above. An inorganic oblique vapor deposition film can be formed by using a vapor deposition apparatus. By carrying out vapor deposition while fixing a film (substrate), or carrying out vapor deposition continuously while moving a long film, an inorganic oblique vapor deposition film can be formed.

[Color Filter Layer]

According to the invention, the color filter layer disposed on the substrate may be formed of a colored polymer composition. The colored polymer composition preferably comprises, at least, (1) a monomer and/or oligomer; and (2) a colorant such as dye or pigment. Being hardened under light irradiation or the like, the color filter layer may be formed of the composition further comprising (3) a photo-polymerization initiator. For controlling the membrane properties, the composition may further comprise (4) binder. The ingredients (1) to (4) will be described in detail.

(1) Monomer or Oligomer

The monomer or oligomer used for preparing the color layer may be selected from radical polymerizable monomers or oligomers such as compounds, having two or more ethylenic unsaturated double bonds, capable of addition polymerization upon being irradiated by light. As such monomer and oligomer, compounds having at least one ethylenic unsaturated group capable of addition polymerization, and having a boiling point of 100° C. or above under normal pressure can be exemplified. The examples include monofunctional acrylates and monofunctional methacrylates such as polyethylene glycol mono(meth)acrylate, polypropylene glycol mono(meth)acrylate and phenoxyethyl(meth)acrylate; multi-functional acrylate and multi-functional methacrylate, obtained by adding ethylene oxide or propylene oxide to multi-functional alcohols such as trimethylol propane and glycerin, and then converting them into (meth)acrylates, such as polyethylene glycol di(meth)acrylate, polypropylene glycol di(meth) acrylate, trimethylolethane triacrylate, trimethylolpropane tri(meth)acrylate, trimethylolpropane diacrylate, neopentyl glycol di(meth)acrylate, pentaerythritol tetra(meth)acrylate, pentaerythritol tri(meth)acrylate, dipentaerythritol hexa(meth)acrylate, dipentaerythritol penta(meth)acrylate, hexanediol di(meth)acrylate, trimethylol propane tri(acryloyloxypropyl)ether, tri(acryloyloxyethyl)isocyanurate, tri (acryloyloxyethyl)cyanurate, glycerin tri(meth)acrylate.

Additional examples of multi-functional acrylates and methacrylates include urethane acrylates such as those described in Examined Japanese Patent Publication "Tokkosho", hereinafter referred to as "JPB", Nos. S48-41708, S50-6034 and JPA No. S51-37193; polyester acrylates such as those described in JPA No. S48-64183, JPB Nos. S49-43191 and S52-30490; and epoxyacrylates which are reaction products of epoxy polymer and (meth)acrylic acid. Of these, trimethylolpropane tri(meth)acrylate, pentaerythritol tetra (meth)acrylate, dipentaerythritol hexa(meth)acrylate, dipentaerythritol penta(meth)acrylate are preferable.

Besides these, also "polymerizable compound B" described in the JPA No. H11-133600 are exemplified as the preferable examples.

These monomers or oligomers can be used independently or in combination of two or more species thereof. The content of the monomer or oligomer generally falls in the range from 5 to 50% by weight, and more preferably from 10 to 40% by weight, of the total weight of the solid components contained in the polymer composition.

The monomer or oligomer used for preparing the color layer may be selected from cation-polymerizable monomers and oligomers. Examples of such monomer and oligomer include epoxy-base compounds such as cyclic ethers, cyclic formals, acetals, vinylalkyl ethers and compounds having a thirane group bisphenol-type epoxy resins, novolac-type epoxy resins, alicyclic epoxy resins, epoxidized unsaturated fatty acids and epoxidized polybutadienes. More specific examples of such monomer and oligomer include compounds described in "New Epoxy Resins (Shin Epokishi Jushi)" written and edited by Hiroshi Kakiuchi (published by SHOKODO CO., LTD in 1985) and "Epoxy Resins (Epokishi Jushi)" written and edited by Kuniyuki Hashimoto (published by NIKKAN KOGYO SHIMBUN, LTD in 1969); and 3-functional glycidyl ethers (e.g., trimethylolethane triglycidyl ether, trimethylolpropane triglycidyl ether, glycerol triglycidyl ether, triglycidyl tris hydroxy ethylisocyanurate), 4- or more functional glycidyl ethers (e.g., sorbitol tetraglycidyl ether, pentaerythritol tetraglycidyl ether, polyglycidyl ether of cresol-novolac resin and polyglycidyl ether of phenol-novolac resin), 3- or more functional alicyclic epoxys (e.g., "EPOLEAD GT-301", "EPOLEAD GT-401" and "EHPE", all of which are available from DAICEL CHEMICALINDUSTRIES, LTD., and polycyclohexyl epoxymethyl ether of phelol-novolac resin), and 3- or more functional oxetanes (e.g., "OX-SQ" and "PNOX-1009", all of which are available from TOAGOSEI CO., LTD.)

The monomer and/or oligomer, which can be added to the color filter layer, may be added to the optically anisotropic layer.

(2) Colorant Agent

One or more colorant such as dye or pigment selected from known colorants may be added to the colored polymer composition. It is preferable that the colorant is dispersed in the polymer composition uniformly, and, in terms of dispersion, the particle diameter thereof is preferably equal to or less than 0.1 μm, and more preferably equal to or less than 0.08 μm.

Examples of dye and pigment which can be used as colorant in the invention include Victoria pure blue BO(C.I. 42595), Auramine (C.I. 41000), Fat-black HB(C.I. 26150), C.I. pigment•yellow 1, C.I. pigment•yellow 3, C.I.

pigment·yellow 12, C.I. pigment·yellow 13, C.I. pigment·yellow 14, C.I. pigment·yellow 5, C.I. pigment·yellow 16, C.I. pigment·yellow 17, C.I. pigment·yellow 20, C.I. pigment·yellow 24, C.I. pigment·yellow 31, C.I. pigment·yellow 55, C.I. pigment·yellow 60, C.I. pigment·yellow 61, C.I. pigment·yellow 65, C.I. pigment·yellow 71, C.I. pigment·yellow 73, C.I. pigment·yellow 74, C.I. pigment·yellow 81, C.I. pigment·yellow 83, C.I. pigment·yellow 93, C.I. pigment·yellow 95, C.I. pigment·yellow 97, C.I. pigment·yellow 98, C.I. pigment·yellow 100, C.I. pigment·yellow 101, C.I. pigment·yellow 104, C.I. pigment·yellow 106, C.I. pigment·yellow 108, C.I. pigment·yellow 109, C.I. pigment·yellow 110, C.I. pigment·yellow 113, C.I. pigment·yellow 114, C.I. pigment·yellow 116, C.I. pigment·yellow 117, C.I. pigment·yellow 119, C.I. pigment·yellow 120, C.I. pigment·yellow 126, C.I. pigment·yellow 127, C.I. pigment·yellow 128, C.I. pigment·yellow 129, C.I. pigment·yellow 138, C.I. pigment·yellow 139, C.I. pigment·yellow 150, C.I. pigment·yellow 151, C.I. pigment·yellow 152, C.I. pigment·yellow 153, C.I. pigment·yellow 154, C.I. pigment·yellow 155, C.I. pigment·yellow 156, C.I. pigment·yellow 166, C.I. pigment·yellow 168, C.I. pigment·yellow 175, C.I. pigment·yellow 180, C.I. pigment·yellow 185; C.I. pigment·orange 1, C.I. pigment·orange 5, C.I. pigment·orange 13, C.I. pigment·orange 14, C.I. pigment·orange 16, C.I. pigment·orange 17, C.I. pigment·orange 24, C.I. pigment·orange 34, C.I. pigment·orange 36, C.I. pigment·orange 38, C.I. pigment·orange 40, C.I. pigment·orange 43, C.I. pigment·orange 46, C.I. pigment·orange 49, C.I. pigment·orange 51, C.I. pigment·orange 61, C.I. pigment·orange 63, C.I. pigment·orange 64, C.I. pigment·orange 71, C.I. pigment·orange 73; C.I. pigment·violet 1, C.I. pigment·violet 19, C.I. pigment·violet 23, C.I. pigment·violet 29, C.I. pigment·violet 32, C.I. pigment·violet 36, C.I. pigment·violet 38; C.I. pigment·red 1, C.I. pigment·red 2, C.I. pigment·red 3, C.I. pigment·red 4, C.I. pigment·red 5, C.I. pigment·red 6, C.I. pigment·red 7, C.I. pigment·red 0.8, C.I. pigment·red 9, C.I. pigment·red 10, C.I. pigment·red 11, C.I. pigment·red 12, C.I. pigment·red 14, C.I. pigment·red 15, C.I. pigment·red 16, C.I. pigment·red 17, C.I. pigment·red 18, C.I. pigment·red 19, C.I. pigment·red 21, C.I. pigment·red 22, C.I. pigment·red 23, C.I. pigment·red 30, C.I. pigment·red 31, C.I. pigment·red 32, C.I. pigment·red 37, C.I. pigment·red 38, C.I. pigment·red 40, C.I. pigment·red 41, C.I. pigment·red 42, C.I. pigment·red 48:1, C.I. pigment·red 48:2, C.I. pigment·red 48:3, C.I. pigment·red 48:4, C.I. pigment·red 49:1, C.I. pigment·red 49:2, C.I. pigment·red 50:1, C.I. pigment·red 52:1, C. I. pigment·red 53:1, C.I. pigment·red 57, C.I. pigment·red 57:1, C.I. pigment·red 57:2, C.I. pigment red 58:2, C.I. pigment·red 58:4, C.I. pigment·red 60:1, C.I. pigment·red 63:1, C.I. pigment·red 63:2, C.I. pigment·red 64:1, C.I. pigment·red 81:1, C.I. pigment·red 83, C.I. pigment·red 88, C.I. pigment·red 90:1, C.I. pigment·red 97, C.I. pigment·red 101, C.I. pigment·red 102, C.I. pigment·red 104, C.I. pigment·red 105, C.I. pigment·red 106, C.I. pigment·red 108, C.I. pigment·red 112, C.I. pigment·red 113, C.I. pigment·red 114, C.I. pigment·red 122, C.I. pigment·red 123, C.I. pigment·red 144, C.I. pigment·red 146, C.I. pigment·red 149, C.I. pigment·red 150, C.I. pigment·red 151, C.I. pigment·red 166, C.I. pigment·red 168, C.I. pigment·red 170, C.I. pigment·red 171, C.I. pigment·red 172, C.I. pigment·red 174, C.I. pigment·red 175, C.I. pigment·red 176, C.I. pigment·red 177, C.I. pigment·red 178, C.I. pigment·red 179, C.I. pigment·red 180, C.I. pigment·red 185, C.I. pigment·red 187, C.I. pigment·red 188, C.I. pigment·red 190, C.I. pigment·red 193, C.I. pigment·red 194, C.I. pigment·red 202, C.I. pigment·red 206, C.I. pigment·red 207, C.I. pigment·red 208, C.I. pigment·red 209, C.I. pigment·red 215, C.I. pigment·red 216, C.I. pigment·red 220, C.I. pigment·red 224, C.I. pigment·red 226, C.I. pigment·red 242, C.I. pigment·red 243, C.I. pigment·red 245, C.I. pigment·red 254, C.I. pigment·red 255, C.I. pigment·red 264, C.I. pigment·red 265; C.I. pigment·blue 15, C. I. pigment·blue 15:3, C. I. pigment·blue 15:4, C. I. pigment·blue 15:6, C.I. pigment·blue 60, C.I. pigment·green 7, C.I. pigment green 36, C.I. pigment·blown 23, C.I. pigment·blown 25, and C.I. pigment·black 1 and C.I. pigment·black 7.

Among those, the colorant is preferably selected from (i) C.I. pigment·red 254 for the R(red)-colored polymer composition, (ii) C.I. pigment·green 36 for the G(green)-colored polymer composition, and (iii) C.I. pigment·blue 15:6 for the B(blue)-colored polymer composition. Plural colorant may be used in combination.

Preferred examples of the combination include the combinations of C.I. pigment·red 254 and C.I. pigment·red 224, C.I. pigment·yellow 139 and C.I. pigment·violet 23; the combinations of C.I. pigment·green 36 and C.I. pigment·yellow 150, C.I. pigment yellow 139, C.I. pigment·yellow 185, C.I. pigment·yellow 138 or C.I. pigment·yellow 180; and the combinations of C.I. pigment·blue 15:6 and C.I. pigment·violet 23 or C.I. pigment·blue 60.

The amount of C.I. pigment·red 254 is preferably equal to or more than 80 weight %, and more preferably equal to or more than 90 weight % with respect to the total weight of the pigment employed in the colored polymer composition. The amount of C.I. pigment·green 36 is preferably equal to or more than 50 weight %, and more preferably equal to or more than 60 weight % with respect to the total weight of the pigment employed in the colored polymer composition. The amount of C.I. pigment·blue 15:6 is preferably equal to or more than 80 weight %, and more preferably equal to or more than 90 weight % with respect to the total weight of the pigment employed in the colored polymer composition.

The dispersion fluid of pigment is preferably used. The dispersion fluid may be prepared by mixing pigment and dispersant for pigment in advance to form a composition and dispersing the composition in organic solvent (or vehicle), described hereinafter. The term "vehicle" is used for a fluid medium of fluid colorant, in which pigment is dispersed, comprising an ingredient (binder) capable of hardening a coated film together with the pigment and another ingredient (organic solvent) capable of diluting the ingredient. The dispersion of pigment may be carried out with the aid of any known dispersing equipment, described on page 438 in the first edition of "Pigment Dictionary (Ganryoh Jiten)" written by Kunizoh Asakura (published in 2000), such as kneaders, roll mills, attritor, super mills, dissolvers, homogenizers and sand mills. The pulverization of pigment may also be carried out with the aid of frictional force mechanically as written on page 310 in the dictionary.

The colorant such as pigment, which can be used in the invention, is preferably selected from those having a number-average particle size falling within the range from 0.001 to 0.1 μm, and more preferably from 0.01 to 0.08 μm. The pigment, having a particle size smaller than 0.001 μm, exhibits a large particle-surface energy, may easily agglutinate and then may be hardly able to be dispersed and maintain the stable dispersion state. On the other hand, the pigment, having a particle size larger than 0.1 μm, may contribute to elimination of polarized light, and then to decrease of the contrast. The term "particle size" means a diameter of a circle, having a same area, to which an electron microgram image of a particle is approximated; and the term "number-average particle size" means a 100-particles average of the diameters to be calculated in the above manner.

The contrast of the colored pixel can be increased by employing dispersed pigment having a smaller diameter. For reducing the particle size, the time for dispersion may be controlled. Any known dispersion machine described in the above can be used for the dispersion. The dispersion time is preferably 10 to 30 hours, more preferably 18 to 30 hours, and most preferably 24 to 30 hours. A dispersion time of less than 10 hours may result in pigment-induced canceling of polarization due to large grain size of the pigment, and lowering in the contrast. On the other hand, a dispersion time exceeding 30 hours may increase the viscosity of the dispersion liquid, and may make the coating difficult. Difference in the contrast of two or more colored pixels can be suppressed to 600 or smaller, by adjusting the grain size to thereby achieve a desired contrast.

The contrast of the individual colored pixels of the color filter formed by using the above-described photosensitive polymer layer is preferably 2000 or larger, more preferably 2800 or larger, still more preferably 3000 or larger, and most preferably 3400 or larger. If the contrast of the individual colored pixels composing the color filter is less than 2000, images observed on the liquid crystal display device having the color filter incorporated therein generally give a whitish impression, which is not comfortable to watch, and is undesirable. Difference in the contrast among the individual colored pixels is preferably suppressed to 600 or smaller, more preferably 410 or smaller, still more preferably 350 or smaller, and most preferably 200 or smaller. A difference in the contrast of the individual pixels of 600 or smaller makes light leakage from the individual colored pixel portions in the black state not so largely different from each other, and this is desirable in terms of ensuring a good color balance in the black state.

(3) Photo-Polymerization Initiator

The photopolymerization initiator or photopolymerization initiator system used for the photosensitive polymer layer can be exemplified by vicinal polyketaldonyl compounds disclosed in U.S. Pat. No. 2,367,660, acyloin ether compounds described in U.S. Pat. No. 2,448,828, aromatic acyloin compounds substituted by α-hydrocarbon described in U.S. Pat. No. 2,722,512, polynuclear quinone compounds described in U.S. Pat. Nos. 3,046,127 and 2,951,758, combination of triaryl imidazole dimer and p-aminoketone described in U.S. Pat. No. 3,549,367, benzothiazole compounds and trihalomethyl-s-triazine compounds described in JPB No. 51-48516, trihalomethyl-triazine compounds described in U.S. Pat. No. 4,239,850, and trihalomethyl oxadiazole compounds described in U.S. Pat. No. 4,212,976. Trihalomethyl-s-triazine, trihalomethyl oxadiazole and triaryl imidazole dimer are particularly preferable.

Besides these, "polymerization initiator C" described in JPA No. H11-133600 can also be exemplified as a preferable example.

The content of the photopolymerization initiator or the photopolymerization initiator system generally falls in the range from 0.5 to 20% by weight, and more preferably from 1 to 15% by weight, of the total weight of the solid components contained in the composition.

Examples of the cation polymerization initiator include double salts such as aryldiazonium salts, diaryliodonium salts and triarylsulfonium salts of Lewis acids such as tetrafluoro borate and hexafluoro phosphenol; and mixtures of silane compounds, which are capable of generating silanol, such as benzylsilyl ether, o-nitrobenzylsilyl ether and triphenyl(t-butyl)peroxysilane and aluminum complexes such as tris(ethylacet acetic acid). The amount of the cation polymerization initiator is preferably from 0.5 to 20 weight % and more preferably from 1 to 15 weight % with respect to the total weight of the solid components contained in the composition.

The photo-polymerization system, employing two or more types of different photo-reaction mechanisms, may be used in the invention.

(4) Binder

The binder is preferably selected from polymers having, in the side chain thereof, a polar group such as a carboxylic acid group or a carboxylic salt group. Examples thereof include methacrylic acid copolymer, acrylic acid copolymer, itaconic acid copolymer, crotonic acid copolymer, maleic acid copolymer, and partially-esterified maleic acid copolymer described in JPA No. S59-44615, JPB Nos. S54-34327, S58-12577 and S54-25957, JPA Nos. S59-53836 and S59-71048.

Cellulose derivatives having on the side chain thereof a carboxylic acid group can also be exemplified. Besides these, also cyclic acid anhydride adduct of hydroxyl-group-containing polymer are preferably used.

Particularly preferable examples include copolymer of benzyl(meth)acrylate and (meth) acrylic acid described in U.S. Pat. No. 4,139,391, and multi-system copolymer of benzyl (meth)acrylate and (meth)acrylic acid and other monomer. These binder polymers having polar groups may be used independently or in a form of composition comprising a general film-forming polymer.

The content of the polymer generally falls within the range from 20 to 50% by weight, and more preferably from 24 to 45% by weight, of the total weight of the solid components contained in the polymer composition.

In this specification, "contrast of the colored pixel" means the contrast individually evaluated for each of the colors R, G and B composing the color filter. A method of measuring the contrast is as follows. Polarizer plates are stacked on a sample to be measured on both sides thereof, while aligning the direction of polarization of the polarizer plates in parallel with each other, the sample is then illuminated by a back light from one polarizer plate side, and luminance Y1 of light transmitted through the other polarizer plate is measured. Next, the polarizer plates are orthogonally crossed, the sample is then illuminated by the back light from one polarizer plate sides, and luminance Y2 of light transmitted through the other is measured. The contrast is expressed as Y1/Y2 using thus obtained values of measurement. It is to be noted that the polarizer plates used for the contrast measurement are the same as those used for the liquid crystal display device using the color filter.

The color filter formed of the composition preferably contains an appropriate surfactant in such colored polymer composition, in view of effectively preventing non-uniformity in display (non-uniformity in color due to variation in the film thickness). Any surfactants are applicable so far as they are miscible with the photosensitive polymer composition. Surfactants preferably applicable to the present invention include those disclosed in paragraphs [0090] to [0091] in JPA No. 2003-337424, paragraphs [0092] to [0093] in JPA No. 2003-177522, paragraphs [0094] to [0095] in JPA No. 2003-177523, paragraphs to [0097] in JPA No. 2003-177521, paragraphs [0098] to in JPA No. 2003-177519, paragraphs [0100]

to [0101] in JPA No. 2003-177520, paragraphs [0102] to [0103] in JPA No. H11-133600 and those disclosed as the invention in JPA No. H6-16684. In view of obtaining more larger effects, it is preferable to use any of fluorine-containing surfactants and/or silicon-base surfactants (fluorine-containing surfactant, or, silicon-base surfactant, and surfactant containing both of fluorine atom and silicon atom), or two or more surfactants selected therefrom, wherein the fluorine-containing surfactant is most preferable. For the case where the fluorine-containing surfactant is used, the number of fluorine atoms contained in the fluorine-containing substituents in one surfactant molecule is preferably 1 to 38, more preferably 5 to 25, and most preferably 7 to 20. Too large number of fluorine atoms is undesirable in view of degrading solubility in general fluorine-free solvents. Too small number of fluorine atoms is undesirable in view of failing in obtaining effects of improving the non-uniformity.

Particularly preferable surfactants can be those containing a copolymer which includes the monomers expressed by the formulae (a) and (b) below, having a ratio of mass of formula (a)/formula (b) of 20/80 to 60/40:

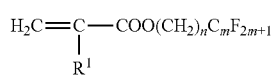

Formula (a)

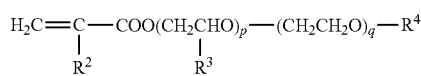

Formula (b)

In the formulae, $R^1$, $R^2$ and $R^3$ independently represent a hydrogen atom or a methyl group, $R^4$ represents a hydrogen atom or an alkyl group having the number of carbon atoms of 1 to 5. n represents an integer from 1 to 18, and $R^3$ represents an integer from 2 to 14. p and q represents integers from 0 to 18, excluding the case where both of p and q are 0.

It is to be defined now that a monomer expressed by the formula (a) and a monomer expressed by the formula (b) of the particularly preferable surfactants are denoted as monomer (a) and monomer (b), respectively. $C_mF_{2m+1}$ appears in the formula (a) maybe straight-chained or branched. m represents an integer from 2 to 14, and is preferably an integer from 4 to 12. Content of $C_mF_{2m+1}$ is preferably 20 to 70% by weight, and more preferably 40 to 60% by weight, of the monomer (a). $R^1$ represents a hydrogen atom or a methyl group. n represents 1 to 18, and more preferably 2 to 10. $R^2$ and $R^3$ appear in the formula (b) independently represent a hydrogen atom or a methyl group, and $R^4$ represents a hydrogen atom or an alkyl group having the number of carbon atoms of 1 to 5. p and q respectively represent integers of 0 to 18, excluding the case where both of p and q are 0. p and q are preferably 2 to 8.

The monomer (a) contained in one particularly preferable surfactant molecule may be those having the same structure, or having structures differing within the above-defined range. The same will apply also to the monomer (b).

The weight-average molecular weight Mw of a particularly preferable surfactant preferably falls in the range from 1000 to 40000, and more preferably from 5000 to 20000. The surfactant characteristically contains a copolymer composed of the monomers expressed by the formula (a) and the formula (b), and having a ratio of mass of monomer (a)/monomer (b) of 20/80 to 60/40. Hundred parts by weight of a particularly preferable surfactant is preferably composed of 20 to 60 parts by weight of the monomer (a), 80 to 40 parts by weight of the monomer (b), and residual parts by weight of other arbitrary monomers, and more preferably 25 to 60 parts by weight of the monomer (a), 60 to 40 parts by weight of the monomer (b), and residual parts by weight of other arbitrary monomer.

Copolymerizable monomers other than the monomers (a) and (b) include styrene and derivatives or substituted compounds thereof including styrene, vinyltoluene, α-methylstyrene, 2-methylstyrene, chlorostyrene, vinylbenzoic acid, sodium vinyl benzene sulfonate, and aminostyrene; dienes such as butadiene and isoprene; and vinyl-base monomers such as acrylonitrile, vinylethers, methacrylic acid, acrylic acid, itaconic acid, crotonic acid, maleic acid, partially esterified maleic acid, styrene sulfonic acid, maleic anhydride, cinnamic acid, vinyl chloride and vinyl acetate.

A particularly preferable surfactant is a copolymer of the monomer (a), monomer (b) and so forth, allowing monomer sequence of random or ordered, such as forming a block or graft, while being not specifically limited. A particularly preferable surfactant can use two or more monomers differing in the molecular structure and/or monomer composition in a mixed manner.

Content of the surfactant is preferably adjusted to 0.01 to 10% by weight to the total amount of solid components of the photosensitive polymer layer, and more preferably to 0.1 to 7% by weight. The surfactant is such as containing predetermined amounts of a surfactant of a specific structure, ethylene oxide group and polypropylene oxide group, wherein addition thereof to an amount within a specific range to the photosensitive polymer layer makes it possible to improve non-uniformity in the display on the liquid crystal display device provided with the photosensitive polymer layer. A content of less than 0.01% by weight to the total amount of solid components fails in improving the non-uniformity in the display, and a content exceeding 10% by weight only results in an almost saturated effect of improving the non-uniformity in the display. Production of the color filter while adding the particularly preferable surfactant described in the above to the photosensitive polymer layer is preferable in terms of improving the non-uniformity in the display.

Specific examples of preferred fluorine-containing surfactant include the compounds described in paragraphs [0054] to [0063] of JPA No. 2004-163610. It is also allowable to directly adopt the commercial surfactants listed below. Applicable commercial surfactants include fluorine-containing surfactants such as Eftop EF301, EF303 (products of Shin-Akita Kasei K.K.), Florade FC430, 431 (products of Sumitomo 3M Co., Ltd.), Megafac F171, F173, F176, F189, R08 (products of Dainippon Ink and Chemicals, Inc.), Surflon S-382, SC101, 102, 103, 104, 105, 106 (products of Asahi Glass Co., Ltd.), and silicon-base surfactants. Also polysiloxane polymer KP-341 (product of Shin-Etsu Chemical Co., Ltd.) and Troysol S-366 (product of Troy Chemical Industries, Inc.) are adoptable as the silicon-base surfactants.

The composition may comprise at least one solvent, and examples of the solvent include water, alcohols and ketones, which are described in "New Edition Solvent Pocketbook" (edited by Society of Synthetic Organic Chemistry, Japan and published by Ohmsha, Ltd.). The amount of the solvent is preferably equal to or less than 50% and more preferably equal to or less than 30% with respect to the total weight of the composition.

[Barrier Wall]

In the invention, the substrate has the barrier wall separating respective fine areas (e.g., respective pixel regions)

The barrier wall having light-shielding properties can be used as a black matrix (hereinafter, a barrier wall that also functions as a black matrix is referred to as a "light-shielding barrier wall"), which is preferred because the construction, producing method etc. can be simplified. The light-shielding barrier wall may be produced, for example, by using a colorant-containing photosensitive composition with deep color (hereinafter, occasionally referred to as a "deep color composition"). Here, the deep color composition means a composition having a high optical density, the value of which is from 2.0 to 10.0. The deep color composition has an optical density of preferably from 2.5 to 6.0, particularly preferably from 3.0 to 5.0. Further, since the deep color composition is preferably cured by a photoinitiation system as described later, an optical density for an exposing wavelength (generally in an ultraviolet region) is also important. That is, the value is from 2.0 to 10.0, preferably from 2.5 to 6.0, most preferably from 3.0 to 5.0. The value less than 2.0 may result in an unintended figure of the barrier wall and, on the other hand, the value more than 10.0 does not allow the polymerization to begin and it is difficult to form the barrier wall itself. When a colorant only has such properties, the colorant (deep color body) in a composition may be an organic material (coloring agent such as dye or pigment), each of carbons in respective configurations, or one composed of a combination thereof.

(Colorant)

The colorant for use in the aforementioned deep color composition will be described specifically.

For the deep color composition, organic pigment, inorganic pigment, dye etc. can be preferably used, which include light-shielding agents such as carbon black, metal oxide powder such as titanium oxide and iron tetraoxide, metal sulfide powder and metal powder, and in addition, mixtures of pigments of red, blue, green etc. Publicly known colorants (dye, pigment) can be used. When a pigment is used among the publicly known colorants, it is preferably dispersed uniformly in the deep color composition.

The ratio of the colorant in the solid content of the deep color composition is preferably 30-70% by mass, more preferably 40-60% by mass, further preferably 50-55% by mass, from the viewpoint of shortening the developing time.

Specific examples of the preferably usable publicly known dye or pigment include color materials described in JPA No. 2005-17716, paragraphs [0038]-[0040], pigments described in JPA No. 2005-361447, paragraphs [0068]-[0072], and colorants described in JPA No. 2005-17521, paragraphs [0080]-[0088].

In the invention, a black colorant is preferred among these colorants. Further examples of the black colorant include carbon black, titanium carbon, iron oxide, titanium oxide, graphite etc., among which carbon black is preferred.

The pigment is desirably used as a dispersion liquid. The dispersion liquid can be prepared by adding a composition obtained by mixing previously the pigment and a pigment dispersing agent in an after-mentioned organic solvent (or vehicle) to disperse the same. The vehicle means a part of medium that disperses the pigment when a paint is in a liquid form, and includes a part (binder) that is in a liquid form and solidifies the coated film while binding with the pigment, and a component (organic solvent) that solves and dilutes the same. There is no particular limitation on dispersing machine used upon dispersing the pigment, and, for example, such publicly known dispersing machines are included as a kneader, roll mill, attritor, super mill, dissolver, homomixer and sand mill, as described in Asakura Kunizo "Pigment no Jiten (Cyclopedia of Pigment)," p 438, 1st edition, Asakura Publishing Co., Ltd., 2000. Further, by mechanical attrition as described in the document p 310, it may be ground finely utilizing frictional force.

The colorant (pigment) for use in the invention has a number average particle diameter of preferably from 0.001 to 0.1 µm, further preferably from 0.01 to 0.08 µm, from the viewpoint of dispersion stability. The "particle diameter" used here means a diameter that is given when assuming an image of a particle of an electron microscope photograph as a circle having the same area, and the "number average particle diameter" means an average value given by obtaining the aforementioned particle diameter for many particles and averaging the values for 100 particles.

The deep color composition contains at least a polymerizable compound and a photopolymerization initiator in addition to such colorant (deep color body). Further, it can be incorporated, according to need, with a publicly known additive such as a plasticizer, filler, stabilizing agent, polymerization inhibitor, surfactant, solvent, or adhesion-accelerating agent. Furthermore, the deep color composition is preferably softened or becomes adhesive at a temperature of at least 150° C. or less, and is preferably thermoplastic. From such viewpoint, it can be modified by adding a compatible plasticizer.

As a method for curing the deep color composition, a photoinitiation system is used. A photopolymerization initiator used here is a compound capable of generating an active species to initiate polymerization of an after-mentioned polyfunctional monomer caused by irradiation (also referred to as exposure) of such radiation ray as visible light, ultraviolet ray, far-ultraviolet ray, electron beam or X-ray, and can be suitably selected from publicly known photopolymerization initiators or photopolymerization initiation systems.

For example, there can be mentioned trihalomethyl group-containing compounds, acridine-based compounds, acetophenone-based compounds, biimidazole-based compounds, triazine-based compounds, benzoin-based compounds, benzophenone-based compounds, α-diketone-based compounds, polynuclear quinone-based compounds, xanthone-based compounds and diazo-based compounds, etc.

Specifically, there can be mentioned the trihalomethyl group-substituted compounds such as trihalomethyl oxazole derivatives or s-triazine derivatives described in JPA No. 2001-117230, the trihalomethyl s-triazine compound described in U.S. Pat. No. 4,239,850 and the trihalomethyl oxadiazole compounds described in U.S. Pat. No. 4,212,976;

acridine-based compounds such as 9-phenylacridine, 9-pyridylacridine, 9-pyrazinylacridine and bis(9-acridinyl) alkanes such as 1,2-bis(9-acridinyl)ethane, 1,3-bis(9-acridinyl)propane, 1,4-bis(9-acridinyl)butane, 1,5-bis(9-acridinyl) pentane, 1,6-bis(9-acridinyl)hexane, 1,7-bis(9-acridinyl) heptane, 1,8-bis(9-acridinyl)octane, 1,9-bis(9-acridinyl) nonane, 1,10-bis(9-acridinyl)decane, 1,11-bis(9-acridinyl) undecane, and 1,12-bis(9-acridinyl)dodecane;

triazine-based compounds such as 6-(p-methoxyphenyl)-2,4-bis(trichloromethyl)-s-triazine and 6-[p-(N,N-bis (ethoxycarbonylmethyl)amino)phenyl]-2,4-bis(trichloromethyl)-s-triazine; and other compounds such as 9,10-dimethylbenzphenazine, Michler's ketone, benzophenone/Michler's ketone, hexaarylbiimidazole/mercaptobenzimidazole, benzyldimethylketal, thioxanthone/amine and 2,2'-bis(2,4-dichlorophenyl)-4,4',5, 5'-tetraphenyl-1,2'-biimi dazole.

Among the aforementioned compounds, at least one type selected from trihalomethyl group-containing compounds, acridine-based compounds, acetophenone-based compounds, biimidazole-based compounds, triazine-based compounds is preferred, and in particular, it is preferred to contain at least one type selected from trihalomethyl group-containing compounds and acridine-based compounds. Trihalomethyl group-containing compounds and acridine-based compounds are useful in point of versatility and low cost.

Particularly preferable examples include 2-trichloromethyl-5-(p-styrylstyryl)-1,3,4-oxadiazole as the trihalomethyl group-containing compound, 9-phenylacridine as the acridine-based compound, and further, trihalomethyl group-containing compounds such as 6-[p-(N,N-bis(ethoxycarbonylmethyl)amino)phenyl]-2,4-bis(tric hloromethyl)-s-triazine, 2-(p-butoxystyryl)-5-trichloromethyl-1,3,4-oxadiazole, Michler's ketone, and 2,2'-bis(2,4-dichlorophenyl)-4,4',5,5'-tetraphenyl-1,2')-biim idazole.

The photopolymerization initiator may be used independently, or in combination of two or more types thereof. The total amount of the photopolymerization initiator in the deep color composition is preferably 0.1-20% by mass, particularly preferably 0.5-10% by mass of the total solid content (mass) of the deep color composition. The total amount of less than 0.1% by mass sometimes results in a low photo curing efficiency of the composition to require a long exposure time, and the amount of more than 20% by mass sometimes leads to lack of a formed image pattern or easy occurrence of roughness on the pattern surface upon development.

The photopolymerization initiator may be constituted while using a hydrogen donor together. As the hydrogen donor, mercaptan-based compounds, amine-based compounds etc. defined below are preferred in point of capability of more improving the sensitivity. The "hydrogen donor" here means a compound that can donate a hydrogen atom to a radical that has generated from the photopolymerization initiator by exposure.

The mercaptan-based compound is a compound having a benzene ring or a heterocyclic ring as a mother nucleus and one or more, preferably 1-3, further preferably 1-2 mercapto groups that are bound directly to the mother nucleus (hereinafter, referred to as the "mercaptan-based hydrogen donor"). The amine-based compound is a compound having a benzene ring or a heterocyclic ring as a mother nucleus and one or more, preferably 1-3, further preferably 1-2 amino groups that are bound directly to the mother nucleus (hereinafter, referred to as the "amine-based hydrogen donor"). These hydrogen donors may have a mercapto group and an amino group at the same time.

Specific examples of the mercaptan-based hydrogen donor include 2-mercaptobenzothiazole, 2-mercaptobenzoxazole, 2-mercaptobenzimidazole, 2,5-dimercapto-1,3,4-thiadiazole and 2-mercapto-2,5-dimethylaminopyridine. Among these, 2-mercaptobenzothiazole and 2-mercaptobenzoxazole are preferred, and, in particular, 2-mercaptobenzothiazole is preferred. Specific examples of the amine-based hydrogen donor include 4,4'-bis(dimethylamino)benzophenone, 4,4'-bis(diethylamino)benzophenone, 4-diethylaminoacetophenone, 4-dimethylaminopropiophenone, ethyl-4-dimethylaminobenzoate, 4-dimethylaminobenzoic acid, and 4-dimethylaminobenzonitrile. Among these, 4,4'-bis(dimethylamino) benzophenone and 4,4'-bis(diethylamino)benzophenone are preferred, and, in particular, 4,4'-bis(diethylamino)benzophenone is preferred.

The hydrogen donor can be used independently or in combination of two or more types thereof, and in point of the fact that the formed images do not easily drop from a permanent support upon development and the strength and sensitivity are improved, the combined use of one or more types of mercaptan-based hydrogen donors and one or more types of amine-based hydrogen donors is preferred.

Specific examples of the combination of the mercaptan-based hydrogen donor and the amine-based hydrogen donor include 2-mercaptobenzothiazole/4,4'-bis(dimethylamino) benzophenone, 2-mercaptobenzothiazole/4,4'-bis(diethylamino)benzophenone, 2-mercaptobenzoxazole/4,4'-bis(dimethylamino)benzophenone and 2-mercaptobenzoxazole/4,4'-bis(diethylamino)benzophenone. More preferable combination is 2-mercaptobenzothiazole/4,4'-bis(diethylamino)benzophenone and 2-mercaptobenzoxazole/4,4'-bis(diethylamino)benzophenone, and particularly preferable combination is 2-mercaptobenzothiazole/4,4'-bis(diethylamino)benzophenone.

When the mercaptan-based hydrogen donor and the amine-based hydrogen donor are combined, the mass ratio (M:A) of the mercaptan-based hydrogen donor (M) and the amine-based hydrogen donor (A) is, usually, preferably 1:1-1:4, more preferably 1:1-1:3. The total amount of the hydrogen donor in the deep color composition is preferably 0.1-20% by mass, particularly preferably 0.5-10% by mass of the total solid content (mass) of the deep color composition.

As the polyfunctional monomer (polymerizable compound) in the deep color composition, following compounds can be used independently or in combination with other monomer. Specific examples thereof include t-butyl(meth) acrylate, ethylene glycol di(meth)acrylate, 2-hydroxypropyl (meth)acrylate, triethylene glycol di(meth)acrylate, trimethylolpropane tri(meth)acrylate, 2-ethyl-2-butyl-propanediol di(meth)acrylate, pentaerythritol tri(meth) acrylate, pentaerythritol tetra(meth)acrylate, dipentaerythritol hexa(meth)acrylate, dipentaerythritol penta (meth)acrylate, polyoxyethylated trimethylolpropane tri (meth)acrylate, tris(2-(meth)acryloyloxyethyl)isocyanurate, 1,4-diisopropenylbenzene, 1,4-dihydroxybenzene di(meth) acrylate, decamethyleneglycoldi(meth)acrylate, styrene, diallylfumarate, triallyl trimellitate, lauryl(meth)acrylate, (meth)acrylamide and xylylene bis(meth)acrylamide.

In addition, reaction products of a compound having a hydroxyl group such as 2-hydroxyethyl(meth)acrylate, 2-hydroxypropyl(meth)acrylate or polyethylene glycol mono (meth)acrylate and a diisocyanate such as hexamethylene diisocyanate, toluene diisocyanate or xylene diisocyanate can be used.

Among these, particularly preferred are pentaerythritol tetraacrylate, dipentaerythritol hexaacrylate, dipentaerythritol pentaacrylate and tris(2-acryloyloxyethyl)isocyanurate.

The content of the polyfunctional monomer in the deep color composition is preferably 5-80% by mass, particularly preferably 10-70% by mass of the total solid content (mass) of the deep color composition. The content of less than 5% by mass sometimes results in a poor resistance of the composition to an alkaline developer at exposed areas, and the content of more than 80% by mass sometimes results in an increased tackiness and poor handleability of a formed deep color composition.

The deep color composition may contain at least one type of binder. As the binder, a polymer having a polar group such as a carboxylic acid group or a carboxylate group in a side chain is preferred. Examples of the polymer include methacrylic acid copolymer, acrylic acid copolymer, itaconic acid copolymer, crotonic acid copolymer, maleic acid copolymer and partially esterified maleic acid copolymer described in JPA No. S59-44615, JPB Nos. S54-34327, S58-12577, S54-25957, JPA No. S59-53836, or JPA No. S59-71048.

In addition, cellulose derivatives having a carboxylic acid group in a side chain can also be mentioned. Further, a compound formed by adding a cyclic acid anhydride to a polymer having a hydroxyl group can also be used preferably.

Particularly preferable examples include copolymer of benzyl(meth)acrylate and (meth) acrylic acid, and multicomponent copolymer of benzyl(meth)acrylate, (meth)acrylic acid and other monomers described in U.S. Pat. No. 4,139,391. These binders having the polar group may be used independently, or in a state of a composition in which an ordinary film-formable polymer is used together.

The content of the binder in the deep color composition is preferably 20-50% by mass, more preferably 24-45% by mass relative to the total solid content (mass) in the layer or composition.

The deep color composition may contain an organic solvent in addition to the aforementioned components. Examples of the organic solvent include methyl ethyl ketone, propylene glycol monomethyl ether, propylene glycol monomethyl ether acetate, cyclohexanone, cyclohexanol, methyl isobutyl ketone, ethyl lactate, methyl lactate and caprolactam.

The deep color composition can be further incorporated with undermentioned components, for example, a surfactant and ultraviolet absorber, and publicly known additives such as a plasticizer, filler, stabilizing agent, thermal polymerization inhibitor, solvent and adhesion accelerating agent. Further, the photosensitive resin composition is preferably softened or becomes adhesive at a temperature of at least 150° C. or less, and is preferably thermoplastic. From such viewpoint, the composition can be modified by adding a compatible plasticizer.

<Surfactant>

In the case of coating the deep color composition on a substrate, by incorporating a surfactant in the deep color composition, it is possible to control the film thickness to be uniform, and prevent effectively coating unevenness. As the surfactant, those described in JPA No. 2003-337424 or JPA No. H11-133600 are mentioned suitably. The content of the surfactant in the deep color composition is generally 0.001-1%, preferably 0.01-0.5%, particularly preferably 0.03-0.3% relative to the total solid content (mass) of the composition.

<Ultraviolet Absorber>

The deep color composition can be incorporated, according to need, with an ultraviolet absorber.

As the ultraviolet absorber, compounds described in JPA No. H5-72724, and salicylate-based, benzophenone-based, benzotriazole-based, cyanoacrylate-based, nickel chelate-based and hindered amine-based compounds etc can be mentioned.

For example, there can be mentioned phenylsalicylate, 4-t-butylphenylsalicylate, 2,4-di-t-butylphenyl-3',5'-di-t-4'-hydroxybenzoate, 4-t-butylphenylsalicylate, 2,4-dihydroxybenzophenone, 2-hydroxy-4-methoxybenzophenone, 2-hydroxy-4-n-octoxybenzophenone, 2-(2'-hydroxy-5'-methylphenyl)benzotriazole, 2-(2'-hydroxy-3'-t-butyl-5'-methylphenyl)-5-chlorobenzotriazo le, ethyl-2-cyano-3,3-di-phenyl acrylate, 2,2'-hydroxy-4-methoxybenzophenone, nickel dibutyldithiocarbamate, bis(2,2,6,6-tetramethyl-4-pyridine)sebacate, 4-t-butylphenylsalicylate, phenyl salicylate, 4-hydroxy-2,2,6,6-tetramethylpiperidine condensate, succinic acid-bis(2,2,6,6-tetramethyl-4-piperidenyl)-ester, 2-[2-hydroxy-3,5-bis(α,α-dimethylbenzyl)phenyl]-2H-benzotriaz ole, 7-{[4-chloro-6-(diethylamino)-5-triazine-2-yl]amino}-3-phenyl coumalin.

When an ultraviolet absorber is used, the content of the ultraviolet absorber relative to the total solid content of the deep color composition is generally 0.5-15%, preferably 1-12%, particularly preferably 1.2-10%.

<Thermal Polymerization Inhibitor>

The deep color composition is preferably incorporated with a thermal polymerization inhibitor. Examples of the thermal polymerization inhibitor include hydroquinone, hydroquinone monomethylether, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), 2-mercaptobenzimidazole and phenothiazine.

When a thermal polymerization inhibitor is used, the content thereof relative to the total solid content of the deep color composition is generally 0.01-1%, preferably 0.02-0.7%, particularly preferably 0.05-0.5%.

The deep color composition may also be incorporated with an "adhesive auxiliary" described in JPA No. H11-133600, other additive etc. in addition to the aforementioned components.

The aforementioned light-shielding barrier wall is preferably formed from the deep color composition. The light-shielding barrier wall is a wall that separates two or more pixel groups, and, in general, it is often black but is not limited to black. The light-shielding barrier wall is preferably formed by exposing the deep color photopolymerizable composition under a pobr-oxygen atmosphere, and then developing the same.

Such "under a poor-oxygen atmosphere" upon photocuring the deep color composition indicates an atmosphere under an inert gas, under a reduced pressure or under a protective layer capable of blocking oxygen, which are as follows for details.

The inert gas means general gases such as $N_2$, $H_2$ and $CO_2$, and rare gases such as He, Ne and Ar. Among these, $N_2$ is suitably utilized from the viewpoint of safety, easy availability and cost.

"Under a reduced pressure" indicates a state at 500 hPa or less, preferably 100 hPa or less.

Examples of the protective layer capable of blocking oxygen include polyvinyl ether/maleic anhydride polymer, water-soluble salts of carboxyalkyl cellulose, water-soluble cellulose ethers, water-soluble salts of carboxyalkyl starch, polyvinyl alcohol, polyvinylpyrrolidone, various types of polyacrylamides, various types of water-soluble polyamides, water-soluble salts of polyacrylic acid, gelatin, ethyleneoxide polymer, water-soluble salts of a group consisting of various types of starches and analogs thereof, copolymer of styrene/maleic acid, maleinate resin, and combinations of two or more types thereof, as described in JPA No. S46-2121 or JPB No. S56-40824. Among these, particularly preferred are a combination of polyvinyl alcohol and polyvinylpyrrolidone. A polyvinyl alcohol having a saponification ratio of 80% or more is preferred. The content of polyvinylpyrrolidone is preferably 1-75% by mass, more preferably 1-50% by mass, further preferably 10-40% by mass of the solid content of alkali-soluble resin layer.

The oxygen permeation coefficient of the protective layer capable of blocking oxygen thus prepared is preferably 75 $cm^3/m^2 \cdot day \cdot 100$ hPa or less, more preferably 50 $cm^3/m^2 \cdot day \cdot 1000$ hPa or less, most preferably 25 $cm^3/m^2$ day·100 hPa or less. When the oxygen permeation coefficient is more than 75 $cm^3/m^2 \cdot day \cdot 1000$ hPa, since oxygen can not be blocked efficiently, it becomes difficult to form the light-shielding barrier wall in an intended figure.

The height of the light-shielding barrier wall is, from the viewpoint of preventing color mixture, preferably 1-20 μm, more preferably 1.5-10 μm, further preferably 2-5 μm.

(Photosensitive Transfer Material for Forming Barrier Wall)

For realizing such light-shielding barrier wall easily and at low cost, there is such technique as using a photosensitive transfer material having at least a layer composed of a photosensitive deep color composition and an oxygen-blocking layer in this order on a temporary support. When such material is used, since the layer composed of the photosensitive deep color composition is protected by the oxygen-blocking layer, it lies automatically in a poor-oxygen atmosphere. Therefore, there is such advantage that the exposure process is not required to be carried out under an inert gas or reduced pressure, thereby making it possible to utilize the current process without change.

The photosensitive transfer material may have a thermoplastic resin layer according to need. Such thermoplastic resin layer is alkali-soluble, and constituted while including at least a resin component. The resin component preferably has a substantial softening point of 80° C. or less. The thermoplastic resin layer thus provided can serve to exert a good adhesiveness with a permanent support in a method for forming a light-shielding barrier wall described later.

Examples of the alkali-soluble thermoplastic resin having a softening point of 80° C. or less include a saponified product of ethylene/acrylic acid ester copolymer, a saponified product of styrene/(meth) acrylic acid ester copolymer, a saponified product of vinyl toluene/(meth)acrylic acid ester copolymer, and a saponified products of (meth)acrylic acid ester copolymer such as poly(meth)acrylic acid ester and butyl(meth) acrylate/vinyl acetate.

In the thermoplastic resin layer, suitably selected at least one type of the thermoplastic resin can be used. In addition, among organic polymers having a softening point of about 80° C. or less described in "Plastic Seino Binran (Handbook of Plastic Performance)" (edited by THE JAPAN PLASTICS INDUSTRY FEDERATION, ALL JAPAN PLASTIC MOLDING INDUSTRY FEDERATION, published by Kogyo Chosakai Publishing, Inc., Oct. 25, 1968), those soluble in an aqueous alkaline solution can be used.

Further, organic polymers having a softening point of more than 80° C. can also be used while lowering the substantial softening point to 80° C. or less by adding a plasticizer of various types to the organic polymer material, the plasticizer having compatibility with the polymer material. It is also possible to add a polymer of various types, supercooling material, adhesion-improving agent, surfactant, release agent or the like to these organic polymer materials for the purpose of controlling the adhesive force with the temporary support in such range that does not lead to a substantial softening point of more than 80° C.

Specific examples of the preferable plasticizer include polypropylene glycol, polyethylene glycol, dioctyl phthalate, diheptyl phthalate, dibutyl phthalate, tricresyl phosphate, cresyl diphenyl phosphate, and biphenyl diphenyl phosphate.

The temporary support for the photosensitive transfer material can be selected suitably from those that are chemically and thermally stable and composed of a flexible material. Specifically, a thin sheet of Teflon (registered trade mark), polyethylene terephthalate, polycarbonate, polyethylene, polypropylene or the like, or a laminate thereof is preferred. The thickness of the temporary support is suitably 5-300 μm, preferably 20-150 μm.

(Formation of Light-shielding Barrier Wall Utilizing Transfer Material)

Hereinafter, the instance of forming the light-shielding barrier wall while using a photosensitive transfer material will be described. A photosensitive transfer material, which is composed of a temporary support having a photosensitive deep color composition layer, an oxygen-blocking layer and a cover sheet on the oxygen-blocking layer provided on the support, is prepared. Firstly, the cover sheet is peeled off, then the exposed surface of the oxygen-blocking layer is stuck on a permanent support (substrate), which is passed through a laminator or the like to be heated, pressed and laminated (laminated body). As the laminator, one suitably selected from conventionally publicly known laminators, vacuum laminators etc. can be used. In order to enhance productivity further, an auto cut laminator can also be used.

Next, the photosensitive resin layer is separated from the temporary support to remove the temporary support. Then, above the surface from which the temporary support has been removed, an intended photomask is arranged, ultraviolet rays are irradiated from a light source, and, after the irradiation, it is subjected to a development treatment using a predetermined treatment liquid. As a developing liquid for use in the developing, a diluted aqueous solution of an alkaline material is used, and a developing liquid to which a small amount of water-miscible organic solvent is added may also be used. The light source for use in light irradiation includes a medium pressure-ultrahigh pressure mercury lamp, xenon lamp, metal halide lamp etc.

Examples of the suitable alkaline material include alkali metal hydroxides (e.g., sodium hydroxide, potassium hydroxide), alkali metal carbonates (e.g., sodium carbonate, potassium carbonate), alkali metal bicarbonates (e.g., sodium hydrogen carbonate, potassium hydrogen carbonate), alkali metal silicates (e.g., sodium silicate, potassium silicate), alkali metal metasilicates (e.g., sodium metasilicate, potassium metasilicate), triethanolamine, diethanolamine, monoethanolamine, morpholine, tetraalkylammoniumhydroxides (e.g., tetramethylammoniumhydroxide) and trisodium phosphate. The concentration of the alkaline material is preferably 0.01-30% by mass. pH is preferably 8-14.

Suitable examples of the "water-miscible organic solvent" include methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, ε-caprolactone, γ-butyrolactone, dimethylformamide, dimethylacetamide, hexamethylphosphoramide, ethyl lactate, methyl lactate, s-caprolactam, and N-methylpyrrolidone. The concentration of the water-miscible organic solvent is preferably 0.1-30% by mass. Further, a publicly known surfactant can also be added, whose concentration is preferably 0.01-10% by mass.

The developing liquid can be used as either a bath liquid or a spray liquid. When uncured portions of the photosensitive resin layer are to be removed, such method can be combined as scrubbing with a rotating brush or a wet sponge in the developing liquid. Usually, a preferable temperature of the developing liquid is from around room temperature to 40° C. The developing time depends on such conditions as the composition of the photosensitive resin layer, the alkalinity and temperature of the developing liquid, and, when an organic solvent is added, the type and concentration thereof, and it is usually around from 10 seconds to 2 minutes. A too short developing time may result in insufficient development of unexposed areas and, at the same time, insufficient absorbance of ultraviolet rays, and a too long developing time may result in etching of exposed areas. In both cases, it becomes difficult to make the shape of the light-shielding barrier wall suitable. It is also possible to carry out a washing step after the developing step. In the developing step, the shape of light-shielding barrier wall is formed as described above.

Then, to the voids of the light-shielding barrier wall that have been formed in the developing step, inks for a color filter for forming respective pixels of RGB etc. or a fluid for forming an optically anisotropic layer is penetrated. Before forming respective pixels, on this occasion, the shape of the light-shielding barrier wall may be stabilized. The means for stabilization is not particularly limited, and following ones can be mentioned. That is, 1) after the development, it is subjected to re-exposure (occasionally referred to as post-exposure), 2) after the development, it is subjected to heat treatment at a relatively low temperature, etc. The heat treatment mentioned here indicates heating a substrate having the light-shielding barrier wall in an electric furnace, dryer or the like, or irradiating the same with an infrared lamp.

The exposure amount during the above 1) step preferably ranges from 500 to 3000 mJ/cm$^2$, more preferably from 1000 to 2000 mJ/cm$^2$ under room air. In the case of a poor-oxygen atmosphere, an exposure with a lower exposure amount may be possible. The heating temperature during the above 2) step preferably ranges from around 50 to 120° C., and more preferably from around 70 to 100° C.; and the heating time preferably ranges from around 10 to 40 minutes. When the temperature is lower than 50° C., there is such fear that the curing of the light-shielding barrier wall may not proceed, and, when the temperature is higher than 120° C., there is such fear that the shape of the light-shielding barrier wall may break down.

[Second Optically Anisotropic Layer]

The liquid crystal display device may further comprise an unpatterned (solid) second optically anisotropic layer disposed inside or outside the liquid crystal cell. Various wavelength plates and various materials capable of reducing the coloration due to birefringence of a liquid crystal cell or capable of viewing-angle optical compensation may be used as the second optically anisotropic layer. Any laminations comprising tow or more optically anisotropic layers, having desired retardation as a whole, may be used as the second optically anisotropic layer. Examples of the optically anisotropic films to be used as the second optically anisotropic layer include birefringent films which are prepared by stretching polymer films such as polycarbonate films, norbornene base films, polyvinyl alcohol films, polystyrene films, polymethylmethacrylate films, olefin (e.g., polypropylene) films, polyarate films and polyamide films; oriented films formed of liquid crystal compounds such as liquid crystal polymers; and oriented liquid crystal layers supported by a substrate. Examples also include birefringent films subjected to biaxial stretching treatment or stretching treatment in the two directions being perpendicular to each other; and two-directions stretched films such as tilt-oriented films. A tilt-oriented film may be prepared by subjecting a polymer film to a stretching treatment and/or shrinkage treatment under a shrinkage force given by a heat shrinkage film adhering to the polymer film, or by stabilizing liquid crystal polymer in a tilt-aligning state.

Preferred examples of the second optically anisotropic layer include a transparent optically anisotropic film and a cellulose acylate film described hereinafter, which can exhibit excellent optical properties in combination with the first optically anisotropic layer described above.

<<Transparent Optical Anisotropic Film>>

The second optically anisotropic layers is preferably formed of one selected from transparent films having an in-plane retardation (Re) ranging from 20 to 250 nm and a thickness-direction retardation (Rth) ranging from 10 to 350 nm; and more preferably formed of one selected from transparent cellulose acylate or cyclo-olefin films having such properties.

In terms of effectively reducing light leakage from off-axial polarizing plates, the Re is preferably from 20 to 250 nm, and more preferably from 20 to 200 nm. In terms of effectively reducing light leakage in oblique directions, the Rth is preferably from 10 to 300 nm, and more preferably from 20 to 250 nm. Having the Re and Rth value falling within these ranges respectively, any optical monoaxial and biaxial transparent optically anisotropic films are preferably used as the second optically anisotropic layer.

The second optically anisotropic layer functioning as a positive A-plate is suitable for an IPS liquid crystal display devices, and may contribute to improving the contrast of the device. The preferable positive A-plate has an Re(550 nm) ranging from 40 to 250 nm, more preferably from 70 to 230 nm, and much more preferably from 100 to 180 nm. Its wavelength-dependency preferably satisfies the condition that Re(450 nm)/Re(550 nm) ranges from 0.6 to 1, more preferably from 0.65 to 0.95 and much more preferably from 0.7 to 0.9; and that Re(650 nm)/Re(550 nm) ranges from 1 to 1.3, more preferably from 1.01 to 1.25 and much more preferably from 1.02 to 1.23.

<<Cellulose Acylate Film with Small Re and Rth>>

The cellulose acylate film having small optical anisotropy (Re and Rth) is preferably used as the second optically anisotropic layer. In particular, the preferable cellulose acylate film has an in-plane retardation Re equal to or less than 10 nm at 630 nm ($0 \leq Re(630) \leq 10$), and a thickness retardation Rth ranging from -100 to 25 nm at 630 nm ($-100 \leq Rth(630) \leq 25$). More preferable cellulose acylate film has an Re(630) at 630 nm satisfying the condition of $0 \leq Re(630) < 5$ and an Rth at 630 nm satisfying the condition of $-60 \leq Rth(630) \leq 20$; and much more preferable cellulose acylate film has an Re at 630 nm satisfying the condition of $0 \leq Re(630) \leq 2$ and an Rth at 630 nm satisfying the condition of $-40 \leq Rth(630) \leq 15$.

Further, the cellulose acylate film having small wavelength-dependency is preferably used as the second optically anisotropic layer. In particular, the preferable cellulose acylate film has the wave-length dependency satisfying both conditions of $|Re(400)-Re(700)| \leq 10$ and $|Rth(400)-Rth(700)| \leq 35$. More preferable cellulose acylate film has the wavelength-dependency satisfying both conditions of $|Re(400)-Re(700)| \leq 5$ and $|Rth(400)-Rth(700)| \leq 25$; and much more preferable cellulose acylate film has the wavelength-dependency satisfying both conditions of $|Re(400)-Re(700)| \leq 3$ and $|Rth(400)-Rth(700)| \leq 15$.

By combining the patterned first optically anisotropic layer described above and the unpatterned second optically anisotropic layer having such optical properties, it is possible to provide members capable of effectively widening the viewing angle of the polarizing plates.

The cellulose acylate film having a small Re may be used as a protective film employed in the polarizing plate; and, in such embodiments, it is possible to reduce the thickness of the first optically anisotropic layer.

The cellulose acylate film maybe formed of cellulose acylate having at least two selected from an acetyl, propionyl and butanoyl in the place of OH of cellulose; and, among such embodiments, cellulose acylate films, having the total substitution degree ranging from 2.50 to 3.00, exhibit small optical anisotropy, and are preferable. The total substitution is more preferably from 2.60 to 3.00, and much more preferably from 2.65 to 3.00. Source cotton for cellulose acylate and methods of synthesis preferably applicable to the present invention can be found, for example, in Journal of Technical Disclosure (No. 2001-1745, p. 7-12, issued on Mar. 15, 2001 by JIII).

Two or more types of cellulose acylates may be used in combination for preparing the cellulose acylate film.

The cellulose acylate film may be produced by using cellulose acylate solution. Various additives such as agents capable of decreasing optical anisotropy, agents capable of controlling wavelength-dependency of optical properties such as Re and Rth, UV absorbers, plasticizers, anti-degradation agents, fine particles and agents capable of controlling optical properties may be added to the solution. The additives may be added to the solution at any stages, and may be added to the solution at the final stage of the process for preparing the solution.

The Preferable cellulose acylate film comprises at least one compound capable of lowering the thickness direction retardation Rth so as to satisfy the conditions (3) and (4) shown below.

$$(Rth_{(A)}-Rth_{(0)})/A \leq -1.0 \quad (3)$$

$$0.01 \leq A \leq 30 \quad (4)$$

In the (3) and (4) formulae, $Rth_{(A)}$ represents a thickness retardation Rth (nm) of a film containing a compound capable of lowering the Rth in an amount A %; $Rth_{(0)}$ represents a thickness retardation Rth (nm) of the film not containing a compound capable of lowering the Rth; and "A" represents the weight % of the compound with respect to the weight of the polymer material of the film.

The more preferable cellulose acylate film satisfies the conditions of (3-I) and (4-I) shown below.

$$(Rth_{(A)}-Rth_{(0)})/A \leq -2.0 \quad (3\text{-}I)$$

$$0.1 \leq A \leq 20 \quad (4\text{-}I)$$

Examples of the compound capable of lowering the Rth include those described in JPA No. 2006-30937.

A biaxial polymer film may be used as the second optically anisotropic layer. In terms of reducing light leakage in oblique directions, the $Re(\lambda)$ of the biaxial polymer film is preferably from 20 to 150 nm, more preferably from 40 to 115 nm, and much more preferably from 60 to 95 nm. In terms of reducing light leakage in oblique directions, the Nz value, defined as Nz=(nx−nz)/(nx−ny) based on in-plane refractive indexes nx and ny (nx>ny) and a thickness direction refractive index nz, of the polymer film is preferably from 1.5 to 7, and more preferably from 2.0 to 5.5, and much more preferably from 2.5 to 4.5.

Materials and configurations of the second optically anisotropic layer are not specifically limited, so far as they have the above-described optical characteristics. Any of a retardation film composed of a birefringent polymer film, a retardation film formed by coating and successively heating a polymer solution or a polymer-melt fluid, and a retardation film comprising a retardation layer formed by coating a composition containing a low-molecular-weight or high-molecular-weight liquid crystalline compound. These films may be used in a stacked manner.

The birefringent polymer film is preferably those excellent in controllability of birefringence, transparency, and heat resistance. Polymer materials applicable herein are not specifically limited so far as they can be a uniform biaxial film. Among those, the polymer materials, which can be a film by a solvent cast method or an extrusion method, are preferable; and preferred examples of the polymer material include norbornene-base polymer, polycarbonate-base polymer, polyallylate-base polymer, polyester-base polymer, aromatic polymers such as polysulfone-base polymer, cellulose acylate, and blended polymers containing two, three or more species of these polymers. Among others, use of cellulose acylate is preferable.

The biaxial orientation of a film may be obtained by subjecting a stretching treatment such as longitudinal stretching treatments using rolls, biaxial stretching treatments and transversal stretching treatments using tenters to a thermoplastic polymer film, which is produced according to any extrusion method or any solvent-casting method. The longitudinal stretching treatment may be carried out under a heating condition such as a condition using heating rolls, a condition under a heating atmosphere and a condition of combination thereof. The biaxial stretching treatment using tenters may be carried out according to a concurrent biaxial stretching manner using tenters and a sequential biaxial stretching manner using roll-tenters.

The preferable polymer film has fewer orientation unevenness and less retardation unevenness. The thickness of the film is not to be limited to any range, may be decided depending on its retardation, and, in general, in terms of thinning, is preferably from 1 to 300 μm, more preferably from 10 to 200 μm, and much more preferably from 20 to 150 μm.

Examples of the norbornenes include polymers of major norbornene base monomers such as tetracyclododecenes, dicyclopentadienes and methanotetrahydrofluorenes; and, in particular, ring-opened polymers of such norbornene base monomers, ring-opened copolymers of such norbornene base monomers and other copolymerizable monomers, addition polymers of norbornene base monomers, addition copolymers of norbornene base monomers and other copolymerizable monomers, and hydrogen additions thereof.

Among these, in terms of durability, mechanical strength or the like, hydrogen additions of ring-opened polymers of norbornene base monomers are preferable. The molecular weight of the norbornene base polymer, monocyclic olefin polymer, or cyclic conjugation diene polymer may be decided depending on the purpose, and, in general, is preferably from 5,000 to 500,000, more preferably from 8,000 to 200,000, and much more preferably from 10,000 to 100,000 as a polyisoprene or polystyrene equivalent molecular weight with gel permeation chromatography (GPC) measured using the cyclohexane solution (or the toluene solution when the polymer is not dissolved in cyclohexane), in terms of good balance between mechanical strength and molding property. Typical examples of the polymer include those described in JPA Nos. 2003-327800 and 2004-233604.

The acyl group of cellulose acylate may be selected from aliphatic or aromatic groups. Examples of it include alkylcarbonyl esters, alkenylcarbonyl esters, aromaticcarbonyl esters and aromatic alkylcarbonyl esters. And the acyl groups in the esters may have at least one substituent. The acyl group is preferably selected from groups having the number of carbon atoms equal to or less than 22. Preferably examples of the acyl group include the alkylcarbonyl group, having the number of carbon atoms equal to or less than 22, such as propionyl, butyloyl, velel, heptanoyl, octanoyl, decanoyl, dodecanoyl, tridecanoyl, hexadecanoyl and octadecanoyl; aryl carbonyl groups such as benzoyl and naphthaloyl; allyl carbonyl group such as acryl and methacryl; cinnamoyl groups. Preferable examples of cellulose acylate include cellulose acetate, cellulose acetate propionate, cellulose acetate butyrate, cellulose acetate stearate, and cellulose acetate benzoate. Regarding mixed esters, the ratio is not limited to any range, and, in general, the ratio of acetate is preferably equal to or more than 30 mole % with respect to the total esters.

Among those, cellulose acylates are preferred, and photographic grade cellulose acylates are more preferred. Commercially available cellulose acylates may be used. Examples of the commercially available cellulose acylates of photographic grade include LT-20, 30, 40, 50, 70, 35, 55, 105 or the like manufactured by Daicel Chemical Industries, Ltd; CAB-551-0.01, CAB-551-0.02, CAB-500-5, CAB-381-0.5, CAB-381-02, CAB-381-20, CAB-321-0.2, CAP-504-0.2, CAP-482-20, CA-398-3 or the like manufactured by Eastman Chemical; and products manufactured by Hoechst Ltd or the like. The additives such as plasticizer, surfactant, retardation controlling agent and UV absorber may be added to the cellulose acylate film, in terms of controlling mechanical and optical properties of the film. The details of such additives are described as JPA Nos. 2002-277632 and 2002-182215.

The polymer may be molded in a sheet or film shape according to any known method such as a heating melting molding method or a solution casting method. The heating melting molding methods may be divided into extrusion methods, press molding methods, inflation molding methods, injection molding methods, blow molding methods, stretching molding methods and the like. Among these, in terms of mechanical strength and surface uniformity, extrusion, inflation and press molding methods are preferred, and extrusion molding methods are more preferred. The conditions of during molding may be decided depending on the purpose or molding method, and, in general, the heating melting molding is preferably carried out at a cylinder temperature ranging from 100 to 400° C., and more preferably from 150 to 350° C. The thickness of the film or sheet is preferably from 10 to 300 μm, and more preferably from 30 to 200 μm.

The sheet or film may be subjected to a stretching treatment. The stretching treatment is preferably carried out along with at least one direction in a preferable stretching ratio ranging from 1.01 to 2 times at a temperature ranging from Tg−30° C. to Tg+60° C., more preferably from Tg−10° C. to Tg+50° C., where Tg is a glass transition temperature of the polymer material. When the film produced according to the extrusion method is subjected to a stretching treatment, the stretching direction is preferably set along with mechanical flow direction (extrusion direction). The stretching may be carried out according to a free-shrinkage monoaxial stretching method, width-fixed monoaxial stretching method, or biaxial stretching method. Controlling the optical properties of the film may be performed by adjusting the stretching ratio and heating temperature.

[Liquid Crystal Display Device]

Employing the patterned first optically anisotropic layer, and, if desired, the unpatterned second optically anisotropic layer, it is possible to provide a liquid crystal display device improved in viewing angle properties. Examples of the retardation plate (optical compensation sheet) to be employed in TN mode liquid crystal displays are described in JPA No. H 6-214116, U.S. Pat. Nos. 5,583,679 and 5,646,703 and German Patent No. 3911620A1. Examples of the retardation plate (optical compensation sheet) to be employed in IPS mode or FLC mode liquid crystal displays are described in JPA No. H10-54982. Examples of the retardation plate (optical compensation sheet) to be employed in OCB or HAN mode liquid crystal displays are described in U.S. Pat. No. 5,805,253 and Pamphlet of International Publication No. WO96/37804. Examples of the retardation plate (optical compensation sheet) to be employed in STN mode liquid crystal displays are described in JPA No. H9-26572. Examples of the retardation plate (optical compensation sheet) to be employed in VA mode liquid crystal displays are described in Japanese Patent No. 2866372.

The invention may adapt to various liquid crystal displays such as TN, IPS, FLC, OCB, STN, VA and HAN mode liquid crystal displays, and, especially, the invention is suitable for VA and IPS mode liquid crystal displays.

[VA Mode]

The liquid crystal displays of the invention may employ a VA mode. In terms of improvement of viewing angle properties, one preferable embodiment of the VA mode liquid crystal display comprises, as the first optically anisotropic layer, a layer prepared by stabilizing a cholesteric alignment of rod-like liquid crystal or a positive A-plate, and, as the second optically anisotropic layer, a negative-C-plate. The positive A-plate to be used as the first optically anisotropic layer is prepared by using rod-like liquid crystal of which Δn satisfies the wavelength—dependency conditions of the expressions (I) and (II) shown above. Another preferable embodiment of the VA mode liquid crystal display comprises, as the first optically anisotropic layer, a positive A-plate satisfying the relational expression, Re (red)>Re (Green)>Re (Blue), and, as a second optically anisotropic layer, a negative C-plate.

[IPS Mode]

The liquid crystal displays of the invention may employ an IPS mode. In terms of improvement of viewing angle properties, such the IPS mode liquid crystal display preferably comprise, as the first optically anisotropic layer, a positive C-plate or a negative A-plate, and, as the second optically anisotropic layer, a positive A-plate or a biaxial film. The positive C-plate to be used as the first optically anisotropic layer is preferably prepared by stabilizing a vertical alignment of rod-like liquid crystal, or may be prepared by using any rod-like liquid crystal of which Δn satisfies or doesn't satisfy the wavelength-dependency conditions of the expressions (I) and (II) shown above. The negative A-plate to be used as the first optically anisotropic layer is preferably prepared by stabilizing a vertical alignment of discotic liquid crystal. The positive A-plate to be used as the second optically anisotropic layer is preferably prepared by using a polymer film satisfying the relational expressions (III) and (Iv) below:

$$Re(450\ nm)/Re(550\ nm)<1 \tag{III}$$

$$Re(650\ nm)/Re(550\ nm)>1. \tag{Iv}$$

The preferable biaxial film to be used as the second optically anisotropic layer has an in-plane retardation (Re) value of not zero and gives substantially equal retardation values for light of a wavelength λ nm coming respectively in a direction rotated by +40° and in a direction rotated by −40° with respect to a normal direction of a layer plane using an in-plane slow axis as a tilt axis (a rotation axis).

Other preferable biaxial film to be used as the second optically anisotropic layer has an in-plane retardation (Re) value at 550 nm ranging from 20 to 150 nm, and an Nz value at 550 nm ranging from 1.5 to 7, provided that Nz is defined as Nz=(nx−nz)/(nx−ny) based on in-plane refractive indexes nx and ny (nx>ny) and a thickness direction refractive index nz.

EXAMPLES

Paragraphs below will more specifically describe the present invention referring to Examples. Any materials, reagents, amount and ratio of use and operations shown in Examples may appropriately be modified without departing from the spirit of the present invention. It is therefore understood that the present invention is by no means limited to specific Examples below.

Example 1

Method for Preparing Black Photosensitive Composition for Producing Barrier Wall A black photosensitive composition K1 was obtained by firstly weighing a K pigment dispersion 1 and propylene glycol monomethyl ether acetate in an amount listed in Table 1, which were mixed at a temperature of 24° C. (±2° C.) to be stirred at 150 RPM for 10 minutes, and then weighing methyl ethyl ketone, a binder 2, hydroquinone monomethyl ether, a DPHA liquid, 2,4-bis(trichloromethyl)-6-[4'-(N,N-diethoxycarbonylmethylami no)-3'-bromophenyl]-s-triazine and a surfactant 1 in an amount listed in Table 1, which were added in this order at a temperature of 25° C. (±2° C.) to be stirred at a temperature of 40° C. (±2° C.) at 150 RPM for 30 minutes. Here, the amount listed in Table 1 is in part by mass, and the detailed composition is as follows.

| <K Pigment Dispersion 1> | |
|---|---|
| Carbon black (Nipex 35, manufactured by Degussa) | 13.1% |
| Dispersant (undermentioned compound 1) | 0.65% |
| Polymer (random copolymer of benzyl methacrylate/methacrylic acid = 72/28 (mole ratio), weight: 37000) | 6.72% |
| Propylene glycol monomethyl ether acetate | 79.53% |

Compound 1

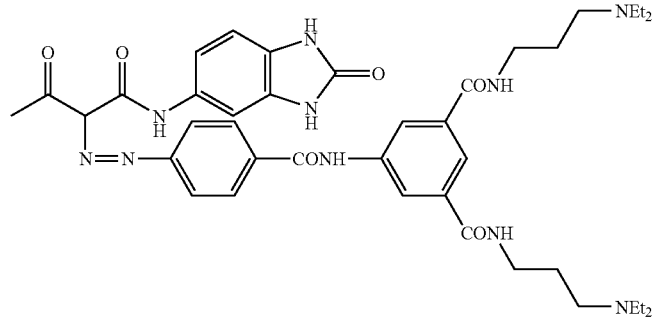

| <Binder 2> | |
|---|---|
| Polymer (random copolymer of benzyl methacrylate/methacrylic acid = 78/22 (mole ratio), molecular weight: 38000) | 27% |
| Propylene glycol monomethyl ether acetate | 73% |
| <DPHA liquid> | |
| Dipentaerythritol hexaacrylate (containing 500 ppm of polymerization inhibitor MEHQ, trade name: KAYARAD DPHA, manufactured by NIPPON KAYAKU CO., LTD.) | 76% |
| Propylene glycol monomethyl ether acetate | 24% |
| <Surfactant 1> | |
| Undermentioned Material 1 | 30% |
| Methyl ethyl ketone | 70% |

Material 1

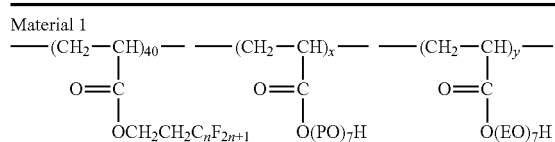

(n = 6, x = 55, y = 5, Mw = 33940, Mw/Mn = 2.55)
PO: propylene oxide
EO: ethylene oxide

TABLE 1

| | (Part by mass) |
|---|---|
| Black photosensitive resin composition | K1 |
| K Pigment Dispersion 1 (cabon black) | 5 |
| Propylene glycol monomethyl ether acetate | 8 |
| Methly ethyl ketone | 53 |
| Binder 2 | 9.1 |
| Hydroquinone monomethyl ether | 0.002 |
| DPHA liquid | 4.2 |
| 2,4-bis(trichloromethyl)-6-[4'-(N,N-diethoxy carbonylmethylamino)-3'-bromophenyl]-s-triazine | 0.16 |
| Surfactant 1 | 0.044 |

(Formation of Light-shielding Barrier Wall)

An alkali-free glass substrate was washed with a UV washing apparatus, followed by washing with a brush using a cleaning agent, and further subjected to ultrasonic cleaning with ultrapure water. The substrate was heat-treated at 120° C. for 3 minutes to stabilize the surface state.

The substrate was cooled and controlled at 23° C., on which the black photosensitive composition K1 having the composition listed in Table 1 was coated with a coater for a glass substrate having a slit-shaped nozzle (manufactured by F•A•S•Asia, trade name: MH-1600). Therewith, it was dried in VCD (vacuum drying apparatus, manufactured by Tokyo Ohka Kogyo Co., Ltd.) for 30 seconds to dry a part of the solvent and bring about the disappearance of flowability of the coated layer, then it was pre-baked at 120° C. for 3 minutes to give a black photosensitive layer K1 having a thickness of 10 μm.

Pattern exposure was carried out with a proximity type exposing apparatus provided with an ultrahigh pressure mercury lamp (manufactured by Hitachi High-Technologies Corporation) in such state that the substrate and a mask (quartz exposure mask having an image pattern) stood vertically, while setting the distance between the exposure mask surface and the black photosensitive layer K1 to 200 μm under a nitrogen atmosphere in an exposure amount of 300 mJ/cm$^2$.

Next, pure water was sprayed with a shower nozzle to wet uniformly the surface of the black photosensitive layer K1, then shower development was effected with a KOH-based developing liquid (containing KOH, nonionic surfactant, trade name: CDK-1, manufactured by FUJIFILM ELECTRONIC MATERIALS CO., LTD.) at 23° C. for 80 seconds at a flat nozzle pressure of 0.04 MPa to give a patterned image. Therewith, ultrapure water was jetted with an ultrahigh-pressure washing nozzle at a pressure of 9.8 MPa to remove residues, which was subjected to post-exposure under room air in an exposure amount of 2000 mJ/cm$^2$ to give a black barrier wall having an optical density of 3.9. On the surface of glass substrate, fine areas separated by the black barrier wall were formed.

(Preparation of Coating Liquid AL-1 for Alignment Layer)

The following composition was prepared, which was then filtered with a polypropylene filter having a pore diameter of 30 μm and used as a coating liquid AL-1 for an alignment layer.

| Composition of Coating Liquid for Alignment Layer (%) | |
|---|---|
| Polyvinyl alcohol (PVA205, manufactured by KURARAY CO., LTD.) | 3.21 |
| Polyvinyl pyrrolidone (Luvitec K30, manufactured by BASF) | 1.48 |
| Distilled water | 52.1 |
| Methanol | 43.21 |

(Preparation of Coating Liquid LC-R1 for Optically Anisotropic Layer)

The following composition was prepared, which was then filtered with a polypropylene filter having a pore diameter of 0.2 μm and used as a coating liquid LC-R1 for an optically anisotropic layer.

LC-1-1 was synthesized according to the method described in Tetrahedron Lett., vol. 43, page 6793 (2002). LC-1-2 was synthesized by the method described in EP 1388538 A1, page 21.

| Composition of Coating Liquid for Optically Anisotropic Layer (%) | |
|---|---|
| Rod-like liquid crystal (Paliocolor LC242, BASF Japan) | 28.62 |
| Chiral agent (Paliocolor LC756, BASF Japan) | 3.40 |
| 4,4'-Azoxydianisole | 0.52 |
| Horizontally aligning agent (LC-1-1) | 0.10 |
| Photopolymerization initiator (LC-1-2) | 1.36 |
| Methyl ethyl ketone | 66.0 |

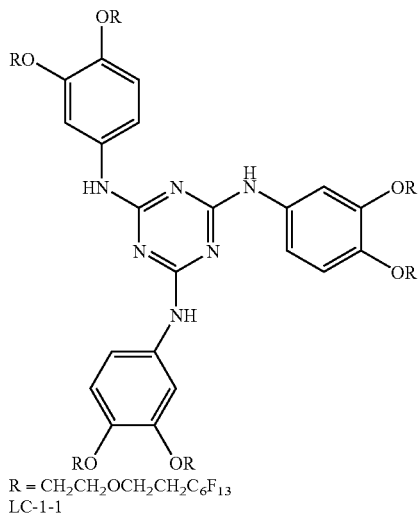

R = CH$_2$CH$_2$OCH$_2$CH$_2$C$_6$F$_{13}$
LC-1-1

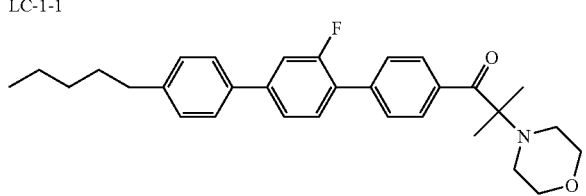

LC-1-2

(Preparation of Coating Liquid LC-G1 for Optically Anisotropic Layer)

The following composition was prepared, which was then filtered with a polypropylene filter having a pore diameter of 0.2 μm and used as a coating liquid LC-G1 for an optically anisotropic layer.

| Composition of Coating Liquid for Optically Anisotropic Layer (%) | |
|---|---|
| Rod-like liquid crystal (Paliocolor LC242, BASF Japan) | 28.38 |
| Chiral agent (Paliocolor LC756, BASF Japan) | 3.34 |
| 4,4'-Azoxydianisole | 0.27 |
| Horizontally aligning agent (LC-1-1) | 0.10 |
| Photopolymerization initiator (LC-1-2) | 1.34 |
| Methyl ethyl ketone | 66.57 |

Composition to be Used for Preparing a Color Filter

The formulations of the compositions to be used for preparing RGB images are shown in Table 2.

TABLE 2

| | PP-R1 | PP-G1 | PP-B1 |
|---|---|---|---|
| R pigment dispersion-1 | 44 | — | — |
| R pigment dispersion-2 | 5.0 | — | — |
| G pigment dispersion | — | 24 | — |
| CF Yellow EC3393 (from Mikuni Color Works, Ltd.) | — | 13 | — |
| CF Blue EX3357 (from Mikuni Color Works, Ltd.) | — | — | 7.2 |
| CF Blue EX3383 (from Mikuni Color Works, Ltd.) | — | — | 13 |
| propylene glycol monomethyl ether acetate (PGMEA) | 76 | 29 | 23 |
| methyl ethyl ketone | 37.412 | 25.115 | 35.78 |
| cyclohexanone | — | 1.3 | — |
| binder 1 | — | 2.9 | — |
| binder 2 | 0.7 | — | — |
| binder 3 | — | — | 16.9 |
| DPHA solution | 4.4 | 4.3 | 3.8 |
| 2-trichloromethyl-5-(p-styrylmethyl)-1,3,4-oxadiazole | 0.14 | 0.15 | 0.15 |
| 2,4-bis(trichloromethyl)-6-[4-(N,N-diethoxycarbonylmethyl)-3-bromophenyl]-s-triazine | 0.058 | 0.060 | — |
| phenothiazine | 0.010 | 0.005 | 0.020 |
| hydroquionone monomethyl ether | — | — | — |
| Hexafluoro antimonic acid triallyl sulfonium | 3.37 | 2.00 | 2.00 |
| HIPLAAD ED152 (from Kusumoto Chemicals) | 0.52 | — | — |
| Megafac F-176PF (from Dainippon Ink and Chemicals, Inc.) | 0.060 | 0.070 | 0.050 |

The formulations of the compositions listed in Table 2 are as follows.

[Formulation R Pigment Dispersion-1]

| Formulation of R Pigment Dispersion-1 (%) | |
|---|---|
| C.I. Pigment Red 254 | 8.0 |
| 5-[3-oxo-2-[4-[3,5-bis(3-diethyl aminopropyl aminocarbonyl)phenyl]aminocarbonyl]phenylazo]-butyroylaminobenzimidazolone | 0.8 |
| random copolymer of benzyl methacrylate/ methacrylic acid (72/28 by molar ratio, weight-average molecular weight = 37,000) | 8.0 |
| propylene glycol monomethyl ether acetate | 83.2 |

[Formulation of R Pigment Dispersion-2]

| Formulation of R Pigment Dispersion-2 (%) | |
|---|---|
| C.I. Pigment Red 177 | 18.0 |
| random copolymer of benzyl methacrylate/ | 12.0 |

-continued

| Formulation of R Pigment Dispersion-2 (%) | |
|---|---|
| methacrylic acid (72/28 by molar ratio, weight-average molecular weight = 37,000) | |
| propylene glycol monomethyl ether acetate | 70.0 |

[Formulation of G Pigment Dispersion]

| Formulation of G Pigment Dispersion (%) | |
|---|---|
| C.I. Pigment Green 36 | 18.0 |
| random copolymer of benzyl methacrylate/ methacrylic acid (72/28 by molar ratio, weight-average molecular weight = 37,000) | 12.0 |
| cyclohexanone | 35.0 |
| propylene glycol monomethyl ether acetate | 35.0 |

[Formulation of Binder 1]

| Formulation of Binder 1 (%) | |
|---|---|
| random copolymer of benzyl methacrylate/ methacrylic acid (78/22 by molar ratio, weight-average molecular weight = 40,000) | 27.0 |
| propylene glycol monomethyl ether acetate | 73.0 |

[Formulation of Binder 2]

| Formulation of Binder 2 (%) | |
|---|---|
| random copolymer of benzyl methacrylate/ methacrylic acid/methyl methacrylate (38/25/37 by molar ratio, weight-average molecular weight = 30,000) | 27.0 |
| propylene glycol monomethyl ether acetate | 73.0 |

[Formulation of Binder 3]

| Formulation of Binder 3 (%) | |
|---|---|
| random copolymer of benzyl methacrylate/methacrylic acid/methyl methacrylate(36/22/42 by molar ratio, weight-average molecular weight = 30,000) | 27.0 |
| propylene glycol monomethyl ether acetate | 73.0 |

[Formulation of DPHA]

| Formulation of DPHA Solution (%) | |
|---|---|
| KAYARAD DPHA (from Nippon Kayaku Co., Ltd.) | 76.0 |
| propylene glycol monomethyl ether acetate | 24.0 |

(Preparation of Liquid Composition PP-R1 for R Layer)

Liquid composition PP-R1 for an R layer was obtained first by weighing R pigment dispersion-1, R pigment dispersion-2 and propylene glycol monomethyl ether acetate according to the amounts listed in the Table 2 respectively, mixing them at 24° C. (±2° C.), stirring the mixture at 150 rpm for 10 minutes, weighing methyl ethyl ketone, binder 2, DPHA solution, 2-trichloromethyl-5-(p-styrylstyryl)-1,3,4-oxadiazole, 2,4-bis (trichloromethyl)-6-[4-(N,N-diethoxy carbonylmethyl)-3-bromophenyl]-s-triazine and phenothiazine according to the amounts listed in Table 2, adding them in this order at 24° C. (±2° C.), stirring the mixture at 150 rpm for 10 minutes, weighing ED152 according to the amount listed in Table 2, adding it at 24° C. (±2° C.), stirring the mixture at 150 rpm for 20 minutes, weighing Megafac F-176PF according to the amount listed in Table 2, adding it at 24° C. (±2° C.), stirring the mixture at 30 rpm for 30 minutes, and filtering the mixture through a #200 nylon mesh.

(Preparation of Liquid Composition PP-G1 for G Layer)

Liquid composition PP-G1 for a G layer was obtained first by first weighing G pigment dispersion, CF Yellow EX3393 and propylene glycol monomethyl ether acetate according to the amounts listed in Table 2, mixing them at 24° C. (±2° C.), stirring the mixture at 150 rpm for 10 minutes, then weighing methyl ethyl ketone, cyclohexanone, binder 1, DPHA solution, 2-trichloromethyl-5-(p-styrylstyryl)-1,3,4-oxadiazole, 2,4-bis (trichloromethyl)-6-[4-(N,N-diethoxy carbonylmethyl)-3-bromophenyl]-s-triazine and phenothiazine according to the amounts listed in Table 2, adding them in this order at 24° C. (±2° C.), stirring the mixture at 150 rpm for 30 minutes, then weighing Megafac F-176 PF according to the amount listed in Table 2, adding it at 24° C. (±2° C.), stirring the mixture at 30 rpm for 5 minutes, and filtering the mixture through a #200 nylon mesh.

(Preparation of Liquid Composition PP-B1 for B Layer)

Liquid composition PP-B1 for a B layer was obtained first by weighing CF Blue EX3357, CF Blue EX3383 and propylene glycol monomethyl ether acetate according to the amounts listed in Table 2, mixing them at 24° C. (±2° C.), stirring the mixture at 150 rpm for 10 minutes, then weighing methyl ethyl ketone, binder 3, DPHA solution, 2-trichloromethyl-5-(p-styrylstyryl)-1,3,4-oxadiazole, and phenothiazine according to the amounts listed in Table 2, adding them in this order at 25° C. (±2° C.), stirring the mixture at 40° C. (±2° C.) at 150 rpm for 30 minutes, then weighing Megafac F-176 PF according to the amount listed in Table 1, adding it at 24° C. (±2° C.), stirring the mixture at 30 rpm for 5 minutes, and filtering the mixture through a #200 nylon mesh.

(Preparation of Coating Liquid LC-B1 for Optically Anisotropic Layer)

The following composition was prepared, which was then filtered with a polypropylene filter having a pore diameter of 0.2 μm and used as a coating liquid LC-B1 for an optically anisotropic layer.

| Composition of Coating Liquid for Optically Anisotropic Layer (%) | |
|---|---|
| Rod-like liquid crystal (Paliocolor LC242, BASF Japan) | 28.72 |
| Chiral agent (Paliocolor LC756, BASF Japan) | 3.36 |
| 4,4'-Azoxydianisole | 0.03 |
| Horizontally aligning agent (LC-1-1) | 0.10 |
| Photopolymerization initiator (LC-1-2) | 1.34 |
| Methyl ethyl ketone | 66.45 |

(Production of Alignment Layer)

Droplets of the coating liquid AL-1 for an alignment layer obtained above were ejected into concave portions (fine areas) surrounded by the light-shielding barrier wall using a head of piezo system, which was then dried. The alignment layer had a thickness of 1.6 μm. Therewith, the formed alignment layer was subjected to rubbing treatment.

(Production of Optically Anisotropic Layer)

As an optically anisotropic layer R-1 for R, a layer having a uniform liquid crystal phase was formed by ejecting droplets of the coating liquid LC-R1 for an optically anisotropic layer obtained above into concave portions (fine areas) having the alignment layer AL-1 surrounded by the light-shielding barrier wall using a head of piezo system and then heating, drying and aging the same at 95° C. for 2 minutes. Further, just after the aging, the layer was irradiated with a polarized UV (illuminance 200 mW/cm$^2$, irradiance level: 200 mJ/cm$^2$) generated by setting the transmission axis of a polarizing plate so as to be the TD direction of the transparent substrate under a nitrogen atmosphere of an oxygen concentration of 0.3% or less to stabilize the optically anisotropic layer, thereby forming the optically anisotropic layer having a thickness of 2.8 μm.

Optically anisotropic layers G-1, B-1 for G, B were formed in the similar way except for ejecting LC-G1 and LC-B1 in place of LC-R1, respectively. Optically anisotropic layers G-1 and B-1 had respective thicknesses of 2.75 μm and 2.3 μm.

In this Example, droplets of respective coating liquids for optically anisotropic layer were ejected into concave portions (fine areas) corresponding to intended R, G and B in portions corresponding to respective pixels of R, G, B by controlling the transfer speed and drive frequency.

(Production of Color Filter Layer)

Droplets of liquids for forming R, G and B layers, PP-R1, PP-G1 and PP-B1 respectively obtained above were ejected as below into concave portions surrounded by the light-shielding barrier wall using a head of piezo system.

The head had 318 nozzles in a nozzle density of 150 per 25.4 mm. Two of the head were fixed while dislocating respective positions in ½ of the nozzle distance in the nozzle line direction, which allowed droplets to be ejected in 300 per 25.4 mm onto the substrate in the nozzle arrangement direction. The head and ink were controlled so that the temperature near the ejecting portion was 40±0.5° C. by circulating warm water into the head.

The ink ejection from the head was controlled by the piezo driving signal given to the head making it possible to eject 6-42 μl per one droplet. In this Example, droplets were ejected from the head while transferring the glass substrate lying at a position of 1 mm below the head. The transfer speed could be set in a range of 50-200 mm/s. In addition, the piezo drive frequency was possible up to 4.6 KHz, and, by setting these, the amount of ejected droplets could be controlled.

In this Example, respective liquids for forming R, G and B layers, PP-R1, PP-G1 and PP-B1 were ejected into concave portions corresponding to intended R, G and B so that coating amount of respective pigments, R, G and B were 1.1, 1.8, 0.75 g/m$^2$ in portions corresponding to respective pixels of R, G, B, by controlling the transfer speed and drive frequency.

After that, it was dried at 100° C., and further subjected to thermal treatment at 240° C. for 1 hour to form color filter pixels on the optically anisotropic layer.

(Measurement of Retardation)

By a parallel nicol method using a fiber type spectrometer, the front retardation Re(0) and retardations Re(40) and Re(−40), which are defined as retardations when an sample is inclined in ±40 degrees, respectively, while taking the slow phase axis as a rotation axis, at an arbitrary wavelength λ were measured. For R, G, B, respective retardations were measured at λ of 611 nm, 545 nm, 435 nm. As to the retardation of the optically anisotropic layer of the invention, by calibrating with the transmittance data of a substrate having no optically anisotropic layer that had been measured previously, only the retardation of the optically anisotropic layer was given. Results of the retardation measurement are shown in Table 3.

TALE 3

| Sample | Re(0) | Re(40) | Re(−40) (nm) |
|---|---|---|---|
| R-1 | 19.0 | 50.2 | 50.8 |
| G-1 | 33.0 | 67.0 | 67.1 |
| B-1 | 48.5 | 86.9 | 87.1 |

(Formation of Transparent Electrode)

On the color filter produced above, a transparent electrode film (film thickness: 2000 Å) was formed by sputtering of ITO.

(Formation of Alignment Layer and Formation of Liquid Crystal Cell)

Additionally, an alignment film of polyimide was provided thereon. Next, glass beads having a particulate diameter of 5 μm were spread. Further, a sealing agent of epoxy resin containing spacer particles was printed onto the position corresponding to the outer frame of the black matrix provided around the pixel group of the color filter, and the color filter plate was adhered with a facing substrate at a pressure of 10 kg/cm. Then, the adhered glass substrates were heat-treated at 150° C. for 90 minutes to cure the sealing agent, thereby giving a laminate of two glass substrates. The glass substrate laminate was degassed under vacuum. Then, the pressure was returned to atmospheric pressure, and liquid crystal was injected into the gap between the two glass substrates to give a liquid crystal cell. On both surfaces of the liquid crystal cell, polarizing plates HLC2-2518 manufactured by SANRITZ CORPORATION were adhered.

(Production of VA-LCD)

As a cold-cathode tube backlight for a color liquid crystal display device, a three—wavelength fluorescent lamp for white light having an arbitrary hue was produced by using a fluorescent material composed of a mixture of $BaMg_2Al_{16}O_{27}$:Eu, Mn and $LaPO_4$:Ce, Tb at a weight ratio of 50:50 for green (G), $Y_2O_3$:Eu for red (R), and $BaMgAl_{10}O_{17}$:Eu for blue (B). On the backlight, the liquid crystal cell arranged with the polarizing plate was disposed to produce a VA-LCD.

(Production of VA-LCD of Comparative Example 1)

A VA-LCD of Comparative Example 1 was produced in a way similar to that in Example, except that optically anisotropic layers R-1, G-1, B-1 were omitted, and that, instead, an optically anisotropic layer having a thickness of 2.75 μm was formed using AL-1 and LC-G1 on the liquid crystal cell side protective film of the downside polarizing plate in a way similar to that of producing the optically anisotropic layer of G-1.

(Evaluation of VA-LCD)

Figure 4:
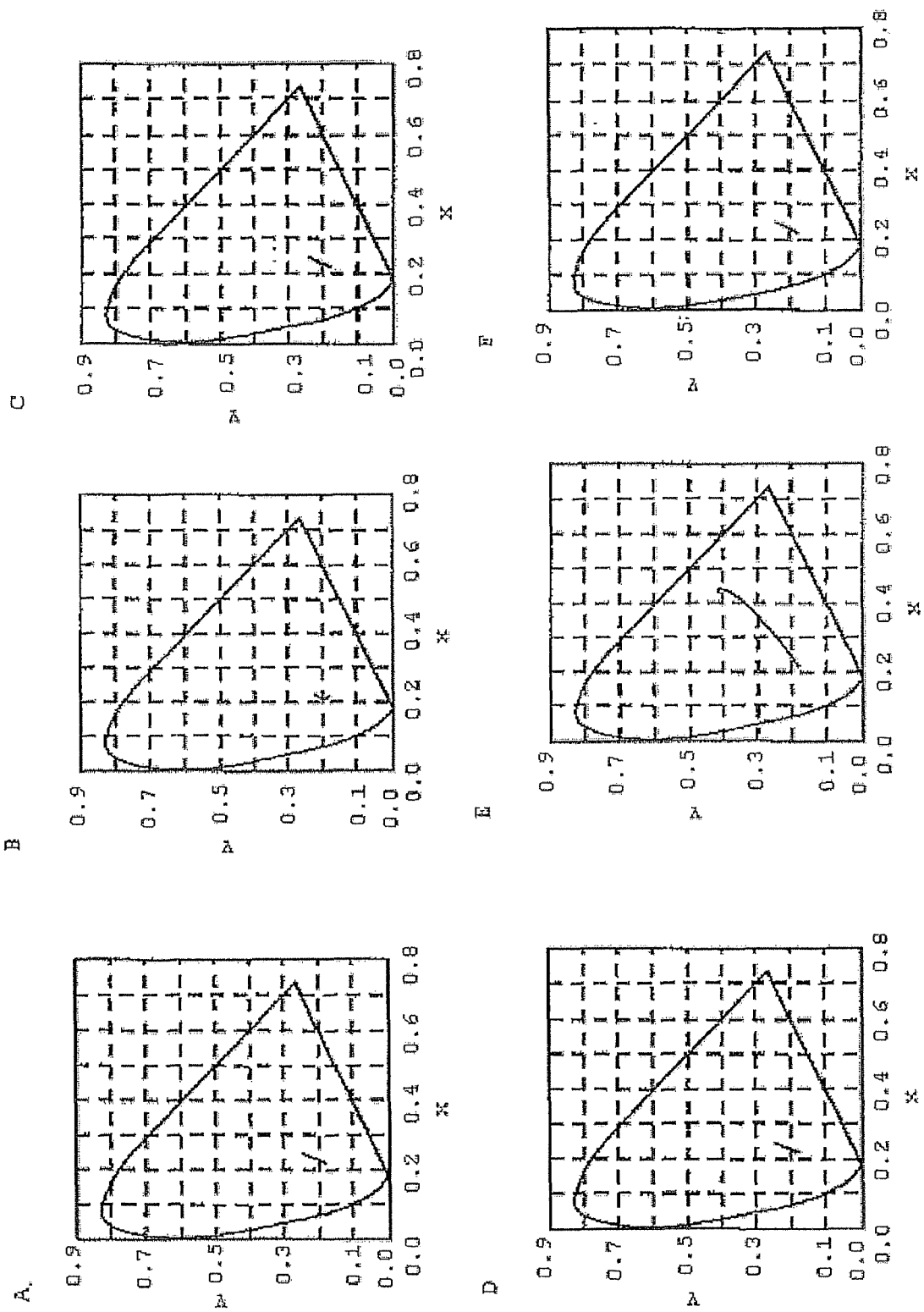
FIGS. 4A-F are drawings showing the viewing angle properties of color, of VA-LCDs produced in Example and Comparative Example.

The viewing angle property of the produced liquid crystal display device was measured with a viewing angle-measuring apparatus (EZ Contrast 160D, manufactured by ELDIM). For Example and Comparative Example, FIG. 4 shows the hue alteration on the xy chromaticity diagram when the viewing angle was changed from the front of LCD toward the right direction, upper right direction at 45 degrees, and upper direction by 0-80 degrees in the black state (no voltage application).

FIGS. 4A, 4B and 4C show the hue alteration of Example 1 on the xy chromaticity diagram when the viewing angle was changed from the front of LCD toward the right direction, upper right direction at 45 degrees and upper direction by 0-80 degrees in the black state (no voltage application).

FIGS. 4D, 4E and 4F show the hue alteration of Comparative Example 1 on the xy chromaticity diagram when the viewing angle was changed from the front of LCD toward the right direction, upper right direction at 45 degrees and upper direction by 0-80 degrees in the black state (no voltage application).

In Table 4, the visually evaluated results for the upper right direction at 45 degree were shown.

TABLE 4

| Sample | Visually evaluated result |
|---|---|
| Example 1 | Viewing angle property of contrast was good, little color shift in the black state was observed. |
| Comparative Example 1 | Viewing angle property of contrast was almost the same as that in Example 1, but coloring was observed in oblique directions. |

Example 2

Preparation of Coating Liquid LC-2 for Optically Anisotropic Layer

A coating liquid LC-2 was prepared in the same manner as the coating liquid LC-R1 used in Example 1, except that a rod-like liquid crystal compound (2) shown below was used in the place of Paliocolor LC242, a polymerization initiator (LC-2-2) shown below was used in the place of the polymerization initiator (LC-1-2), chloroform was used in the place of methylethyl ketone, and neither the chiral agent nor 4,4'-azoxydianisole was used.

1000 mJ/cm$^2$) under a nitrogen atmosphere of an oxygen concentration of 0.3% or less to stabilize the optically anisotropic layer, thereby forming an optically anisotropic layer RET-2 having a thickness of 2.9 μm.

(Measurement of Δn)

Optical anisotropic property of the optically anisotropic layer RET-2 was measured by using an automatic birefringence meter (KOBRA-21ADH from Oji Scientific Instruments). And Δn values were calculated based on the obtained value and the thickness of the layer. The obtained values are shown in the following Table 5.

TABLE 5

| Coating Fluid for RET-2 | Δn(450 nm)/Δn(550 nm) | Δn(650 nm)/Δn(550 nm) |
|---|---|---|
| LC-2 | 0.788 | 1.065 |

The color filter, the transparent electrode were produced in the same manner as Example 1.

(Formation of Alignment Layer and Formation of Liquid Crystal Cell)

Additionally, an alignment film of polyimide was provided thereon. Next, glass beads having a particulate diameter of 5 μm were spread. Further, a sealing agent of epoxy resin containing spacer particles was printed onto the position corresponding to the outer frame of the black matrix provided around the pixel group of the color filter, and the color filter plate was adhered with a facing substrate at a pressure of 10

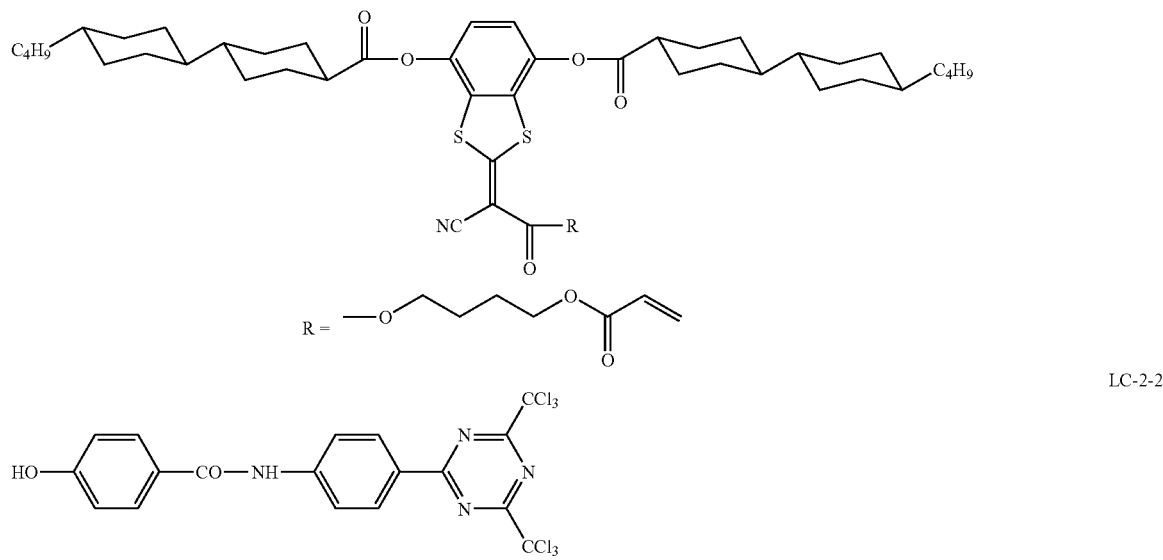

Rod-like liquid crystal compound (2)

LC-2-2

(Preparation of Optically Anisotropic Layer)

As optically anisotropic layers for R G and B, layers having a uniform liquid crystal phase were formed, in the similar manner as Examples 1, by ejecting droplets of the coating liquid LC-2 obtained above into concave portions (fine areas) having the alignment layer AL-1 surrounded by the light-shielding barrier wall corresponding R, G and B layer respectively, using a head of piezo system and then heating, drying and aging the same at 140° C. for 2 minutes.

Further, just after the aging, the layer was irradiated with a polarized UV (illuminance 200 mW/cm$^2$, irradiance level:

kg/cm. Then, the adhered glass substrates were heat-treated at 150° C. for 90 minutes to cure the sealing agent, thereby giving a laminate of two glass substrates. The glass substrate laminate was degassed under vacuum. Then, the pressure was returned to atmospheric pressure, and liquid crystal was injected into the gap between the two glass substrates to give a liquid crystal cell. To a surface of the liquid crystal cell, polarizing plate HLC2-5618 manufactured by SANRITZ CORPORATION was adhered as an upper (observer side) polarizing plate; and to another surface, polarizing plate HLC2-2518 manufactured by SANRITZ CORPORATION was adhered as a lower (backlight side) polarizing plate (Production of VA-LCD)

As a cold-cathode tube backlight for a color liquid crystal display device, a three-wavelength fluorescent lamp for white light having an arbitrary hue was produced by using a fluorescent material composed of a mixture of $BaMg_2Al_{16}O_{27}$: Eu, Mn and $LaPO_4$:Ce, Tb at a weight ratio of 50:50 for green (G), $Y_2O_3$:Eu for red (R), and $BaMgAl_{10}O_{17}$:Eu for blue (B). On the backlight, the liquid crystal cell arranged with the polarizing plate was disposed to produce a VA-LCD.

Example 3

A VA mode liquid crystal display was produced in the same manner as Example 2, except that optically anisotropic layers R-3, G-3 and B-3 were produced by using a coating liquid LC-3 which was prepared in the same manner as the coating liquid LC-2 except that a rod-like liquid crystal compound shown below was used in the place of the liquid crystal compound (2) shown above. The thicknesses of the optically anisotropic layers R-3, G-3 and B-3 were 1.6 μm, 1,4 μm and 1.1 μm respectively.

crystal compound (1I-38) and (LC-4-1) shown below were used in the place of the rod-like liquid crystal compound (2), "Irgacure 819" manufactured by Ciba-Geigy) was used as a polymerization initiator, a compound (LC-4-2) shown below was used as an additive, and a polyimide alignment layer was used. And then, a VA-LCD of Example 4 was produced in the same manner as Example 2.

The process is more specifically described hereinafter.

The 15% chloroform solution was applied to a rubbed surface of the polyimide alignment layer supported by a glass substrate according to a spin coating method, to form a liquid crystal layer. The liquid crystal layer was heated at a substrate temperature of 110° C., cooled by 77° C. at 5° C./min n optically anisotropic layer, irradiated with 1000 mJ/cm² UV under an atmosphere of an oxygen concentration of 5% or less to stabilize the liquid crystal layer, to form an optically anisotropic layer. Under Polarization microscopic observation, it

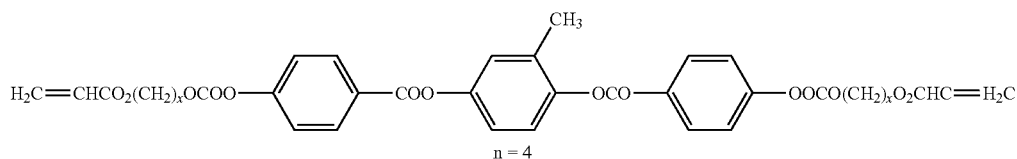
n = 4
Rod-like liquid crystal compound described in JPA No. 2006-64858 in [0089]

Example 4

A coating liquid was prepared in the same manner as the coating liquid LC-2 in Example 2, except that a rod-like liquid was found that the optically anisotropic layer was free from defects and, molecules in the layer were aligned uniformly. The thicknesses of the optically anisotropic layers R-4, G-4 and B-4 were 0.95 μm, 0.81 μm and 0.66 μm respectively.

(II-38)

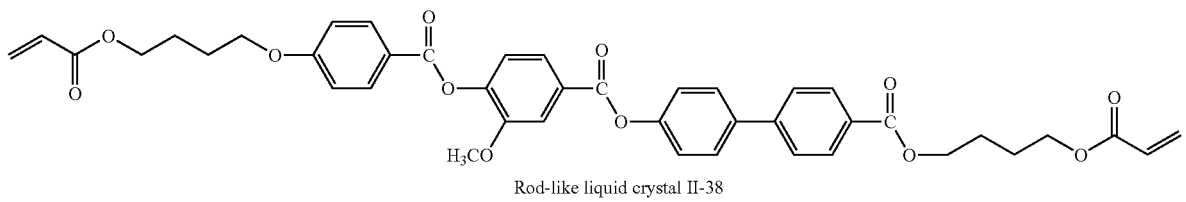
Rod-like liquid crystal II-38

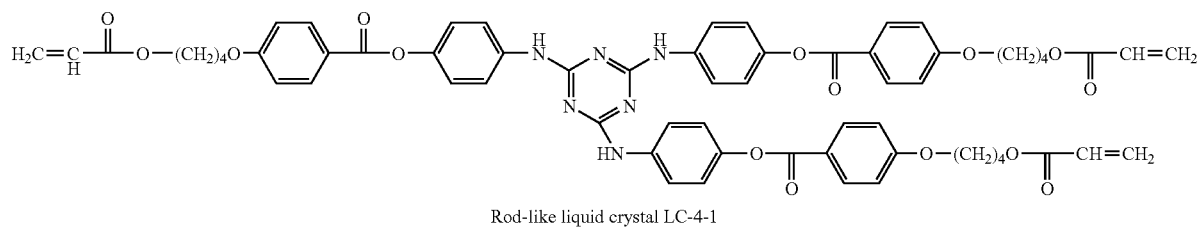
Rod-like liquid crystal LC-4-1

-continued

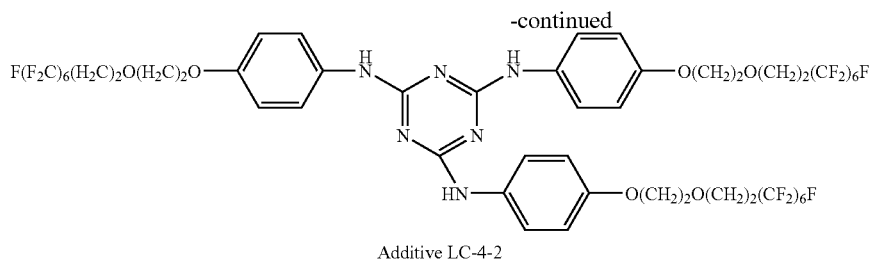

Additive LC-4-2

(Evaluation of VA-LCD)

The black states provided by the VA-LCDs of Example 2, 3 and 4 in the black state were observed in the oblique direction at an azimuthal angle of 45 degree and a polar angle of 60 degree. The color shifts of the VA-LCDs between the directions at an azimuthal angle of 45 degree and a polar angle of 60 degree and at an azimuthal angle of 180 degree and a polar angle of 60 degree.

It was found that the VA-LCDs produced in Example 2, 3 provided and 4 neutral black states in the normal and oblique directions.

Example 5

Preparation of Coating Liquid LC-3 for Optically Anisotropic Layer)

The composition having the formulation shown below was prepared and filtered with polypropylene filter having a 0.2 μm pore size to obtain a coating liquid LC-5.

| Formulation of Coating liquid LC-5 (5) | |
|---|---|
| Rod-like liquid crystal compound I-2 shown below | 28.0 |
| Onium Salt (58) described in JPA No. 2006-106662 | 0.57 |
| Agent capable of promoting vertical alignment at air-interface (P-27) described in JPA No. 2006-106662 | 0.15 |
| Photo-polymerization initiator (LC-2-2) shown above | 1.36 |
| Methyl ethyl ketone | 69.92 |

Rod-like liquid crystal compound I-2
I-2

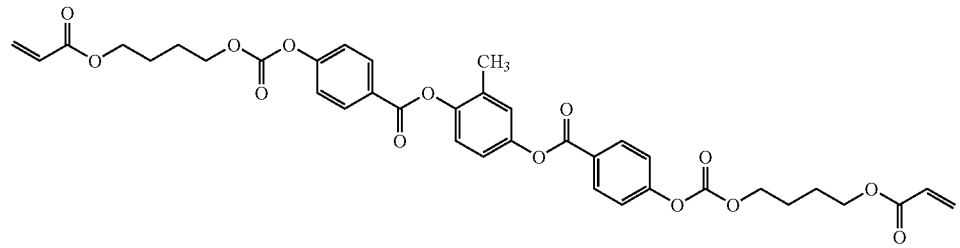

Onium salt (58)

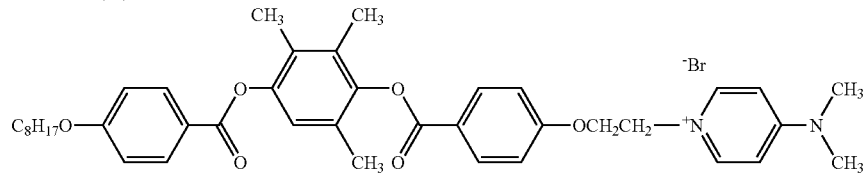

Agent capable of promoting vertical alignment at air-interface (P-27)

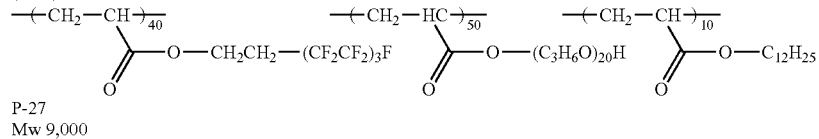

P-27
Mw 9,000

(Production of Alignment Layer)

Droplets of the coating liquid AL-1 for an alignment layer obtained above were ejected into concave portions (fine areas) surrounded by the light-shielding barrier wall using a head of piezo system, which was then dried. The alignment layer had a thickness of 1.6 μm.

(Production of First Optically Anisotropic Layer)

As an optically anisotropic layer R-5 for R, a layer having a uniform liquid crystal phase was formed by ejecting droplets of the coating liquid LC-5 for an optically anisotropic layer obtained above into concave portions (fine areas) having the alignment layer AL-1 surrounded by the light-shielding barrier wall using a head of piezo system and then heating, drying and aging the same at 95° C. for 2 minutes. Further, just after the aging, the layer was irradiated with a polarized UV (illuminance 200 mW/cm$^2$, irradiance level: 1000 mJ/cm²) under a nitrogen atmosphere of an oxygen concentration of 0.3% or less to stabilize the liquid crystal phase, thereby forming the optically anisotropic layer having a thickness of 1.26 μm.

Optically anisotropic layers G-5, B-5 for G, B were formed in the similar way. Optically anisotropic layers G-5 and B-5 had respective thicknesses of 1.07 μm and 0.85 μm.

In this Example, droplets of respective coating liquids for optically anisotropic layer were ejected into concave portions (fine areas) corresponding to intended R, G and B in portions corresponding to respective pixels of R, G, B by controlling the transfer speed and drive frequency.

(Production of Color Filter Layer)

Droplets of liquids for forming R, G and B layers, PP-R1, PP-G1 and PP-B1 respectively obtained above were ejected as below into concave portions surrounded by the light-shielding barrier wall using a head of piezo system.

The head had 318 nozzles in a nozzle density of 150 per 25.4 mm. Two of the head were fixed while dislocating respective positions in ½ of the nozzle distance in the nozzle line direction, which allowed droplets to be ejected in 300 per 25.4 mm onto the substrate in the nozzle arrangement direction. The head and ink were controlled so that the temperature near the ejecting portion was 40±0.5° C. by circulating warm water into the head.

The ink ejection from the head was controlled by the piezo driving signal given to the head making it possible to eject 6-42 pl per one droplet. In this Example, droplets were ejected from the head while transferring the glass substrate lying at a position of 1 mm below the head. The transfer speed could be set in a range of 50-200 mm/s. In addition, the piezo drive frequency was possible up to 4.6 KHz, and, by setting these, the amount of ejected droplets could be controlled.

In this Example, respective liquids for forming R, G and B layers, PP-R1, PP-G1 and PP-B1 were ejected into concave portions corresponding to intended R, G and B so that coating amount of respective pigments, R, G and B were 1.1, 1.8, 0.75 g/m² in portions corresponding to respective pixels of R, G, B, by controlling the transfer speed and drive frequency.

After that, it was dried at 100° C., and further subjected to thermal treatment at 240° C. for 1 hour to form color filter pixels on the first optically anisotropic layer.

It was found that the mean tilt angle of rod-like molecules in the layer corresponding to each R, G and B area was 89.90 degree, and the rod-like molecules were aligned vertically relative to the substrate. The retardation values of the R-5, G-5 and B-5 corresponding R, G and B areas respectively were measured. The results are shown in Table 6.

TABLE 6

|  | B-5 | G-5 | R-5 | (nm) |
|---|---|---|---|---|
| Re | 0 | 0 | 0 |  |
| Rth | −92 | −118 | −125 |  |

(Production of IPS Mode Liquid Crystal Cell)

A polyimide layer was formed on another surface of the glass substrate and subjected to a rubbing treatment to form an alignment layer.

Figure 5:
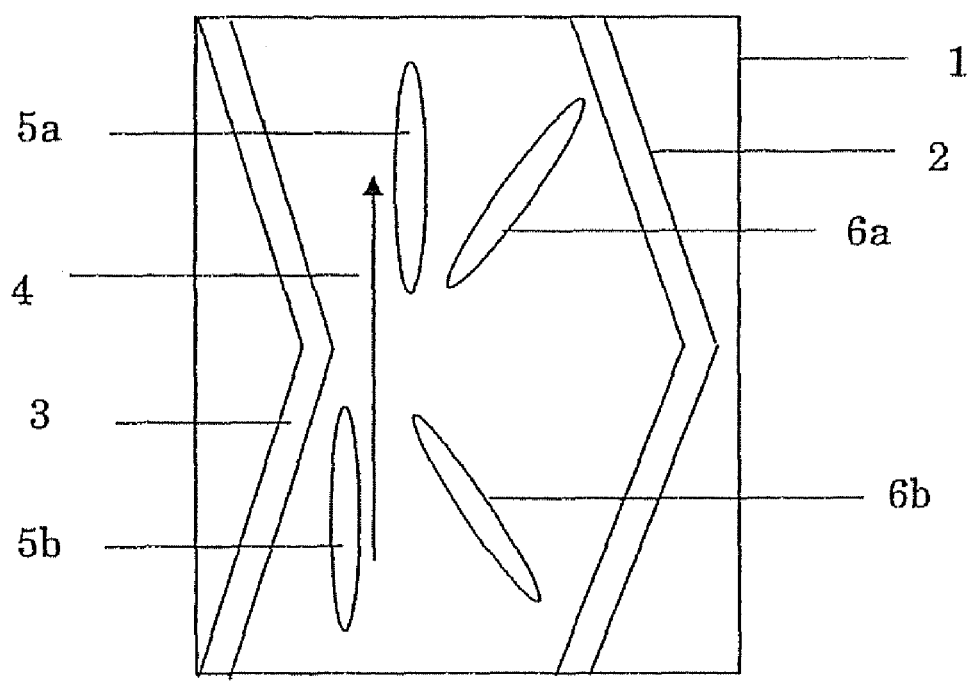
FIG. 5 is a schematic drawing showing an exemplary pixel area of a liquid crystal display produced in Examples.

Another glass substrate was prepared, and on the glass substrate, as shown in FIG. 5, the electrodes (reference numerals 2 and 3 in FIG. 5) were provided so as to adjust the distance between the adjacent electrodes to 20 μm, thereon a polyimide film was provided as the alignment film, and rubbed. The rubbing treatment was carried out along with the direction 4 shown in FIG. 5. Two glass substrates were stacked and bonded, while opposing the individual alignment films with each other, keeping a 3.9-μm distance (gap; d) therebetween, and aligning the direction of rubbing of two glass substrates in parallel with each other, and a nematic liquid crystal composition having a refractive index anisotropy ($\Delta n$) of 0.0769 and a dielectric constant anisotropy ($\Delta \in$) of 4.5 in positive was then filled with the space between the substrates. The liquid crystal layer was found to have a d·$\Delta n$ value of 300 nm.

In FIGS. 5, 5a and 5b are directors of liquid crystal molecules in the black state; and 6a and 6b are directors of liquid crystal molecules in the white state.

(Preparation of Optically Anisotropic Film B-1)

<Preparation of Cellulose Acetate Solution>

The ingredients shown below were put into a mixing tank, stirred for 6 hours so as to be dissolved, to thereby prepare a cellulose acetate solution A.

| Cellulose Acetate Solution A | |
|---|---|
| Cellulose acetate with acetification degree of 2.86 | 100.0 parts by mass |
| Methylene chloride (first solvent) | 402.0 parts by mass |
| Methanol (second solvent) | 60.0 parts by mass |

<Preparation of Matting Agent Dispersion>

Silica particle having a mean particle size of 16 nm (Aerosil R972 from Nippon Aerosil Co., Ltd.) of 20 parts by mass and methanol of 80 parts by mass were mixed under stirring for 30 minutes to form a silica dispersion. The dispersion was put into a disperser together with the composition shown below, stirred for 30 minutes so as to be dissolved, to thereby prepare a matting agent dispersion.

| <Formulation of Matting Agent Dispersion> | |
|---|---|
| Dispersion of Silica particle having a mean particle size of 16 nm | 10.0 parts by mass |
| Methylene chloride (first solvent) | 76.3 parts by mass |
| Methanol (second solvent) | 3.4 parts by mass |
| Cellulose acetate solution A | 10.3 parts by mass |

<Preparation of Additive solution>

The ingredients shown below were put into a mixing tank, stirred for 6 hours so as to be dissolved, to thereby prepare an additive solution.

| <Formulation of Additive Solution> | |
|---|---|
| Compound capable of lowering optical anisotropy (A-01) | 49.3 parts by mass |
| Agent for controlling wavelength dependency (UV-01) | 7.6 parts by mass |
| Methylene chloride (first solvent) | 58.4 parts by mass |

-continued

| | |
|---|---|
| Methanol (second solvent) | 8.7 parts by mass |
| Cellulose acetate solution A | 12.8 parts by mass |

It is to be noted that the compound A-01 has a Log P value of 2.9.

A-01

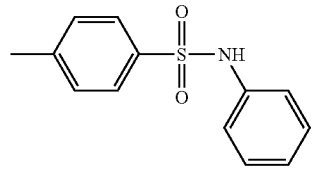

UV-01

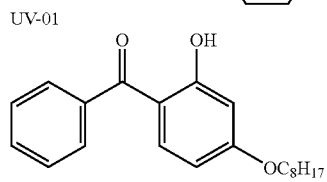

<Preparation of Cellulose Acetate Film>

After filtration, the cellulose acetate solution A of 94.5 parts by mass, the matting agent of 1.3 parts by mass, and the additive solution of 4.1 parts by mass were mixed, to prepare a dope. In the dope, the amounts of the compound capable of lowering optical anisotropy and the agent for controlling wavelength-dependency were 12% and 1.8% respectively with respect to the mass of cellulose acetate.

Thus-prepared dope was cast onto a band using a band casting machine, and the dope cast film was separated from the band when the amount of residual solvent of the dope film was decreased by 30%, and dried at 140° C. for 40 minutes. Then, a cellulose film was obtained. Regarding the obtained film, it was found that the amount of residual solvent was 0.2% and the thickness was 40 μm.

Regarding the obtained film, it was also found that Re(630) was 0.3 nm, Rth(630) was 3.2 nm, |Re(400)−Re(700)| was 1.2 nm, |Rth(400)−Rth(700)| was 7.5 nm, Tg was 134.3° C., the haze value was 0.34%, ΔRth(10% RH−80% RH) was 24.9 nm. This film was used as an optically anisotropic film B-1.

(Production of Polarizer Plate 1 with Optically Anisotropic Layer B-1)

Next, the stretched polyvinyl alcohol film was adsorbed with iodine to thereby produce the polarizer film. A commercially-available cellulose acetate film (Fujitack TD80UF, from FUJIFILM Corporation, Re=3 nm, Rth=45 nm) was saponified. The saponified commercially-available cellulose acetate film and the optically anisotropic film B-1 were bonded to either surface of the polarizer film using a polyvinyl alcohol-base adhesive, to thereby produce a polarizer plate 1.

(Production of Polarizer Plate 2 with Second Optically Anisotropic Layer (Positive A-plate))

An adhesive agent was applied to a surface of the optically anisotropic film B-1 attached to the polarizer plate 1, and a positive A-plate, a polycarbonate film (Re(550 nm)=133.77 nm, Re(450 nm)/Re(550 nm)=0.796,Re(650 nm)/Re(550 nm)=1.053), was bonded to the adhesive agent layer so that the slow axis of the A-plate was perpendicular to the transmission axis of the polarizer film, thereby to produce a polarizer plate 2. Regarding the positive A-plate used in the polarizer plate, the retardations were measured at R, G and B wavelength. The results were shown in Table 7.

TABLE 7

| | B | G | R |
|---|---|---|---|
| | | | (nm) |
| Re | 106 | 137 | 141 |
| Rth | 53 | 68 | 70 |

(Production of IPS-LCD)

The polarizer plate 1 was then bonded to one surface of the IPS-mode liquid crystal cell 1 produced in the above, so that the transmission axis of the polarizer plate was parallel to the rubbing direction of the liquid crystal cell, and so that the surface of the optically anisotropic film B-1 was disposed at the liquid crystal cell side. Next, on the other side of the IPS-mode liquid crystal cell, the polarizer plate 2 was bonded so that the polycarbonate film, positive A-plate, was disposed at the liquid crystal cell side, so that the slow axis of the polycarbonate film was parallel to the rubbing direction of the liquid crystal cell, and so that the surface of the polycarbonate film was disposed at the liquid crystal cell side. Then, a liquid crystal display was produced.

Example 6

(Production of First Optically Anisotropic Layer)

The droplets of the coating liquid LC-5 was ejected into concave portions (fine areas), corresponding to R, G and B areas, of a glass substrate surrounded by the light-shielding barrier wall using a head of piezo system and then heating, drying and aging the same at 80° C. for 1 minute, to form a uniform liquid crystal phase. Further, just after the aging, the layer was irradiated with a polarized UV (illuminance 200 mW/cm$^2$, irradiance level: 1000 mJ/cm$^2$) under a nitrogen atmosphere of an oxygen concentration of 0.3% or less to stabilize the optically anisotropic layer, thereby forming the optically anisotropic layers R-6, G-6 and B-6.

The transfer speed and drive frequency were controlled, so that optically anisotropic layers R-6, G-6 and B-6 had respective thicknesses of 1.26 μm, 1.07 μm and 0.85 μm.

It was found that the mean tilt angle of rod-like molecules in the layer corresponding to each R, G and B layer was 89.90 degree, and the rod-like molecules were aligned vertically relative to the substrate.

(Production of Color Filter Layer)

A color filter layer was prepared in the same manner as Example 1.

(Production of IPS Mode Liquid Crystal Cell)

A polyimide layer was formed on another surface of the glass substrate and subjected to a rubbing treatment to form an alignment layer.

Another glass substrate was prepared, and on the glass substrate, as shown in FIG. 5, the electrodes (reference numerals 2 and 3 in FIG. 5) were provided so as to adjust the distance between the adjacent electrodes to 20 μm, thereon a polyimide film was provided as the alignment film, and rubbed. The rubbing treatment was carried out along with the direction 4 shown in FIG. 5. Two glass substrates were stacked and bonded, while opposing the individual alignment films with each other, keeping a 3.9-μm distance (gap; d) therebetween, and aligning the direction of rubbing of two glass substrates in parallel with each other, and a nematic liquid crystal composition having a refractive index anisotropy (Δn) of 0.0769 and a dielectric constant anisotropy (Δ∈) of 4.5 in positive was then filled with the space between the substrates. The liquid crystal layer was found to have a d·Δn value of 300 nm.

In FIGS. 5, 5a and 5b are directors of liquid crystal molecules in the black state; and 6a and 6b are directors of liquid crystal molecules in the white state.

(Production of IPS-LCD)

The polarizer plate 1 was then bonded to one surface of the IPS-mode liquid crystal cell 1 produced in the above, so that the transmission axis of the polarizer plate was parallel to the rubbing direction of the liquid crystal cell, and so that the surface of the optically anisotropic film B-1 was disposed at the liquid crystal cell side. Next, on the other side of the IPS-mode liquid crystal cell, the polarizer plate 2 was bonded so that the polycarbonate film, positive A-plate, was disposed at the liquid crystal cell side, so that the slow axis of the polycarbonate film was parallel to the rubbing direction of the liquid crystal cell, and so that the surface of the polycarbonate film was disposed at the liquid crystal cell side. Then, a liquid crystal display was produced.

Example 7

<Production of Optically Anisotropic Layer>

Optically anisotropic layers R-7, G-7 and B-7 were prepared in the same manner as Example 5, except that the thicknesses thereof were different from those of the optically anisotropic layers R-5, G-5 and B-5.

The retardations of the layers were measured. The results are shown in Table 8.

TABLE 8

|  | B-7 | G-7 | R-7 | (nm) |
|---|---|---|---|---|
| Re | 0 | 0 | 0 |  |
| Rth | −194 | −250 | −264 |  |

<Production of Color Filter Layer>

A Color filter comprising R, G and B areas was produced in the same manner as Example 5.

<Production of IPS mode Liquid Crystal Cell>

An IPS-mode liquid crystal cell was produced in the same manner as Example 5.

<Production of Second Optically Anisotropic Layer (Biaxial Film)>

The ingredients shown bellow were put into a mixing tank, stirred under heating so as to be dissolved, to thereby prepare a cellulose acetate solution. The solution was filtrated by using a filtration paper (No. 63, manufactured by Advantech) with a retention pore of 4 μm and filtrated water time of 35 seconds under a pressure of 0.5 MPa(5 kg/cm²)

| Formulation of Cellulose Acetate Solution | |
|---|---|
| Cellulose acetate with acetification degree of 60.9% (Polymerization degree = 300, Mn/Mw = 1.5) | 100.0 parts by mass |
| Triphenyl phosphate (plasticizer) | 7.8 parts by mass |
| Biphenyl diphenyl phosphate (plasticizer) | 3.9 parts by mass |
| Methylene chloride (first solvent) | 300 parts by mass |
| Methanol (second solvent) | 54 parts by mass |
| 1-butanol (third solvent) | 11 parts by mass |

In another mixing tank, 8 parts by mass of a retardation enhancer A described below, 10 parts by mass of retardation enhancer B described below, 0.28 parts by mass or silicon dioxide particles (mean particle size: 0.1 μm), 80 parts by mass of methylene chloride, and 20 parts by mass of methanol were put, stirred under heating, to thereby prepare a retardation enhancer solution (and also is a particle dispersion). The cellulose acetate solution in an amount of 474 parts by mass was mixed with 45 parts by mass of the retardation enhancer, and thoroughly mixed to prepare a dope.

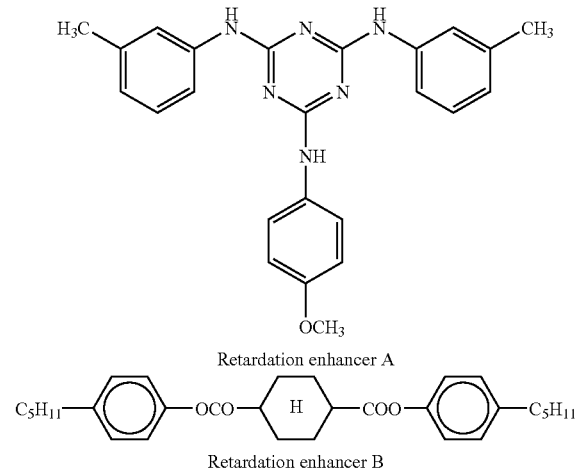

Retardation enhancer A

Retardation enhancer B

The dope was cast on a band using a band casting machine. The film having the residual solvent content of 15% by mass was stretched in the length-wise direction by a stretching ratio of 20% using a tenter at 130° C., kept at 50° C. for 30 seconds while keeping the width after the stretching unchanged, released from the clips, to thereby form a cellulose acetate film. The residual solvent content upon completion of the stretching was 5% by mass, and was further lowered by drying to as low as less than 0.1% by mass, and thereby a cellulose acetate film to be used as a second optically anisotropic layer B-2.

The thickness of the second optically anisotropic layer B-2 was 80 μm. Regarding the second optically anisotropic layer B-2, the Re and Rth values at R, G, and B wavelength were measured by using an automatic birefringence meter (KOBRA-21ADH from Oji Scientific Instruments). The results were shown in Table 9.

TABLE 9

|  | B | G | R | (nm) |
|---|---|---|---|---|
| Re | 69 | 65 | 64 |  |
| Rth | 203 | 195 | 191 |  |

<Production of Polarizer Plate 3 with Second Optically Anisotropic Layer B-2 (Biaxial Film)>

Next, the stretched polyvinyl alcohol film was adsorbed with iodine to thereby produce the polarizer film. A commercially-available cellulose acetate film (Fujitack TD80UF, from FUJIFILM Corporation, Re=3 nm, Rth=45 nm) was saponified. The saponified commercially-available cellulose acetate film and the optically anisotropic film B-2 were bonded to either surface of the polarizer film using a polyvinyl alcohol-base adhesive, to thereby produce a polarizer plate 3.

(Production of IPS-LCD)

The polarizer plate 1 was then bonded to one surface of the IPS-mode liquid crystal cell 1 produced in the above, so that the transmission axis of the polarizer plate was parallel to the rubbing direction of the liquid crystal cell, and so that the surface of the optically anisotropic film B-1 was disposed at the liquid crystal cell side. Next, on the other side of the IPS-mode liquid crystal cell, the polarizer plate 3 was bonded so that the second optically anisotropic layer B-2, biaxial film, was disposed at the liquid crystal cell side, so that the slow axis of the B-2 film was parallel to the rubbing direction of the liquid crystal cell, and so that the surface of the B-2 film was disposed at the liquid crystal cell side. Then, a liquid crystal display was produced.

Example 8

Preparation of Coating Liquid AL-8 for Alignment Layer

The ingredients shown below were mixed and filtrated by using a polypropylene filter with a 30 μm pore size, thereby to form a coating solution AL-8 for alignment layer.

| Formulation of Coating Liquid for Alignment Layer | |
| --- | --- |
| Polyvinyl alcohol shown below | 10 parts by mass |
| Water | 371 parts by mass |
| Methanol | 119 parts by mass |
| Glutaraldehyde | 0.5 parts by mass |
| p-toluenesulfonic acid | 0.3 parts by mass |

(Preparation of Coating Liquid LC-8 for Optically Anisotropic Layer)

A coating liquid LC-8 was prepared by dissolving 1.8 g of discotic (liquid crystalline) compound shown below, 0.2 g of ethylene-oxide-modified trimethylolpropane triacrylate (V#360, product of Osaka Organic Chemical Industry, Ltd.), 0.06 g of photo-polymerization initiator (Irgacure 907, product of Ciba-Geigy), 0.02 g of sensitizer (Kayacure DETX, product of Nippon Kayaku Co., Ltd.), and 0.01 g of polymer capable of promoting vertical alignment at air-interface shown below in 3.9 g of methyl ethyl ketone.

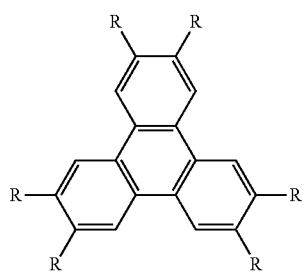

Discotic liquid crystalline compound

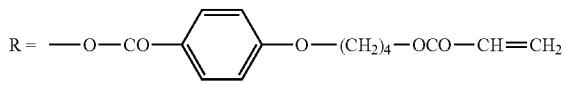

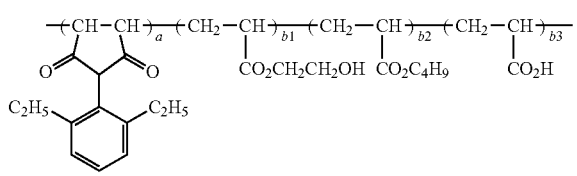

a/b1/b2/b3 = 33/28/33/6
Mw = 9000
Polymer capable of promoting vertical alignment at an air interface (Production of Alignment Layer)

Droplets of the coating liquid AL-8 for an alignment layer obtained above were ejected into concave portions (fine areas) surrounded by the light-shielding barrier wall using a head of piezo system, which was then dried. Subsequently, the surface was subjected to a rubbing treatment, to form an alignment layer AL-8.

(Production of First Optically Anisotropic Layer)

As an optically anisotropic layer R-8 for R, a layer having a uniform liquid crystal phase was formed by ejecting droplets of the coating liquid LC-8 for an optically anisotropic layer obtained above into concave portions (fine areas) having the alignment layer AL-8 surrounded by the light-shielding barrier wall using a head of piezo system and then heating, drying and aging the same at 125° C. for 3 minutes. Further, just after the aging, the layer was irradiated with a polarized UV (illuminance 200 mW/cm$^2$, irradiance level: 2000 mJ/cm$^2$) under a nitrogen atmosphere of an oxygen concentration of 0.3% or less to stabilize the liquid crystal phase, thereby forming an optically anisotropic layer.

Optically anisotropic layers G-8, B-8 for G, B were formed in the similar way. The transfer speed and drive frequency were controlled so that the obtained optically anisotropic layers R-8, G-8 and B-8 had a Re/Rth value of 136 nm/−67 nm, 115 nm/−57 nm and 94 nm/−47 nm respectively. It was found that the mean tilt angle of discotic molecules in the layer corresponding to each R, G and B layer was 89.90 degree, and the discotic molecules were aligned vertically relative to the substrate.

(Production of Color Filter Layer)

A color filter layer was prepared in the same manner as Example 1.

(Production of IPS Mode Liquid Crystal Cell)

A polyimide layer was formed on another surface of the glass substrate and subjected to a rubbing treatment to form an alignment layer.

Another glass substrate was prepared, and on the glass substrate, as shown in FIG. 5, the electrodes (reference numerals 2 and 3 in FIG. 5) were provided so as to adjust the distance between the adjacent electrodes to 20 μm, thereon a polyimide film was provided as the alignment film, and rubbed. The rubbing treatment was carried out along with the direction 4 shown in FIG. 5. Two glass substrates were stacked and bonded, while opposing the individual alignment films with each other, keeping a 3.9-μm distance (gap; d) therebetween, and aligning the direction of rubbing of two glass substrates in parallel with each other, and a nematic liquid crystal composition having a refractive index anisotropy (Δn) of 0.0769 and a dielectric constant anisotropy (Δ∈) of 4.5 in positive was then filled with the space between the substrates. The liquid crystal layer was found to have a d·Δn value of 300 nm.

In FIGS. 5, 5a and 5b are directors of liquid crystal molecules in the black state; and 6a and 6b are directors of liquid crystal molecules in the white state.

(Production of Optical Compensation Film 8)

The ingredients shown bellow were put into a mixing tank, stirred under heating so as to be dissolved, to thereby prepare a cellulose acetate solution.

| Formulation of Cellulose Acetate Solution | |
|---|---|
| Cellulose acetate with acetification degree of 60.9% (Polymerization degree = 300, Mn/Mw = 1.5) | 100.0 parts by mass |
| Triphenyl phosphate (plasticizer) | 7.8 parts by mass |
| Biphenyl diphenyl phosphate (plasticizer) | 3.9 parts by mass |
| Methylene chloride (first solvent) | 300 parts by mass |
| Methanol (second solvent) | 54 parts by mass |
| 1-butanol (third solvent) | 11 parts by mass |

In another mixing tank, 16 parts by mass of a retardation enhancer described below, 80 parts by mass of methylene chloride, and 20 parts by mass of methanol were put, stirred under heating, to thereby prepare a retardation enhancer solution. The cellulose acetate solution in an amount of 487 parts by mass was mixed with 7 parts by mass of the retardation enhancer, and thoroughly mixed to prepare a dope.

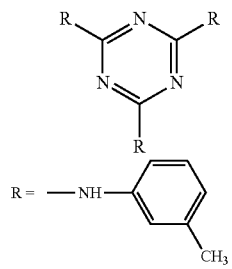

The dope was cast on a band using a band casting machine. The film on the band was dried with heating wind of 60° C. for one minute after the film surface temperature was cooled to 40° C., and, then, the film was peeled off from the band. The film was dried with dry wind of 140° C. for 10 minutes. Then, a cellulose acetate film 1 having a thickness of 80 μm was obtained.

The optical properties of the obtained film was measured by using an automatic birefringence meter (KOBRA-21ADH from Oji Scientific Instruments), and it was found that the Re and Rth value of the film were 8 nm and 82 nm respectively.

(Production of IPS-LCD)

Next, the stretched polyvinyl alcohol film was adsorbed with iodine to thereby produce the polarizer film. The optical compensation film 8 was bonded to a surface of the polarizer film using a polyvinyl alcohol-base adhesive, so that the transmission axis of the polarizer film was parallel to the slow axis of the film 8. A commercially-available cellulose acetate film (Fujitack TD80UF, from FUJIFILM Corporation, Re=3 nm, Rth=45 nm) was saponified. The saponified commercially-available cellulose acetate film was bonded to another surface of the polarizer film using a polyvinyl alcohol-base adhesive, to thereby produce a polarizer plate 4.

The polarizer plate 4 was bonded to a surface of the produced IPS liquid crystal cell, so that the slow axis of the film 8 was parallel to the rubbing direction of the liquid crystal cell. And a commercially available polarizer plate (HLC2-5618 manufactured by SANRITSU) was bonded to another surface of the IPS liquid crystal cell in a crossed-Nicol arrangement.

Example 9

An IPS-LCD, comprising a positive C-plate and a positive A-plate disposed on a colored layer, was produced in the same manner as Example 1 described in JPA No. 2006-64858.

Comparative Example 2

An IPS-LCD was produced in the same manner as Example 3 and 4 described in JPA No. 2006-78647.

<Evaluation of LCD regarding Warped>

The LCD produced in each of Examples 5 to 9 and Comparative Example 2 was left in an atmosphere with a temperature of 50° C. and a relative humidity of 95% for 50 hours, and, then, was transferred to an atmosphere with a temperature of 25° C. and a relative humidity of 60%. After 5 minutes from the transfer, a power source was put therein, and the liquid crystal cell was peeled off from the LCD and the warpage amount W (mm) thereof was measured, provided that, for a concave warpage to the front direction, the sign of the warpage amount w (mm) was considered positive (+), and, for a convex warpage to the front direction, the sign of the warpage amount w(mm) was considered negative (+). The warpage amount was calculated as a mean value of the displacement values at four corners from the center point of the panel, which were measured by using a CCD laser displacement gauge (LK-85, manufactured by Keyence Corporation.

Regarding the LCD cells employed in Examples 5 to 9, no warpage was found. On the other hand, regarding the LCD cell employed in Comparative Example 2, the warpage amount was found 5 mm.

<Evaluation of LCD Regarding viewing Angle Property>

The viewing angle property of each of LCDs produced in Examples 5 to 9 and Comparative Example 2 was evaluated with eye observation. The results were shown in Table 10.

TABLE 10

| Example 5 | Viewing angle properties of contrast and color were good, and no light leakage in the black state was observed. |
|---|---|
| Example 6 | Viewing angle properties of contrast and color were good, and no light leakage in the black state was observed. |
| Example 7 | Viewing angle properties of contrast and color were good, and no light leakage in the black state was observed. |
| Example 8 | Viewing angle properties of contrast and color were good, and no light leakage in the black state was observed. |
| Example 9 | Viewing angle property of color was good, but light leakage due to the A-plate was observed in the black state. |
| Comparative Example 2 | Light leakage due to the warpage of C-plate was observed in the black state. |

INDUSTRIAL APPLICABILITY

According to the invention, utilizing the liquid crystal display device of the invention, it is possible to compensate optically respective colors in the liquid crystal cell. The liquid crystal display device produced according to the process of the invention which utilizes an ink jet system has a laminated body of a patterned color filter and optically anisotropic layer to improve the viewing angle property, in particular the viewing angle property color. In addition, according to the invention, by utilizing an ink jet system, a color filter plate having an accurately patterned optical anisotropy can be provided readily.

CROSS-REFERENCE TO RELATED APPLICATIONS

This application claims benefit of priority under 35 USC 119 to Japanese Patent Application No. 2006-026706 filed Feb. 3, 2006.

The invention claimed is:

1. A liquid crystal display device comprising:
   a first substrate,
   a second substrate,
   liquid crystal held between the first substrate and the second substrate,
   patterned layers divided into fine areas, disposed on the first substrate, comprising at least a patterned color filter layer and a patterned first optically anisotropic layer laminated in the direction of the normal line of the substrate, and
   a barrier wall disposed at a boundary portion of the adjacent fine areas of the patterned layers, and
   the barrier wall comprises an ink-rejecting agent.

2. The liquid crystal display device of claim 1, wherein the fine areas are arranged in a matrix shape.

3. The liquid crystal display device of claim 1, wherein the first optically anisotropic layer is a layer produced according to a process comprising applying a fluid composition containing a liquid crystalline compound having at least one reactive group to a surface, drying the fluid composition on the surface to form a liquid crystal phase, and then fixing the liquid crystal phase with the aid of irradiation of heat or ionizing radiation.

4. The liquid crystal display device of claim 3, wherein the ionizing radiation is ultraviolet ray.

5. The liquid crystal display device of claim 3, wherein the reactive group is an ethylenic unsaturated group.

6. The liquid crystal display device of claim 3, wherein the fluid composition further comprising at least one type of radical polymerization initiator.

7. The liquid crystal display device of claim 3, wherein the liquid crystalline compound is rod-like liquid crystal.

8. The liquid crystal display device of claim 3, wherein the liquid crystalline compound is discotic liquid crystalline compound.

9. The liquid crystal display device of claim 3, wherein the liquid crystal phase is a cholesteric phase.

10. The liquid crystal display device of claim 1, wherein the first optically anisotropic layer is formed on a rubbing-treated surface of an alignment layer.

11. A process for producing a liquid crystal display device comprising:
    a first substrate,
    a second substrate,
    liquid crystal held between the first substrate and the second substrate,
    patterned layers divided into fine areas, disposed on the first substrate, comprising at least a patterned color filter layer and a patterned first optically anisotropic layer laminated in the direction of the normal line of the substrate, and
    a barrier wall disposed at a boundary portion of the adjacent fine areas of the patterned layers, said process comprising at least [1a]-[4a] steps below in this order:
    [1a] forming fine areas on a first substrate separated by barrier walls;
    [2a] forming an optically anisotropic layer by ejecting a fluid composition, capable of exhibiting optical anisotropy, comprising at least one type of liquid crystalline compound from an ejection head of an ink jet system to the fine areas according to predetermined positions, drying the composition to form a liquid crystal phase, and then exposing the composition;
    [3a] forming a color filter layer on the optically anisotropic layer by ejecting each ink fluid composition for a color filter from an ejection head of an ink jet system to the optically anisotropic layer according to predetermined positions, and then drying the composition; and
    [4a] combining the first substrate with a second substrate.

12. A process for producing a liquid crystal display device comprising:
    a first substrate,
    a second substrate,
    liquid crystal held between the first substrate and the second substrate,
    patterned layers divided into fine areas, disposed on the first substrate, comprising at least a patterned color filter layer and a patterned first optically anisotropic layer laminated in the direction of the normal line of the substrate, and
    a barrier wall disposed at a boundary portion of the adjacent fine areas of the patterned layers, said process comprising at least [1b]-[4b] steps below in this order:
    [1b] forming fine areas on a first substrate separated by barrier walls;
    [2b] forming a color filter layer by ejecting each ink fluid composition for a color filter from an ejection head of an ink jet system to the fine areas according to predetermined positions, and then drying the composition;
    [3b] forming an optically anisotropic layer on the color filter layer by ejecting a fluid composition, capable of exhibiting optical anisotropy, comprising at least one type of liquid crystalline compound from an ejection head of an ink jet system to the fine areas according to predetermined positions, drying the composition to form a liquid crystal phase, and then exposing the composition; and
    [4b] combining the first substrate with a second substrate.

13. The process of claim 11, further comprising forming an alignment layer by rubbing a surface before the [2a] step.

14. A color filter plate comprising:
    a substrate,
    patterned layers divided into fine areas, disposed on the substrate, comprising at least a patterned color filter layer and a patterned first optically anisotropic layer laminated in the direction of the normal line of the substrate, and
    a barrier wall disposed at a boundary portion of the adjacent fine areas of the patterned layers, and
    the barrier wall comprises an ink-rejecting agent.

15. The color filter plate of claim 14, wherein the color filter layer and the optically anisotropic layer are disposed in this order on the substrate.

16. The color filter plate of claim 14, wherein the optically anisotropic layer and the color filter layer are disposed in this order on the substrate.

17. A process for producing a color filter plate, comprising at least [1a]-[3a] steps below in this order:
    [1a] forming fine areas on a substrate separated by barrier walls;

[2a] forming an optically anisotropic layer by ejecting a fluid composition, capable of exhibiting optical anisotropy, comprising at least one type of liquid crystalline compound from an ejection head of an ink jet system to the fine areas according to predetermined positions, drying the composition to form a liquid crystal phase, and then exposing the composition; and

[3a] forming a color filter layer on the optically anisotropic layer by ejecting each ink fluid composition for a color filter from an ejection head of an ink jet system to the optically anisotropic layer according to predetermined positions, and then drying the composition.

18. A process for producing a color filter plate, comprising at least [1b]-[3] steps below in this order:

[1b] forming fine areas on a substrate separated by barrier walls;

[2b] forming a color filter layer by ejecting each ink fluid composition for a color filter from an ejection head of an ink jet system to the fine areas according to predetermined positions, and then drying the composition; and

[3b] forming an optically anisotropic layer on the color filter layer by ejecting a fluid composition, capable of exhibiting optical anisotropy, comprising at least one type of liquid crystalline compound from an ejection head of an ink jet system to the fine areas according to predetermined positions, drying the composition to form a liquid crystal phase, and then exposing the composition.

19. The process of claim 12, further comprising forming an alignment layer by rubbing a surface before the [3b] step.

* * * * *